(12) United States Patent
Tomioka et al.

(10) Patent No.: US 7,229,166 B2
(45) Date of Patent: Jun. 12, 2007

(54) IMAGE-FORMING METHOD, IMAGE-FORMING APPARATUS, INK SET, AND INK

(75) Inventors: Hiroshi Tomioka, Tokyo (JP); Hiroyuki Takuhara, Tokyo (JP); Shin-ichi Tochihara, Kanagawa (JP); Tsuyoshi Kanke, Kanagawa (JP); Yutaka Kurabayashi, Tokyo (JP); Hiromichi Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 10/914,124

(22) Filed: Aug. 10, 2004

(65) Prior Publication Data

US 2005/0057607 A1 Mar. 17, 2005

(30) Foreign Application Priority Data

Aug. 11, 2003 (JP) .............................. 2003-291867
Aug. 11, 2003 (JP) .............................. 2003-291869

(51) Int. Cl.
*G01D 11/00* (2006.01)

(52) U.S. Cl. ...................... 347/100; 347/95; 347/43; 106/31.13

(58) Field of Classification Search ................ 347/100, 347/95, 96, 101, 43, 41; 106/31.27, 31.6, 106/31.13; 523/160
See application file for complete search history.

(56) References Cited

U.S. PATENT DOCUMENTS

| 6,508,549 B1 | 1/2003 | Romano, Jr. et al. ....... 347/100 |
| 6,513,923 B1 * | 2/2003 | Evans et al. ................ 347/100 |
| 2004/0045478 A1 | 3/2004 | Tateishi et al. .......... 106/31.49 |
| 2004/0089200 A1 | 5/2004 | Fujiwara et al. ......... 106/31.48 |
| 2004/0099180 A1 | 5/2004 | Kitayama et al. ........ 106/31.46 |
| 2004/0103818 A1 | 6/2004 | Kataoka et al. .......... 106/31.27 |
| 2006/0011095 A1 * | 1/2006 | Kabalnov et al. ........... 347/100 |
| 2006/0012655 A1 * | 1/2006 | Gondek et al. ............. 347/100 |

FOREIGN PATENT DOCUMENTS

| JP | 2002-241661 A | 8/2002 |
| JP | 2002-294097 A | 10/2002 |
| JP | 2002-302623 A | 10/2002 |
| JP | 2002-309115 A | 10/2002 |
| JP | 2002-309116 A | 10/2002 |
| JP | 2002-309133 A | 10/2002 |
| JP | 2002-327132 A | 11/2002 |
| JP | 2002-371214 A | 12/2002 |
| JP | 2003-34765 A | 2/2003 |
| JP | 2003-49100 A | 2/2003 |
| WO | WO 99/43754 | 9/1999 |
| WO | WO 00/43451 | 7/2000 |
| WO | WO 02/081580 A1 | 10/2002 |
| WO | WO 02/088256 A1 | 11/2002 |
| WO | WO 02/100959 A1 | 12/2002 |

* cited by examiner

*Primary Examiner*—Manish S. Shah
(74) *Attorney, Agent, or Firm*—Fitzpatrick, Cella, Harper & Scinto

(57) ABSTRACT

Disclosed herein is an image-forming method, including performing image formation on the basis of pixel data by using at least a yellow recording agent, a magenta recording agent, and a third recording agent. A color represented on a recording medium by the third recording agent on a color space of CIE-L*a*b* has lightness higher than lightness of a color reproduction region represented on the recording medium by a combination of the yellow recording agent and the magenta recording agent, and has a hue angle in the color reproduction region. A difference in hue angle on the color space between a color represented by the yellow recording agent and a color represented by the magenta recording agent is in a range of 60 to 113°.

11 Claims, 37 Drawing Sheets

IMAGE-FORMING METHOD, IMAGE-FORMING APPARATUS, INK SET, AND INK

This application claims priorities from Japanese Patent Application No. 2003-291867 filed on Aug. 11, 2003, and No. 2003-291869 filed on Aug. 11, 2003, which is hereby incorporated by reference herein.

BACKGROUND OF THE INVENTION

1. Field of the Invention

The present invention relates to an image-forming method, an image-forming apparatus, an ink set, and an ink. More specifically, the present invention relates to an image-forming method, an image-forming apparatus, an ink set, and an ink for allowing an image to be obtained on a recording medium, the image being vivid, the image having a high contrast, high transparency, and a high stereoscopic effect, and the image smoothly representing a change of color.

2. Related Background Art

Methods of forming a full-color image such as offset printing, gravure printing, electrophotographic printing, and an ink jet recording method have been conventionally and extensively used. Of those image-forming methods, the ink jet recording method has been extensively used for personal-use and office-use printers, facsimiles, copying machines, and the like. The reasons why the ink jet recording method is used include: that the method causes low noise; that a manufacturing cost of an apparatus used in the method is low; that the apparatus can be miniaturized; and that a full-color recorded image can be easily obtained.

In many of those image-forming methods, a full-color image is formed on the basis of subtractive color mixing. Therefore, color reproduction is performed by using three primary colors of printing: yellow, magenta, and cyan. In some of the image-forming methods, a black ink is used in addition to the inks of those three primary colors, while a UCR treatment is performed to improve contrast or to stably reproduce a neutral color. In the UCR treatment, a black component K is sampled form data Y, M, and C on the respective colors of yellow, magenta, and cyan to substitute for black, and the substituted color components of C, M, and Y are removed. With the above procedure, for example, an image of an orange to red region, an image of a green region, and an image of a blue to violet region can be formed by color mixing of yellow and magenta, color mixing of yellow and cyan, and color mixing of magenta and cyan, respectively. As a result, the entire region of hue can be represented.

In addition, a full-color printing technique requires a printing method having a wide color reproduction region for reproduction of a natural image or the like. Therefore, color materials with good color developability for use in recording agents for the basic three primary colors, yellow, magenta, and cyan, have been widely proposed. However, when one attempts to represent the entire region of hue with the three primary colors, even if color materials for the three primary colors with good color developability are used, the chroma saturation in a color region represented by color mixing of the three primary colors is not sufficient. Thus, a color reproduction region that can be represented is insufficient in some cases. In view of the above, there has been proposed a method of forming an image using, for example, recording agents for colors each having an intermediate hue angle in a hue space (hereinafter, referred to as particular colors) such as red, green, and blue in addition to the recording agents for yellow, magenta, and cyan.

For example, the pamphlet of WO 02/100959 A discloses an ink set containing inks of the basic three primary colors having specific hue angles and inks of red and blue. In addition, the ink of each of red and blue used has a lightness lower than that of the ink of each of magenta and cyan, whereby the gamut is enlarged, graininess is mitigated, and gloss is improved.

JP 2003-034765 A discloses an ink set containing: inks of the basic three primary colors using a magenta ink containing a specific dye; and an ink of any one of orange, green, and violet. Similarly to the above, the gamut is enlarged through the addition of a particular color.

JP 2002-241661 A discloses an ink jet printing method using inks of red, green, and blue in addition to inks of the three primary colors, yellow, magenta, and cyan, more specifically, a printing method using a vat dye for an ink of each color. In this patent document as well, the gamut is enlarged and, at the same time, an intermediate color is represented by using a basic color and a particular color close to each other in hue. As a result, graininess is reduced as compared to that in the case where an intermediate color is represented by using a basic color alone, and color gradation is improved.

However, the widespread of a recording system, in particular a recording system using an ink jet recording method, up to a personal user has been requesting a further improvement in image quality. The further improvement in image quality is ultimately nothing but an attempt to bring a color reproduction region of a printer near to a color range which man can visually recognize in the natural world. However, the improvement cannot be achieved merely by adding a particular color (for instance, red, orange, green, blue, or violet) having an angle in an intermediate region of the three primary colors of printing in the color space.

For example, in any of the above documents, an image-forming method in which an ink of a particular color (red or orange) in an intermediate region between yellow and magenta is merely added has an effect of enlarging a color reproduction region of an orange to red region on an a*b* plane of Commission Internationale de l'Eclairage (CIE)-L*a*b*, but is insufficient for representing the vividness, stereoscopic effect, and transparency of an image.

In addition, when image representation is performed by adding a particular color to the basic three primary colors as in the pamphlet of WO 02/100959 A, graininess is reduced. However, the occurrence of pseudocontour or the so-called "color skip" caused by an increase in times of switching of ink colors during a change of color in the image is insufficiently suppressed. Consequently, at present, it is impossible to form an image that has enlarged a color reproduction region while smoothly representing a natural image. In particular, for beautifully reproducing an image of a view of sunset, autumn leaves, or the like, not only a wide color reproduction region but also an image-forming method for improving the vividness, transparency, and contrast of an image in an orange to red region and for minimizing pseudocontour or color skip occurring when a color continuously changes in the image to smoothly represent a color with no discontinuity will be required. However, a satisfactory result has not been obtained yet.

In view of the above, the inventors of the present invention have recognized that selection or the like of a particular color recording agent having appropriate properties should be performed in relation to the basic three primary colors. In addition to the above, the inventors have found that an image formed on a positive film of a silver halide photograph will be a guideline to the selection or the like. Since the image is a transmission image in which light is allowed to transmit through the backside of the image formed on the positive film to act on the sense of sight of a human being, an image excellent in realism, vividness, transparency, contrast, and stereoscopic effect may be perceived. In addition, the inventors have thought that the realization of image quality comparable to that of a transmission image with a reflection image is effective in further improving image quality.

First of all, the inventors of the present invention compared an image formed on a positive film and an image formed with a printer with the widest color reproduction region at present for various images of scenes, plants, persons, computer graphics (CG), and the like. An example of the comparison is described below.

FIG. 1 shows gamuts of an ink jet recording system and a positive film plotted on the a*b* plane of CIE-L*a*b*. In the figure, the gamut of the ink jet printer is surrounded by a solid line and painted whereas the gamut of the positive film is indicated by points. As is apparent from the figure, the gamut of the positive film is larger than the gamut of the ink jet printer in the Y to R region, the G region, and the B region.

FIGS. 2A and 2B are each a diagram for explaining the mode of calculating the gamut data shown in FIG. 1. In FIG. 2A, the gamut data for the positive film is obtained by scanning a total of 84 positive films from 8 categories consisting of mountain photograph (sunset), scene (sea and mountain), flower, fish, bird, butterfly, ethnic costume, and CG. Here, a Nexscan F4200 manufactured by Heidelberg GmbH was used as the scanner, and the color space used was Wide Gamut RGB. In the Wide Gamut RGB, the chromaticity of a white point is D50 and the values for chromaticity coordinates of RGB three primary colors are (0.73, 0.27) for R, (0.12, 0.83) for G, and (0.16, 0.02) for B. Equations for converting the Wide Gamut RGB into XYZ are:

$X=0.7165 \times R+0.1010 \times G+0.1468 \times B;$ $Y=0.2587 \times R+0.7247 \times G+0.0166 \times B;$ and $X=0.0000 \times R+0.0512 \times G+0.7739 \times B.$ Equations for converting XYZ into L*a*b* used were those defined in CIE.

In addition, in the calculation of the gamut data for the ink-jet recording system shown in FIG. 2B, a color patch was printed on recording paper PR101 manufactured by Canon Inc. by using a PIXUS 950i manufactured by Canon Inc. as a recording system, and the paper was subjected to colorimetry on a Spectrolino manufactured by Gretag Macbeth Ltd. The printer used here is for forming an image by adding light cyan and light magenta to yellow, magenta, cyan, and black. The gamut of the printer is smaller than the gamut of a recorded product obtained from the positive film of the so-called silver halide photograph shown in FIG. 2A.

SUMMARY OF THE INVENTION

The above analysis showed that a color in a specific hue direction and having a high lightness largely contributes to vivid color development properties which a human being psychologically has through his or her sense of sight from a positive film image. In particular, for images which largely show orange to red regions such as a view of sunset, autumn leaves or the like, for obtaining a vivid recorded image comparable to a positive film image, the inventors have recognized, as a first condition, that image formation should be performed by using inks of yellow and magenta and a third ink, which is capable of representing a color having a higher lightness than that of a color reproduction region represented by the inks of yellow and magenta, as a particular color ink.

On the other hand, when only inks of yellow and magenta as basic colors are used to represent intermediate regions of these colors, it is possible that yellow and magenta inks having extremely high lightness be used to obtain sufficient lightness and a hue angle of each color be brought near a target hue angle. However, in this case, yellow and magenta as basic colors cannot be sufficiently represented if a hue angle between yellow and magenta is reduced. That is, even though a target narrow region between orange and red can be represented, a balance between yellow or magenta as a basic color and another color is lost. Therefore, a color in an orange to red region that could be originally represented cannot be sufficiently represented. As a result, it becomes difficult to represent continuity of a color with another hue angle, thereby narrowing a color reproduction region itself.

In view of the above, the inventors of the present invention have recognized, as a second condition, that a hue angle between yellow and magenta should be within an appropriate range for fully utilizing an ability of the particular color ink as the third ink to form an image showing a low degree of pseudocontour or of color skip caused by a change of color while maintaining a balance with a color of another hue over a yellow to magenta region.

That is, the inventors of the present invention have gained a knowledge that image quality comparable to a positive film can be achieved by performing image formation on the basis of pixel data using recording agents for yellow, magenta, and a particular color satisfying the first and second conditions. Thus, the inventors have completed the present invention.

The present invention aims at providing an image-forming method, an image-forming apparatus, an ink set, and an ink with each of which a smooth image can be obtained, the image having enhanced realism, the image being excellent in vividness, transparency, and contrast, and the image showing a low degree of pseudocontour or of color skip.

According to one aspect of the present invention, there is provided an image-forming method or an image-forming apparatus for performing image formation on the basis of pixel data by using at least a yellow recording agent, a magenta recording agent, and a third recording agent, in which: a color represented on a recording medium by the third recording agent on a color space of CIE-L*a*b* has a higher lightness than that of a color reproduction region represented on the recording medium by a combination of the yellow recording agent and the magenta recording agent, and has a hue angle in the color reproduction region; and a difference in hue angle on the color space between a color represented by the yellow recording agent and a color represented by the magenta recording agent is in the range of 60 to 113°.

According to another aspect of the present invention, there is provided an ink set, including a yellow ink, a magenta ink, and a third ink, in which: a color represented on a recording medium by the third ink on a color space of CIE-L*a*b* has a higher lightness than that of a color reproduction region represented on the recording medium by a combination of the yellow ink and the magenta ink, and has a hue angle in the color reproduction region; and a difference in hue angle on the color space between a color represented by the yellow ink and a color represented by the magenta ink is in the range of 60 to 113°.

According to yet another aspect of the present invention, there is provided a third ink to be used with at least a yellow ink and a magenta ink, the third ink being characterized in that: a color represented on a recording medium by the third ink on a color space of CIE-L*a*b* has a higher lightness than that of a color reproduction region represented on the recording medium by a combination of the yellow ink and the magenta ink, and has a hue angle in the color reproduction region; and a difference in hue angle on the color space between a color represented by the yellow ink and a color represented by the magenta ink is in the range of 60 to 113°.

DESCRIPTION OF THE PREFERRED EMBODIMENTS

Hereinafter, the present invention will be described in detail.

(Outline of Image Formation)

Used in the image-forming method of this embodiment are at least a yellow ink, a magenta ink, and a third recording agent (ink) having an angle in an intermediate region between yellow and magenta on a hue space. Image formation is performed with this method on the premise that a recording agent or the like for each color satisfying the following conditions is selected. The conditions are as follows.

Condition 1: A color represented on a recording medium by the third ink on a color space of CIE-L*a*b* has a higher lightness than that of a color reproduction region represented on the recording medium by a combination of the yellow ink and the magenta ink, and has a hue angle in the color reproduction region.

Condition 2: A hue angle on the a*b* plane of CIE-L*a*b* between a color represented by the yellow ink and a color represented by the magenta ink is in the range of 60 to 113°.

Examples of an image-forming method that can be used in the present invention include those conventionally and generally used such as an offset printing method, a gravure printing method, an electrophotographic printing method, and an ink-jet recording method. Here, for explaining the components and conditions of the present invention, the ink jet recording method will be illustrated as an image-forming method that can be preferably applied to the present invention. This is because the ink jet recording method is a preferable recording technique since, with this method, an image having a continuous hue over the range of from yellow to orange to red to magenta can be formed on a recording medium by combining inks of yellow and magenta as basic colors and a third ink at an arbitrary ratio on the recording medium.

Conditions 1 and 2 are effective in smoothly forming a vivid image excellent in transparency and stereoscopic effect while suppressing pseudocontour and color skip, and the conditions are related to each other.

First, a description is given of Condition 1.

Figure 1:
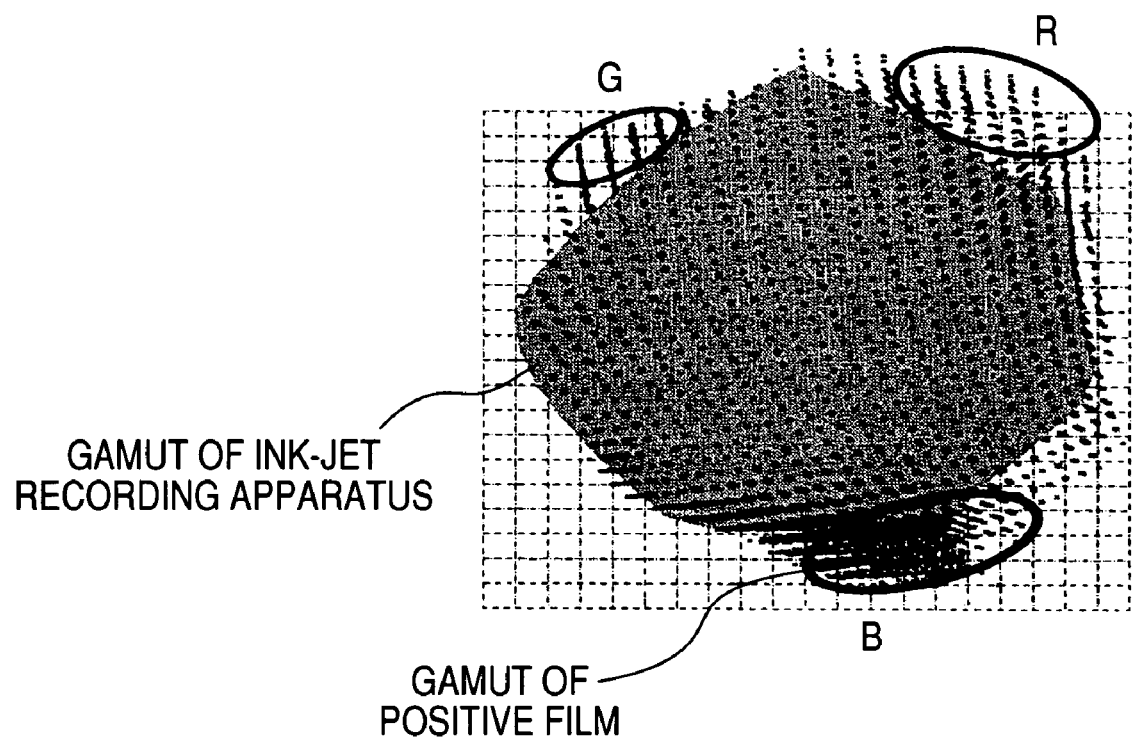
FIG. 1 shows gamuts of an ink jet recording system and a positive film plotted on an a*b* plane of CIE-L*a*b*.
Figure 2:
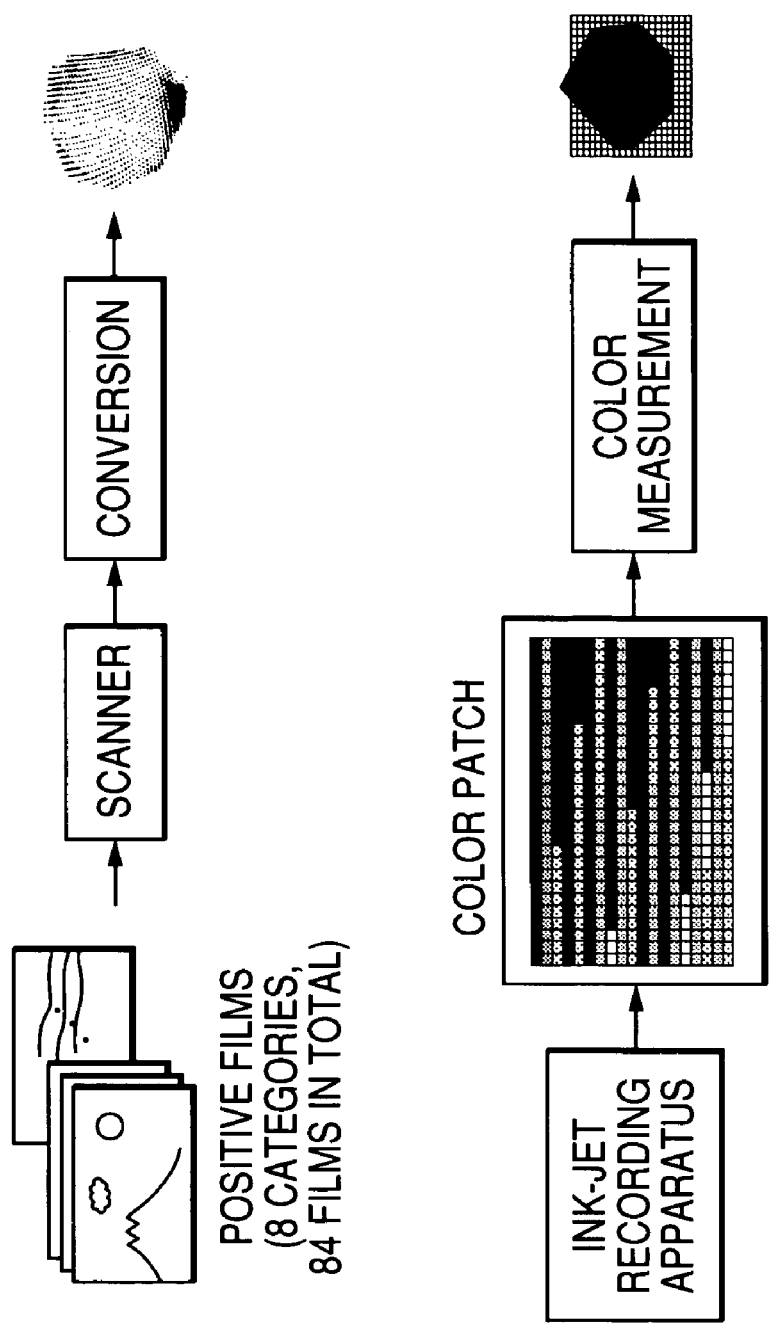
FIGS. 2A and 2B are each a diagram for explaining a mode of calculating the gamut data shown in FIG. 1.
Figure 3:
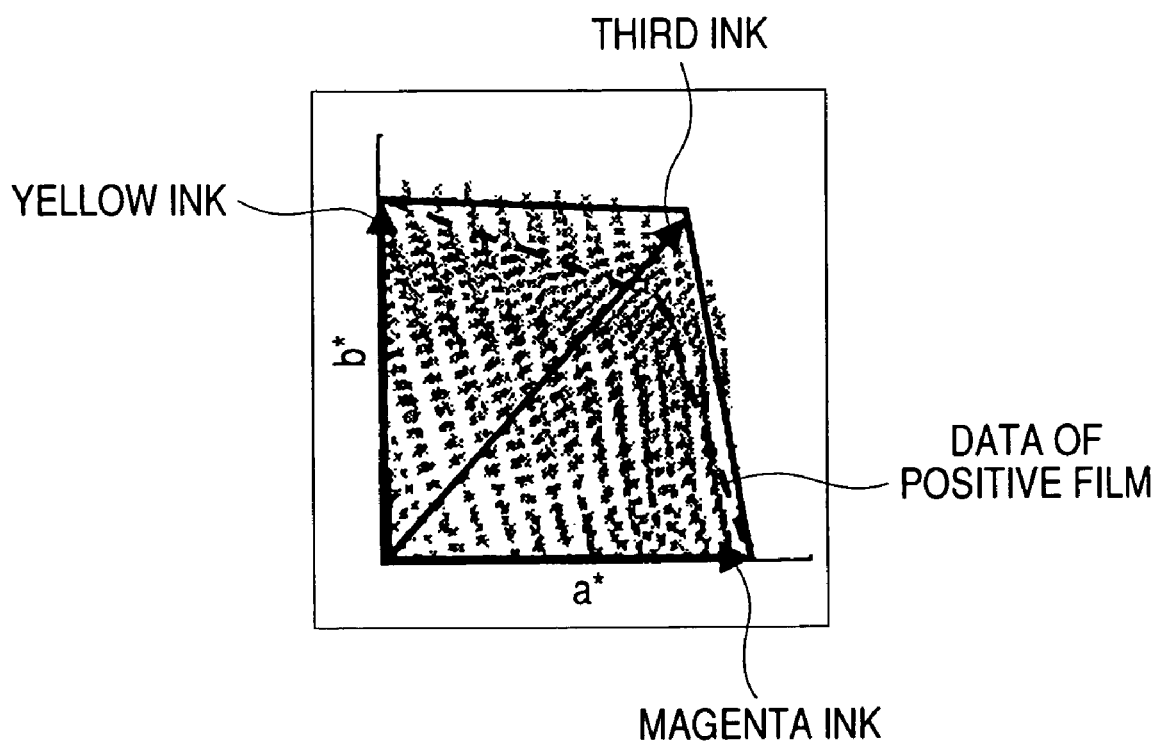
FIG. 3 schematically shows a relationship between a color reproduction region of an ink color basically employed in the present invention and a color reproduction region of a positive film image.

FIG. 3 schematically shows a relationship between a color reproduction region of yellow, magenta, and third inks and a color reproduction region of a positive film image in the a*b* plane of CIE-L*a*b*. In the figure, a range surrounded by a solid line is the color reproduction region represented by the yellow, magenta, and third inks, a range surrounded by a broken line is a color reproduction region represented by the yellow and magenta inks alone, and data acquired from the positive film is indicated by points (x).

As is apparent from FIG. 3, in order to output an image comparable to the positive film image, it is strongly preferable to output colors each having a hue in an orange to red region. However, it is difficult to sufficiently represent such colors with yellow and magenta inks alone. Therefore, as described in Condition 1, a third ink capable of representing a region between hues represented by the yellow and magenta inks is used.

In the present invention, in order to output an image comparable to a positive film with enhanced efficiency, the third ink has a hue angle preferably in the range of 50 to 65° in the a*b* plane. A hue angle within this range is preferable because autumn leaves and sunset can be represented particularly beautifully in a natural image.

Figure 4:
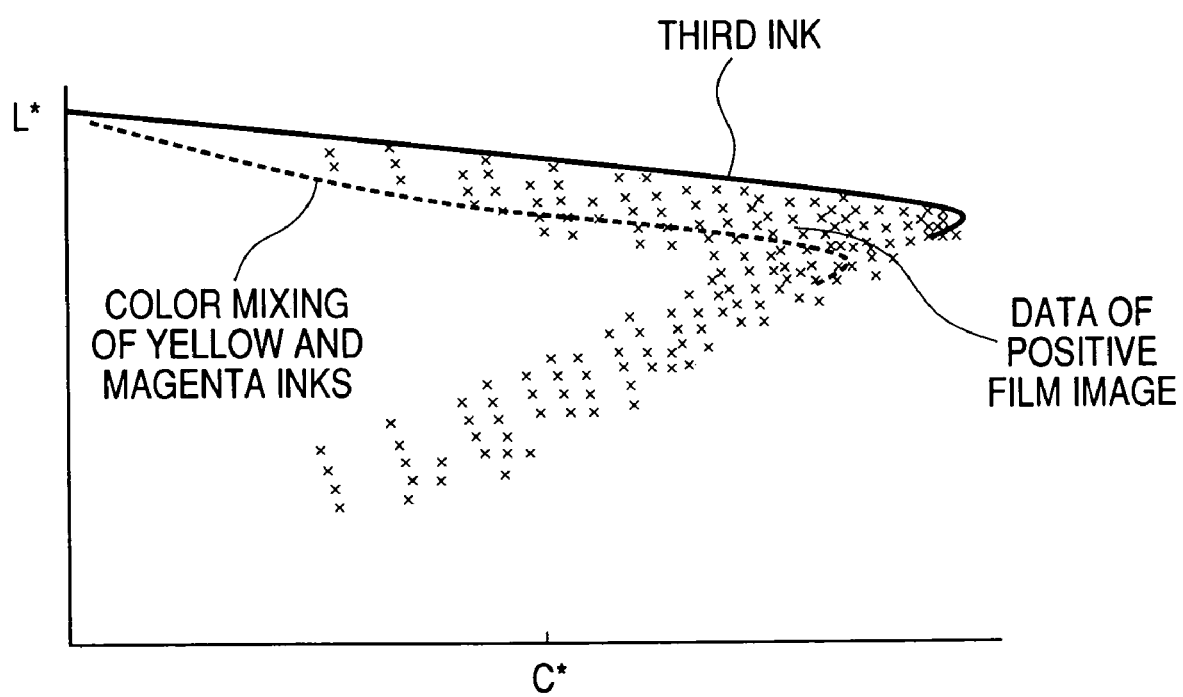
FIG. 4 schematically shows a relationship between lightness and chroma saturation for explaining a condition for selecting or designing an ink color basically employed in the present invention.

FIG. 4 schematically shows a relationship between the lightness (L*) and chroma saturation (c*; $c^* = (a^{*2} + b^{*2})^{1/2}$) of a color formed by color mixing of red as a particular color, yellow, and magenta, or of a color represented by a positive film for explaining the condition. In the figure, a range surrounded by a solid line is the reproduction region represented by the yellow, magenta, and third inks, a range surrounded by a broken line is a reproduction region represented by the yellow and magenta inks alone, and data acquired from the positive film is indicated by points (x). Therefore, the use of an ink capable of representing a color with high lightness improves the vividness of a color in an orange to red region and enables the transparency and stereoscopic effect of a recorded image to be represented. On the other hand, when the lightness is low, only a recorded image lacking in vividness, contrast, and stereoscopic effect can be obtained even though the chroma saturation of the orange to red region widens. Consequently, it becomes difficult to output a target image comparable to the positive film.

As described above, when a color represented by a particular color ink has a specific hue range and a color with high lightness can be represented, a vivid image excellent in transparency and stereoscopic effect like a positive film can be outputted. Furthermore, in the case where the chroma saturation of a color represented by the third ink is higher than that of a color represented by a combination of the yellow and magenta inks, a more preferable embodiment is established.

Next, a description is given of Condition 2.

When a hue angle between a color represented by the yellow ink and a color represented by the magenta ink (hereinafter, referred to as $\theta_{y-m}$) is in the range of 60 to 113° in the a*b* plane, a balance with the hue of a color represented by the third ink becomes suitable. In addition, a color difference between the color represented by the third ink and a color represented by the yellow and magenta inks becomes appropriate. As a result, a color reproduction region can be effectively expanded to smoothly represent continuity of a continuously changing color.

In contrast, when $\theta_{y-m}$ is less than 60°, the hue of yellow or magenta is insufficiently represented, and only the orange to red region widens, so that a balance with another hue is reduced. Therefore, it becomes difficult to sufficiently widen the gamut of the orange to red region by means of the third ink. As a result, the entire color reproduction region narrows. On the other hand, when $\theta_{y-m}$ exceeds 113°, the color reproduction range represented by yellow and magenta narrows, and it becomes difficult to continuously represent a color at a color mixing part with the third ink. As a result, pseudocontour or color skip easily occurs. Therefore, it becomes difficult to fully utilize the excellent color development properties of the third ink. As a result, a color reproduction region of a yellow to magenta region is reduced when outputting a natural image such as a photographic image. Therefore, the deviation of $\theta_{y-m}$ from the above range makes it difficult to output a target image comparable to a positive film.

According to a further preferable embodiment, a hue angle between the color represented by the yellow ink and the color represented by the third ink (hereinafter, referred to as $\theta_{y-r}$) is in the range of 10 to 45° in the a*b* plane, and a hue angle between the color represented by the magenta ink and the color represented by the third ink (hereinafter, referred to as $\theta_{m-r}$) is in the range of 35 to 85° in the a*b* plane. When $\theta_{y-r}$ and $\theta_{m-r}$ fall within those ranges, the color reproduction region from yellow to magenta can be effectively widened by means of the third ink, and continuity of a continuously changing color can be smoothly represented.

In addition, in the present invention, a hue angle of the color represented by the third ink in the a*b* plane is preferably in the range of 50 to 65°. A hue angle represented by the third ink in this range further improves color reproducibility from an orange to red region, and enables color continuity from yellow to magenta to be smoothly represented at an enhanced level.

In the present invention, a hue angle of the color represented by the yellow ink is in the range of preferably 70 to 100°, particularly preferably 75 to 95°. On the other hand, a hue angle of the color represented by the magenta ink is in the range of preferably 25 to 330°, particularly preferably 20 to 340°.

In the present invention, when a cyan ink is additionally used for a basic color, a balance between a color reproduction region of a cyan to yellow region or of a cyan to magenta region and a color reproduction region of a yellow to magenta region becomes suitable. As a result, the yellow to magenta region can be effectively widened by means of the third ink. Therefore, the color reproduction region can be widened in the entire hue region.

In addition, in the case where the lightness (L*) and chroma saturation ($c^*=(a^{*2}+b^{*2})^{1/2}$) of the color represented by the yellow ink are 60 or more and 80 or more, respectively, and the lightness (L*) and chroma saturation ($c^*=(a^{*2}+b^{*2})^{1/2}$) of the color represented by the magenta ink are 35 or more and 70 or more, respectively, the color reproduction region further widens. At the same time, pseudocontour and color skip are further suppressed. As a result, a smooth and beautiful image can be formed. Therefore, this case is preferable.

It should be noted that any one of the hue angle, chroma saturation, and lightness of an ink of each color in the present invention represents a color when an ink application amount per unit area of a recording medium is 7.2±1.2 mg per square inch (reference value).

In addition, addition of an ink of a basic color having another hue such as a cyan ink or a black ink in addition to the yellow ink, the magenta ink, and the third ink in order to obtain a full-color image is a preferable embodiment of the present invention because the addition is effective in widening the color reproduction range of all the hues.

In addition, an image-forming method using an ink and a light ink having the same color tone as that of the former ink in combination can be preferably used because graininess of an intermediate tone is further mitigated and representation of a continuous color is further improved.

Furthermore, the present invention preferably allows an image having a green hue and high lightness to be formed for recording an image of a fresh green view or a bamboo forest view vividly comparable to a positive film image. In addition, the present invention preferably allows an image having a blue or violet hue and high lightness to be formed for recording an image of a blue sky view or an ocean view vividly comparable to a positive film image.

To achieve the above objects, a third condition and a fourth condition described below is preferably satisfied in addition to the first and second conditions to form an image. The third condition is that a fifth ink capable of representing a color having a higher lightness than that of a color reproduction region represented by the yellow and cyan inks is used together with the yellow, magenta, and cyan inks. The fourth condition is that a sixth ink capable of representing a color having a higher lightness than that of a color reproduction region represented by the magenta and cyan inks is used together with the yellow, magenta, and cyan inks.

More specifically, the third and fourth conditions are as follows.

Condition 3: A color represented on a recording medium by the fifth recording agent on a color space of CIE-L*a*b* has a higher lightness than that of a color reproduction region represented on the recording medium by a combination of the yellow recording agent and the cyan recording agent, and has a hue angle in the color reproduction region.

Condition 4: A color represented on a recording medium by the sixth recording agent on a color space of CIE-L*a*b* has a higher lightness than that of a color reproduction region represented on the recording medium by a combination of the magenta recording agent and the cyan recording agent, and has a hue angle in the color reproduction region.

In the present invention, a hue angle of the color represented by the cyan ink is in the range of preferably 220 to 260°, particularly preferably 230 to 250°. In addition, a hue angle of the color represented by the fifth ink is in the range of preferably 100 to 220°, particularly preferably 110 to 210°. Furthermore, a hue angle of the color represented by the sixth ink is in the range of preferably 260 to 330°, particularly preferably 270 to 320°.

It should be noted that the hue angle, chroma saturation, and lightness of each of those inks also represent a color when an ink application amount per unit area of a recording medium is 7.2±1.2 mg per square inch (reference value) as described above.

Exemplified below is a print system as a subject of application of the present invention, the print system using inks of 7 colors consisting of: cyan, magenta, and yellow inks as basic color inks; a black ink; an ink of red, which is a particular color, as the third ink; a light cyan ink; and a light magenta ink.

(Outline of Print System)

Figure 5:
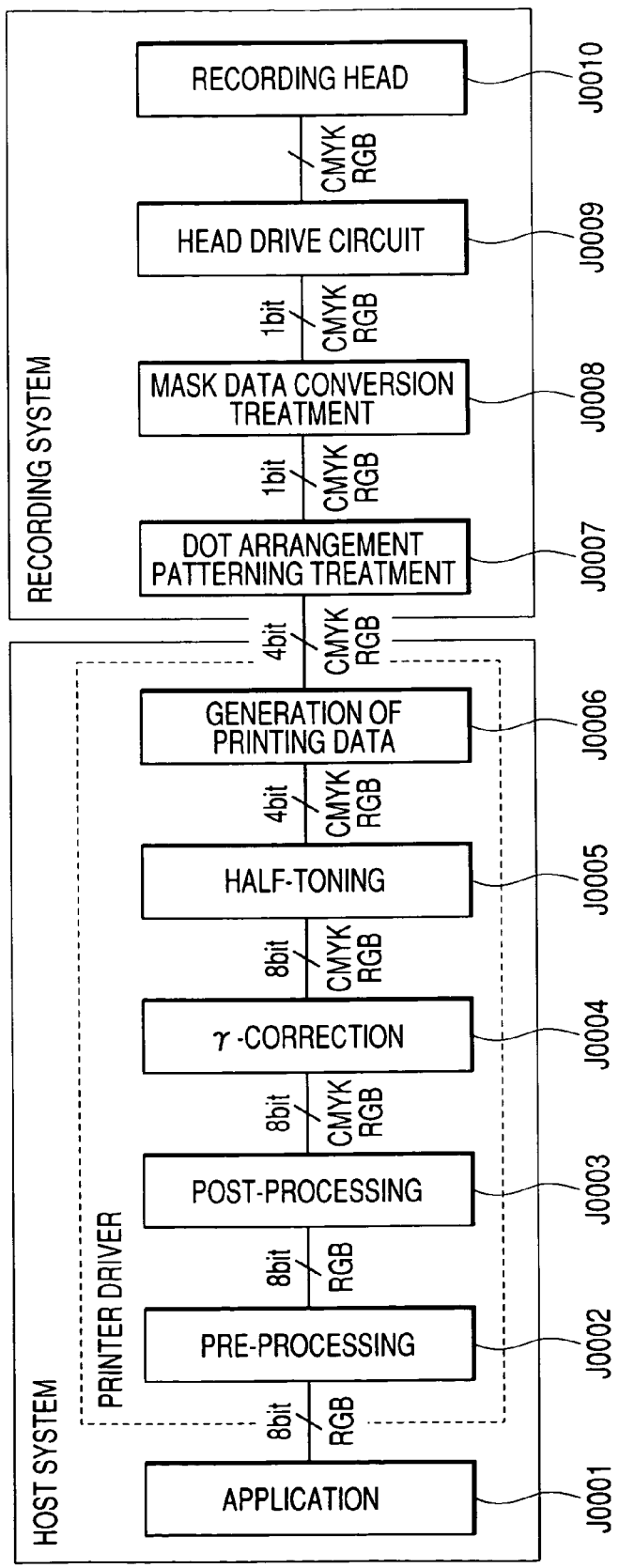
FIG. 5 is a block diagram showing a configuration of a print system according to an embodiment of the present invention.

FIG. 5 is a block diagram showing a configuration of a print system as an example of a subject of application of the present invention. Since the image-forming apparatus of this embodiment is for performing printing by using the above inks of 7 colors, a recording head for discharging the inks of 7 colors is used. As shown in FIG. 5, the print system of this embodiment includes a recording system as an image-forming apparatus and a personal computer (PC) as a host system.

Examples of a program operating on the operating system of the host system include an application and a printer driver. An application J0001 executes processing for generating image data to be printed by the printer. The image data or the data before being subjected to editing or the like can be captured into the PC through various media. The PC of this embodiment can first capture, for example, image data in JPEG format taken with a digital camera through a compact flash (CF) card. The PC can also capture, for example, image data in the TIFF format read with a scanner and image data stored in a CD-ROM. Furthermore, the PC can capture data on the web via the Internet. Those captured pieces of data are displayed on the monitor of the PC and subjected to editing, processing, and the like through the application J0001 to generate, for example, image data R, G, and B of the sRGB standard. Then, the image data is passed to the printer driver in response to a printing instruction.

The processing of the printer driver of this embodiment includes pre-processing J0002, post-processing J0003, γ-correction J0004, half-toning J0005, and generation of printing data J0006. The pre-processing J0002 maps the gamut. The pre-processing J0002 of this embodiment uses a three-dimensional LUT together with an interpolation operation to convert the 8-bit image data R, G, and B into the data R, G, and B in a gamut of the printer. The three-dimensional LUT is such that a gamut reproduced by the image data R, G, and B of the sRGB standard is mapped into the gamut reproduced by the printer of the present print system. The post-processing J0003 performs processing based on the data R, G, and B, the gamut of which has been mapped, to determine color separation data Y, M, C, K, R, Lc, and Lm corresponding to a combination of inks reproducing the color represented by the data R, G, and B, that is, yellow, magenta, cyan, black, red, light cyan, and light magenta. In this embodiment, this processing is performed by using the three-dimensional LUT together with an interpolation operation as in the case of the pre-processing. The γ-correction J0004 performs gradation value conversion on data for each color in the color separation data determined by the post-processing J0003. More specifically, conversion is performed such that a one-dimensional LUT corresponding to the gradation properties of each color ink of the printer to be used in the present system is used to make the color separation data linearly compliant to the gradation properties of the printer. The half-toning J0005 performs quantization for converting each of the 8-bit color separation data Y, M, C, K, R, Lc, and Lm into 4-bit data. In this embodiment, 8-bit data is converted into 4-bit data by using an error diffusion method. The 4-bit data provides an index for showing an arrangement pattern in a dot arrangement patterning treatment in the recording system. Finally, the processing for generation of printing data J0006 adds printing control information to the printing image data containing the 4-bit data as its content to generate printing data. It should be noted that the processing of the application and the printer driver described above is executed by the CPU according to their programs. At that time, the programs are read from a ROM or a hard disk before use. In addition, a RAM is used as a work area when the processing is executed.

The recording system performs a dot arrangement patterning treatment J0007 and a mask data conversion treatment J0008 for the data processing. The dot arrangement patterning treatment J0007 performs dot arrangement according to a dot arrangement pattern corresponding to 4-bit index data (gradation value information) as the printing image data for each pixel corresponding to an actual printed image. A dot arrangement pattern corresponding to the gradation value of each pixel represented by 4-bit data is assigned to the pixel in this way, whereby dot ON/OFF is defined for each of multiple areas in the pixel. In addition, discharge data of "1" or "0" is arranged on each area in one pixel. 1-bit discharge data thus obtained is subjected to a mask treatment by the mask data conversion treatment J0008. That is, discharge data for each scanning for completing recording of a scanning region having a predetermined width through repeated scanning by means of a recording head is generated by a treatment using a mask corresponding to each scanning. The discharge data Y, M, C, K, R, Lc, and Lm for each scanning is sent to a head drive circuit J0009 at an appropriate timing, whereby a recording head J0010 is driven to discharge each ink according to the discharge data. The dot arrangement patterning treatment or the mask data conversion treatment described above in the recording system is performed by using a hardware circuit dedicated to the treatment under the control of the CPU constituting the control unit of the recording system. Each of those treatments may be executed by the CPU according to the program. Alternatively, each of the treatments may be performed by, for example, the printer driver in the PC. As will be apparent from the following description, the embodiments of those treatments do not affect the application of the present invention.

The printer of this embodiment described above uses an ink of red, which is a particular color, as the third ink. The particular color ink is capable of representing a color having a higher lightness than that of a color having the same hue as that of the color represented by the particular color ink out of the secondary colors formed by color mixing of yellow and magenta inks as basic color inks. That is, a "particular color" that can be preferably used in the present invention refers to a color having a higher lightness than that of a color reproduction region represented on a recording medium by a combination of any two of the magenta recording agent, the yellow recording agent, and the cyan recording agent in the color space of CIE-L*a*b*, and having a hue angle in the color reproduction region represented by the combination of the two recording agents. A color capable of representing a higher chroma saturation than that of the color reproduction region can be more preferably used.

In the case where a green color material is used as a fifth color material and a blue color material is used as a sixth color material, yellow, magenta, cyan, black, red, light cyan, and light magenta described above are simply changed to yellow, magenta, cyan, black, red, blue, and green, respectively, and the color separation data Y, M, C, K, R, G, and B corresponding to these colors is obtained. Therefore, the same holds true for this case.

The printer of this embodiment uses as particular colors, for example, red, green, and blue, so that a color can be represented, which has a higher lightness than that of a color having the same hue as that of the color out of the secondary colors formed by color mixing of two of yellow, magenta, and cyan inks as basic color inks. That is, a "particular color" that can be preferably used in the present invention refers to a color having a higher lightness than that of a color reproduction region represented on a recording medium by a combination of any two of the magenta recording agent, the yellow recording agent, and the cyan recording agent as basic colors in the color space of CIE-L*a*b*, and having a hue angle in the color reproduction region represented by the combination of the two recording agents. A color capable of representing a higher chroma saturation than that of the color reproduction region can be more preferably used.

In this embodiment, an image-forming apparatus using ink as a recording agent is described. However, it is obvious that the present invention can also be applied to an image-forming apparatus according to an offset printing method, a gravure printing method, an electrophotographic printing method, or the like, such as a printer or copying machine using another recording agent such as toner, except the description specific to the ink.

In addition, in the present specification, inks as recording agents are represented by "words" like cyan, magenta, yellow, and black whereas a color, data for that color, or a hue of that color is represented by an uppercase alphabetic character such as C, M, Y, K, R, or G or by a combination of an uppercase alphabetic character and a lowercase alphabetic character. That is, C represents a cyan color, data for that color, or a hue of that color. Similarly, M represents a magenta color, data for that color, or a hue of that color. Y represents a yellow color, data for that color, or a hue of that color. K represents a black color, data for that color, or a hue of that color. R represents a red color, data for that color, or a hue of that color. Lc represents a light cyan color, data for that color, or a hue of that color. Lm represents a light magenta color, data for that color, or a hue of that color. G represents a fifth color, data for that color, or a hue of that color. B represents a sixth color, data for that color, or a hue of that color.

In the configuration of the print system described above, when a third recording agent (ink) is used, processing is preferably performed such that a yellow recording agent (ink) and/or a magenta recording agent (ink) is/are applied to a pixel to which the third ink is applied for enhancing the expressive power for a continuous color. That is, when pixel data corresponding to the colors in the gamuts of yellow and magenta is outputted, the pixel data preferably contains data for at least one of yellow and magenta as well as the data for the third ink. More specifically, even in the case where, in converting 8-bit RGB data into 8-bit CMYKRGB data and outputting the converted data in the post-processing J0003, the third recording agent alone suffices for reproduction of a color represented by the RGB data that has not been converted yet, the system is configured in such a way that not only R data but also Y data and/or M data are outputted unlike the above description where only R data is outputted.

With this configuration, it becomes possible to widen the color reproduction region with enhanced efficiency to thereby enhance the expressive power for graininess of an intermediate tone or for a continuous color. In particular, pseudocontour and color skip are further suppressed for gradation ranging from a highlight part to a shadow part and for a change of color from skin color to dark red or orange. The configuration is particularly preferable for the case where a hue changes from yellow to magenta or vice versa with respect to the hue angle of a color represented by the third ink because an image can be smoothly represented with enhanced efficiency.

In the above description, the third ink and the yellow ink and/or the magenta ink are recorded while being overlapped (superimposed). The superimposition refers to a state where the yellow and/or magenta ink dots completely overlap the dot position of the third ink as well as to a state where the dots partly overlap the position.

Exemplified in this embodiment is the case where the processing for applying the third ink and the yellow ink and/or the magenta ink to the same pixel is performed in the stage of the post-processing J0003. However, the present invention is not limited to this case.

For example, control may be performed in such a way that ink discharge is performed so that the yellow and/or magenta ink dots are superimposed on the dot of the third ink and recorded in any one of the stages starting from a binarization treatment and ending with head driving. More specifically, in some approaches, binarized data for yellow and/or magenta ink/inks (for example, binarized Y data) is generated on the basis of binarized data for a particular color ink (for example, binarized R data) aside from binarized data for yellow and/or magenta ink/inks generated through the post-processing J0003 or the half-toning J0005 (for example, binarized Y data).

According to this configuration, the yellow and/or magenta ink/inks can be certainly applied to all the pixels to which the third ink is applied. Alternatively, control may be performed in such a way that the yellow and/or magenta ink/inks can be applied to only a part of the pixels to which the third ink is applied.

In the present invention, both the yellow and magenta inks are preferably applied to all the pixels to which the third ink is applied.

(Schematic Configuration of Mechanism Part of Image-Forming Apparatus)

A description is given of a schematic configuration of a mechanism part of an ink jet recording system to be used as an image-forming apparatus in this embodiment. In order that each mechanism may play its own role, the main body of the recording system in this embodiment is constituted of: a sheet feeding portion; a sheet transporting portion; a carriage portion; a sheet discharging portion; a cleaning portion; and an exterior portion for protecting these portions and providing them with designability. Hereinafter, the outlines of those portions will be described.

Figure 6:
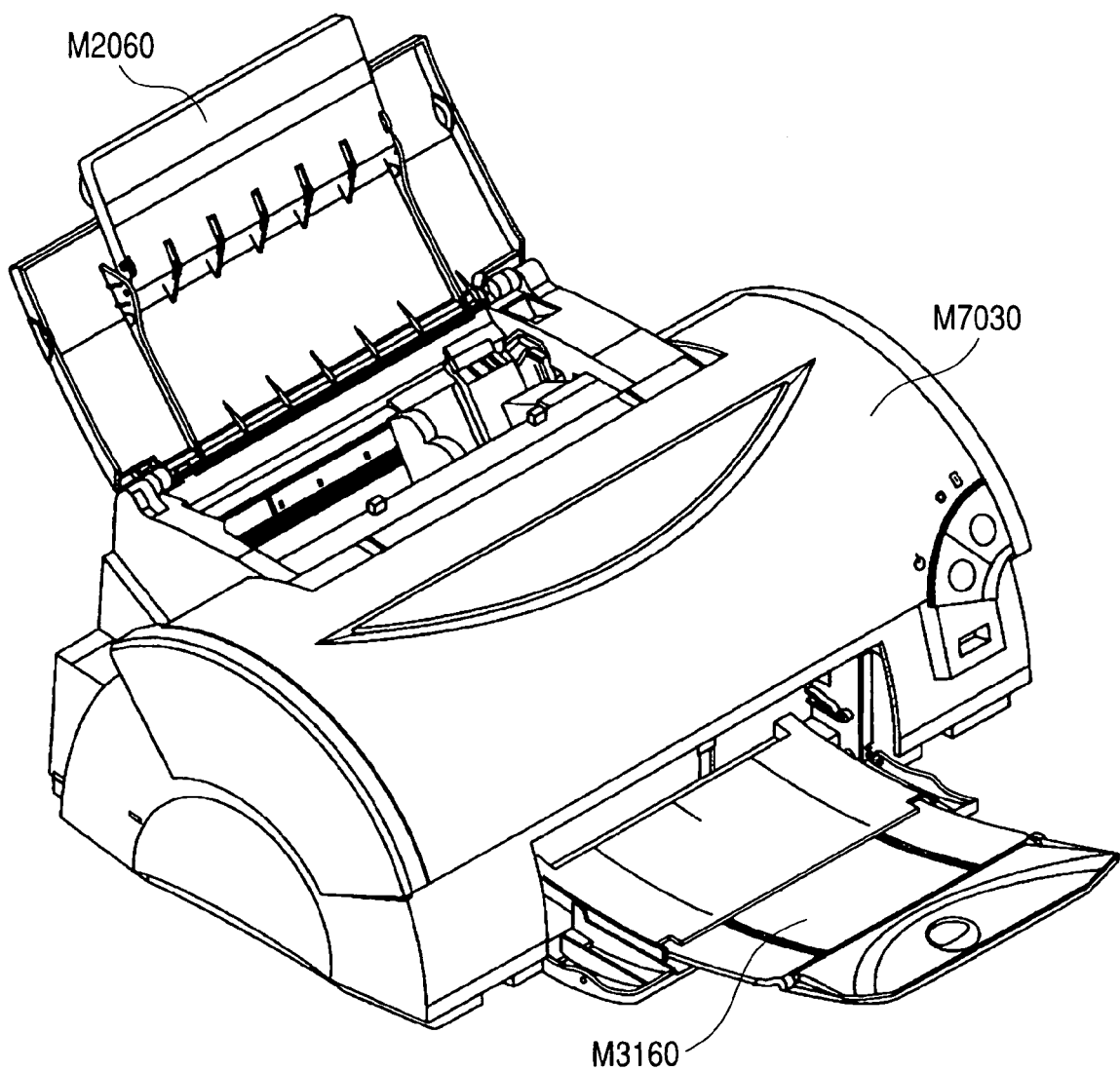
FIG. 6 is a perspective view of a recording system in the embodiment of the present invention.
Figure 7:
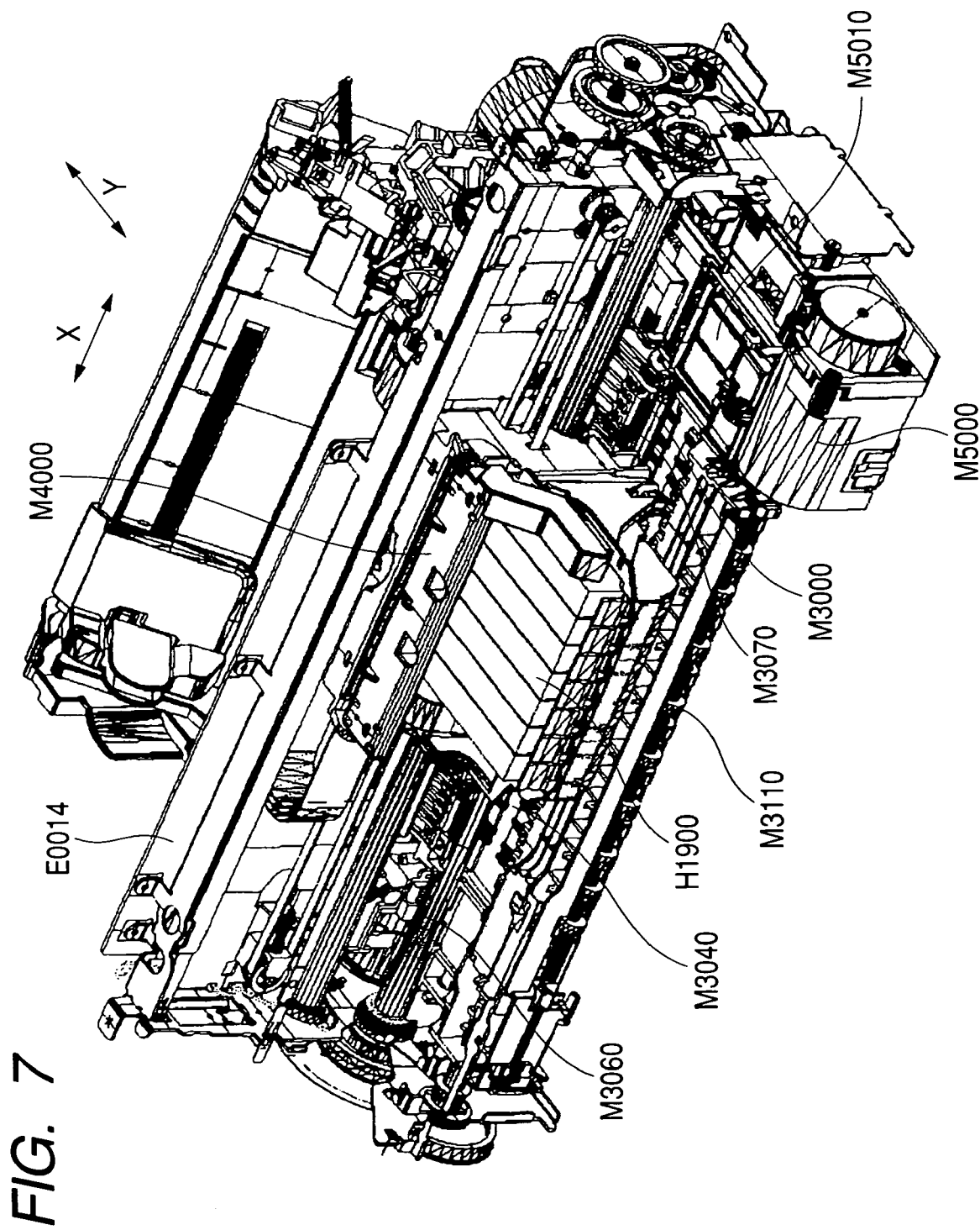
FIG. 7 is a perspective view of a mechanism part of the recording system in the embodiment of the present invention.
Figure 8:
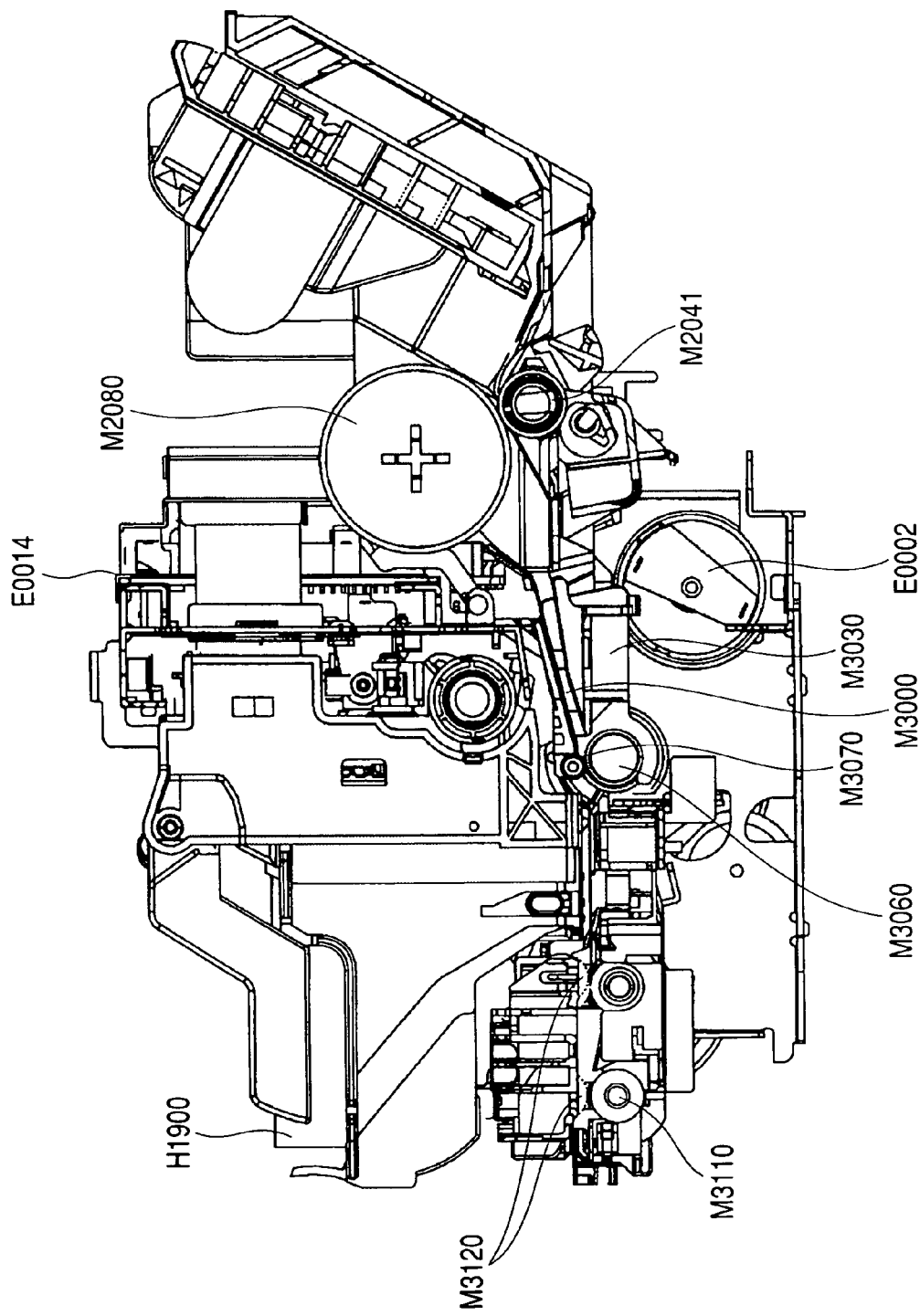
FIG. 8 is a cross sectional view of the recording system in the embodiment of the present invention.

FIG. 6 is a perspective view of a recording system to be applied to this embodiment. FIGS. 7 and 8 are each a diagram for explaining an internal mechanism of the recording system main body. FIG. 7 is a perspective view of the recording system main body when viewed from an upper right portion while FIG. 8 is a side sectional view of the recording system main body.

In performing sheet feeding in the recording system to be applied to this embodiment, at first, only a predetermined number of recording media are fed to a nip portion constituted of a sheet feeding roller M2080 and a separating roller M2041 at the sheet feeding portion including a sheet feeding tray M2060. The fed recording media are separated at the nip portion, and only the top recording medium is fed to the sheet transporting portion. The recording medium fed to the sheet transporting portion is guided by a pinch roller holder M3000 and a paper guide flapper M3030 and transported to a roller pair constituted of a transporting roller M3060 and a pinch roller M3070. The roller pair constituted of the transporting roller M3060 and the pinch roller M3070 is rotated by driving of an LF motor E0002. The recording medium is transported on a platen M3040 by the rotation.

At the carriage portion, in forming an image on a recording medium, a recording head H1001 (FIG. 9) is placed at a target image formation position to discharge ink onto the recording medium according to a signal from an electric substrate E0014. A detailed configuration of the recording head H1001 will be described later. In the recording system of this embodiment, recording main scanning, in which a carriage M4000 scans in the column direction while the recording head H1001 performs recording, and sub scanning, in which the recording medium is transported in the row direction by the transporting roller M3060, are alternately repeated to form an image on the recording medium.

Finally, at the sheet discharging portion, the recording medium on which an image has been formed is pinched at a nip between a first sheet discharging roller M3110 and a spur M3120, and is then transported to be discharged to a sheet discharging tray M3160.

In the cleaning portion, for the purpose of cleaning the recording head H1001 before and after the image recording, unnecessary ink or the like is vacuumed up from the recording head H1001 when a pump M5000 is allowed to act while a cap M5010 is allowed to closely contact an ink discharge opening of the recording head H1001. In addition, special consideration is given to prevent adhesion of ink remaining on the cap M5010 and a detrimental effect involved in the adhesion by sucking the remaining ink while the cap M5010 is opened.

(Configuration of Recording Head)

A configuration of a head cartridge H1000 to be applied to the above recording system will be described.

The head cartridge H1000 in this embodiment includes: the recording head H1001; means for mounting ink tanks H1900; and means for supplying ink from the ink tanks H1900 to the recording head, and is detachably mounted on the carriage M4000.

Figure 9:
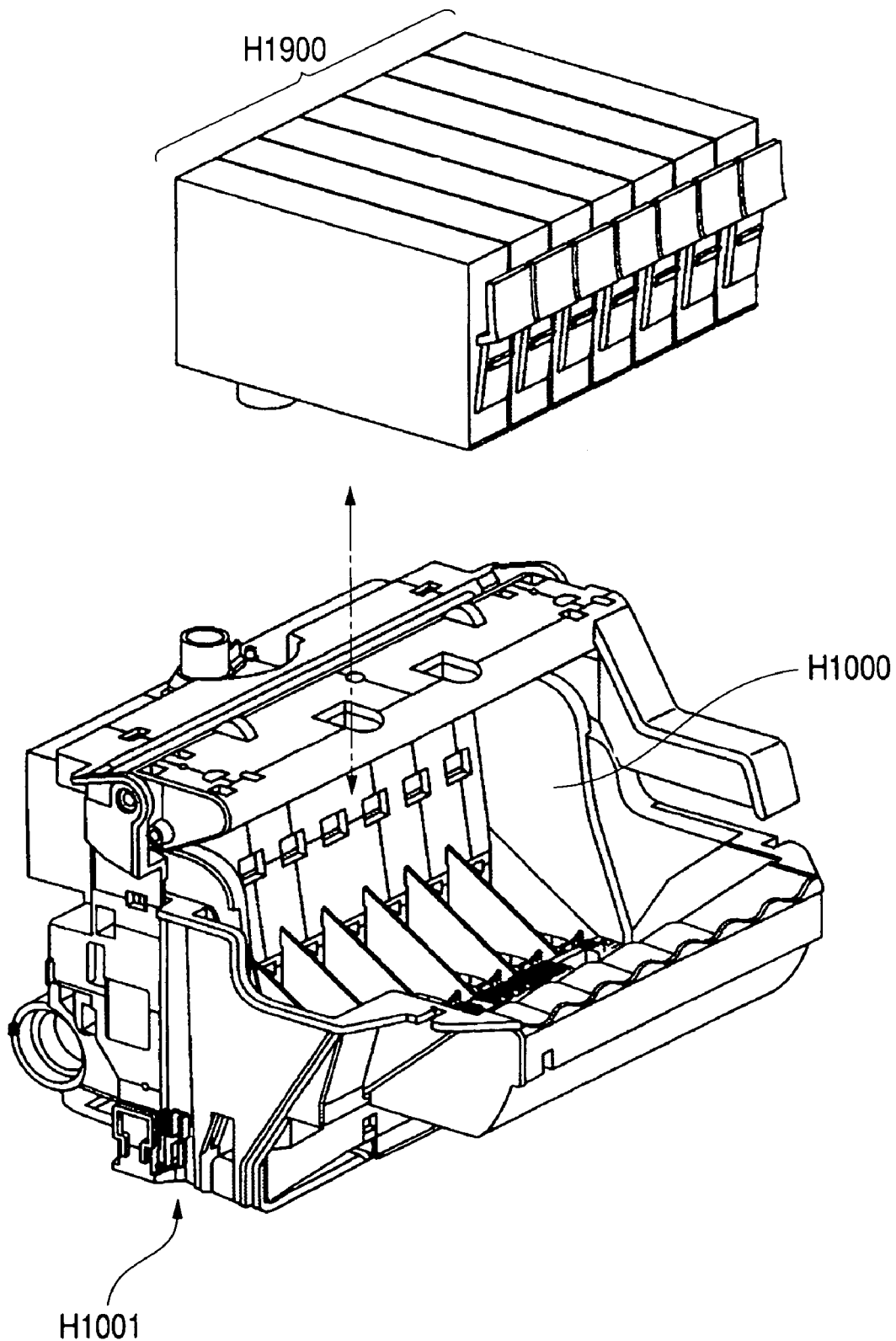
FIG. 9 is a perspective view showing a state where ink tanks are mounted on a head cartridge applied to the embodiment of the present invention.

FIG. 9 is a diagram showing a state where the ink tanks H1900 are mounted on the head cartridge H1000 to be applied to this embodiment. The recording system of this embodiment forms an image by means of 7 color inks, that is, a cyan ink, a magenta ink, a yellow ink, a black ink, a third ink, a light cyan ink, and a light magenta ink, or 7 color inks, that is, a cyan ink, a magenta ink, a yellow ink, a black ink, and third, fifth, and sixth inks. Therefore, the ink tanks H1900 are independently prepared for the 7 color inks. In addition, as shown in this figure, each tank is detachable/attachable from/to the head cartridge H1000. The detachment/attachment of the ink tanks H1900 can be performed while the head cartridge H1000 is mounted on the carriage M4000.

Figure 10:
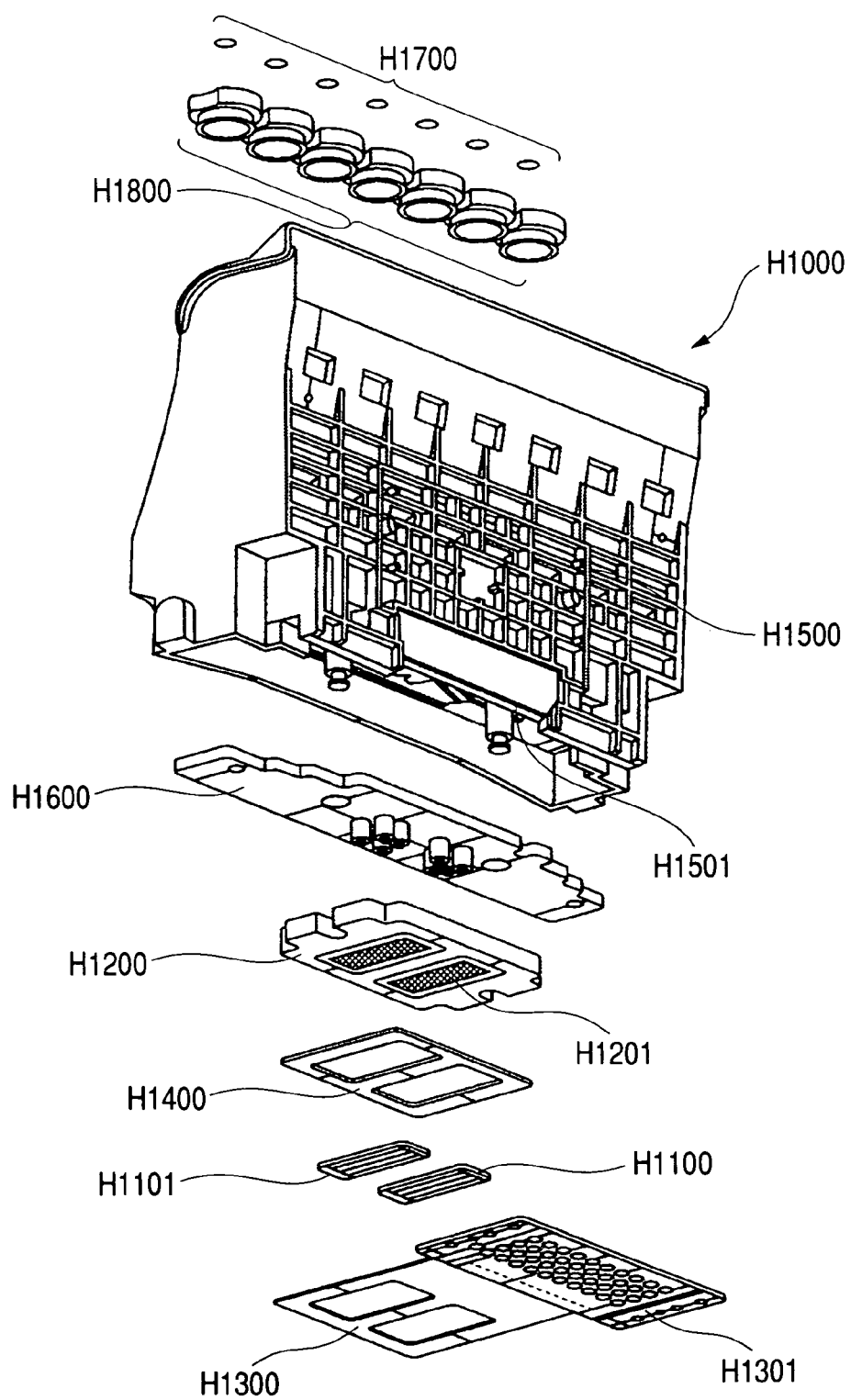
FIG. 10 is an exploded perspective view of the head cartridge applied to the embodiment of the present invention.

FIG. 10 is an exploded perspective view of the head cartridge H1000. In the figure, the head cartridge H1000 includes: a first recording element substrate H3600; a second recording element substrate H3601; a first plate H1200; a second plate H1400; an electric wiring substrate H1300; a tank holder H1500; a flow path forming member H1600; a filter H1700; and seal rubbers H1800.

In this embodiment, inks form the ink tanks H1900 prepared for 7 colors are distributed to 7 or 9 nozzle strings, and the respective inks are distributed to the first and second recording element substrates H3600 and H3601 in which the respective nozzle strings are formed.

Each of the first recording element substrate H3600 and the second recording element substrate H 3601 is a Si substrate, and multiple recording elements (nozzles) for discharging ink are formed by a photolithography technique on one surface of the substrate. Electric wiring of Al or the like for supplying electric power to each recording element is formed by a film formation technique, and multiple ink flow paths corresponding to the respective recording elements are also formed by the photolithography technique. The electric wiring substrate H1300 applies electric signals for discharging ink from the respective nozzles formed in a first recording element substrate H1100 and a second recording element substrate H1101. The electric wiring substrate H1300 includes: electric wiring corresponding to each of the first recording element substrate H1100 and the second recording element substrate H1101; and an external signal input terminal H1301 that is placed at an end portion of the electric wiring to receive an electric signal from the recording system main body. Furthermore, ink supply openings H1201 for supplying ink to the multiple ink flow paths are formed so as to open on the back surface of the first plate H1200.

Figure 11:
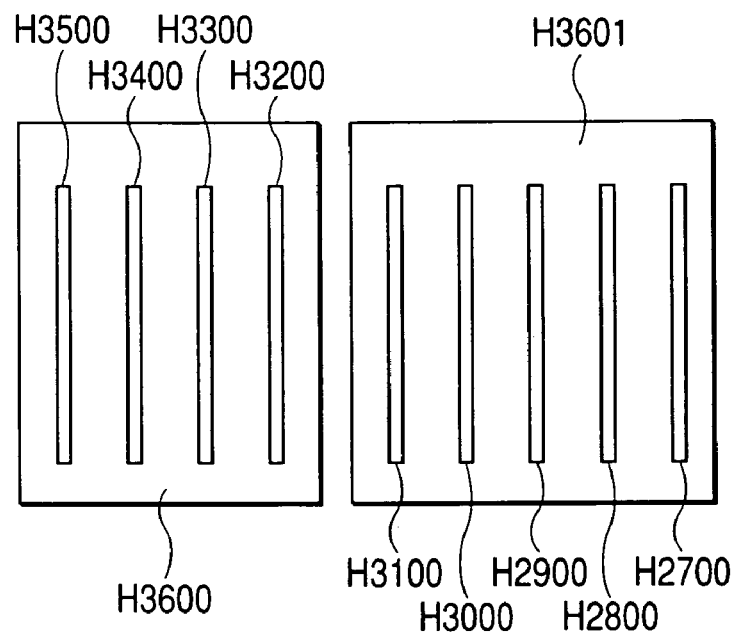
FIG. 11 is a front view of a recording element substrate in the head cartridge applied to the embodiment of the present invention.

FIG. 11 is an enlarged front view for explaining a configuration of each of the first recording element substrate H3600 and the second recording element substrate H3601 in this embodiment. Symbols H2700 to H3500 denote nozzle strings corresponding to different ink colors or to the same ink color. Nozzle strings for 4 colors are formed on the first recording element substrate H3600: a nozzle string H3200 through which the light cyan ink is supplied, a nozzle string H3300 through which the black ink is supplied, a nozzle string H3400 through which the third ink is supplied, and a nozzle string H3500 through which the light magenta ink is supplied.

5 nozzle strings for 3 colors are formed on the second recording element substrate H3601: 2 nozzle strings H2700 and H3100 through which the cyan ink is supplied, 2 nozzle strings H2800 and H3000 through which the magenta ink is supplied, and a nozzle string H2900 through which the yellow ink is supplied. In addition, the magenta and cyan nozzle strings are aligned on each side with respect to the nozzle string H2900 for the yellow ink as a center so that the magenta (cyan) nozzle string on one side and the magenta (cyan) nozzle string on the other side are symmetric with respect to the center.

Each nozzle string is constituted of 768 nozzles arranged in a recording medium transporting direction at an interval of 1,200 dpi (dot/inch; reference value), and discharges about 2 pl of ink droplets. An opening area at each nozzle discharge opening is set to about 100 $\mu m^2$.

Symmetric arrangement of the cyan, magenta, and yellow nozzle strings with respect to the scanning direction of the carriage M4000 as described above has an effect of reducing a detrimental effect on an image such as color unevenness in performing bidirectional printing with the carriage M4000. The color unevenness is mainly caused by a difference in color developability occurring when the order of colors of inks impinging on a recording medium differs. As far as 2 magenta nozzle strings (or 2 cyan nozzle strings) are formed symmetrically with respect to the nozzle string H2900 for the yellow ink as in this embodiment, the order of inks impinging on the recording medium can be unique by switching a nozzle string to be used between the forward path and return path of a print operation. Therefore, this embodiment is characterized in that a high-quality image can be formed bidirectionally at a high speed.

It is preferable that the nozzle strings for all the 7 colors used are symmetrically arranged. However, the symmetric arrangement involves an enlarged apparatus, an increased cost, and complication of data processing. Therefore, in this embodiment, only the nozzle strings for the three colors that contribute to color unevenness at the time of bidirectional printing to a large extent, that is, cyan, magenta, and yellow, are symmetrically arranged.

In an ink flow path H1501 of this embodiment, each of a flow path for a cyan ink and a flow path for a magenta ink is bifurcated in midstream, and is capable of distributing, to 2 nozzle strings, ink supplied from one ink tank.

Figure 12:
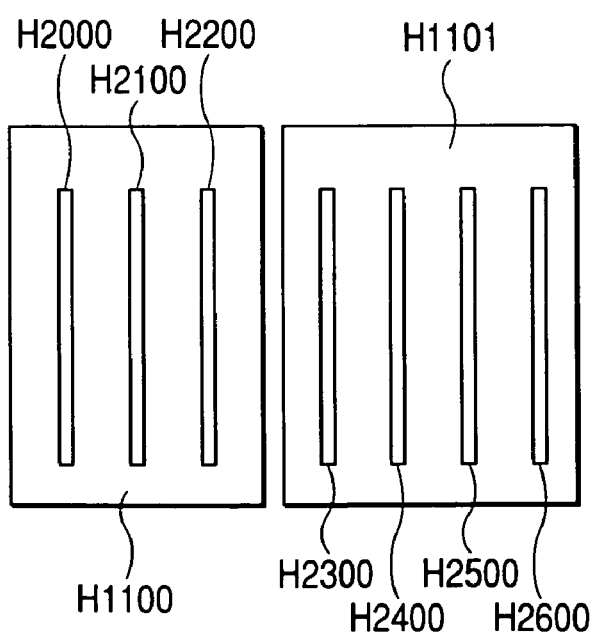
FIG. 12 is a front view of a recording element substrate in the head cartridge applied to the embodiment of the present invention.
Figure 13:
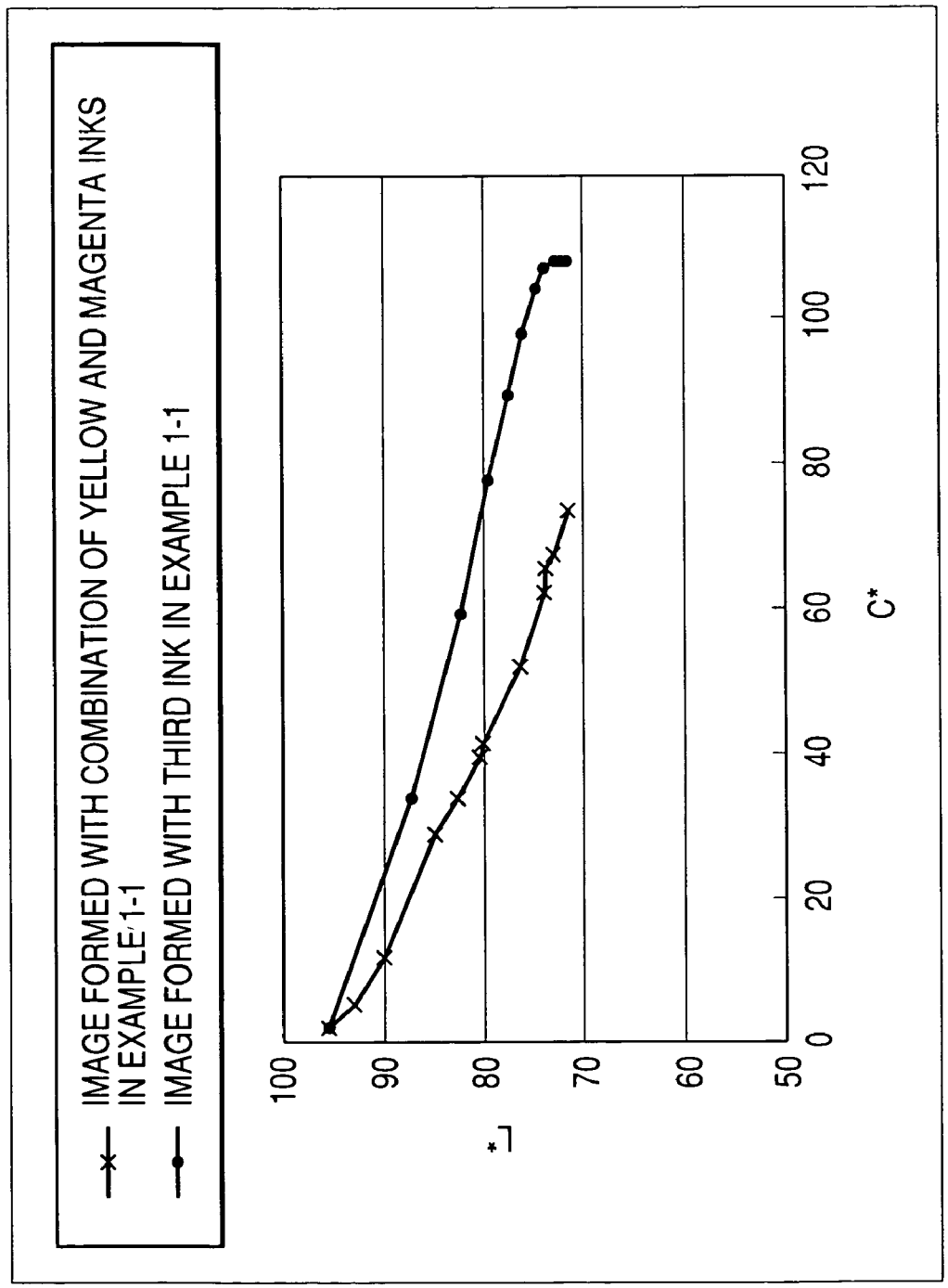
FIG. 13 is a diagram showing a relationship between lightness and chroma saturation when a yellow ink, a magenta ink, and a third ink are used in Example 1-1.
Figure 14:
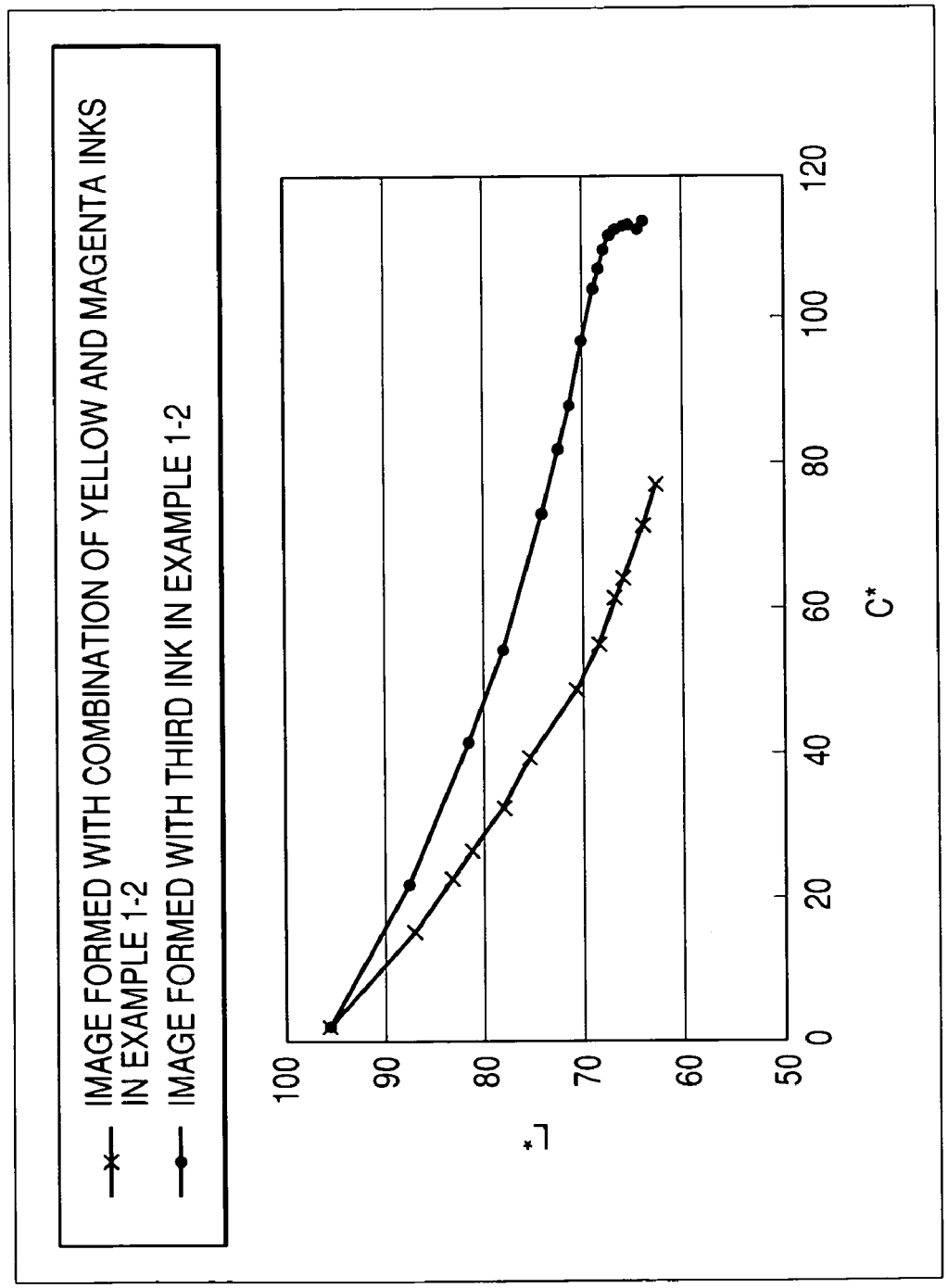
FIG. 14 is a diagram showing a relationship between lightness and chroma saturation when the yellow ink, the magenta ink, and the third ink are used in Example 1-2.
Figure 15:
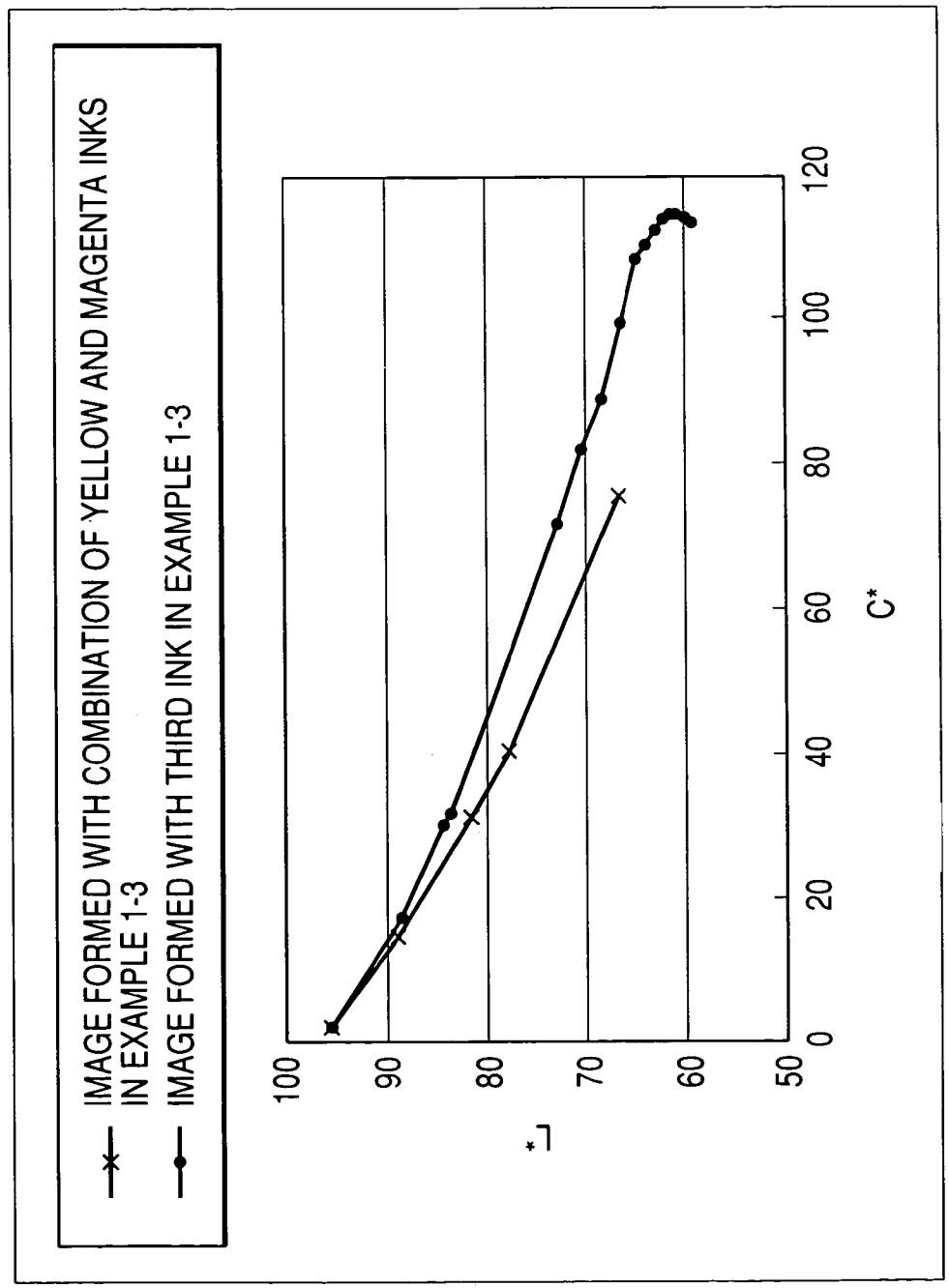
FIG. 15 is a diagram showing a relationship between lightness and chroma saturation when the yellow ink, the magenta ink, and the third ink are used in Example 1-3.
Figure 16:
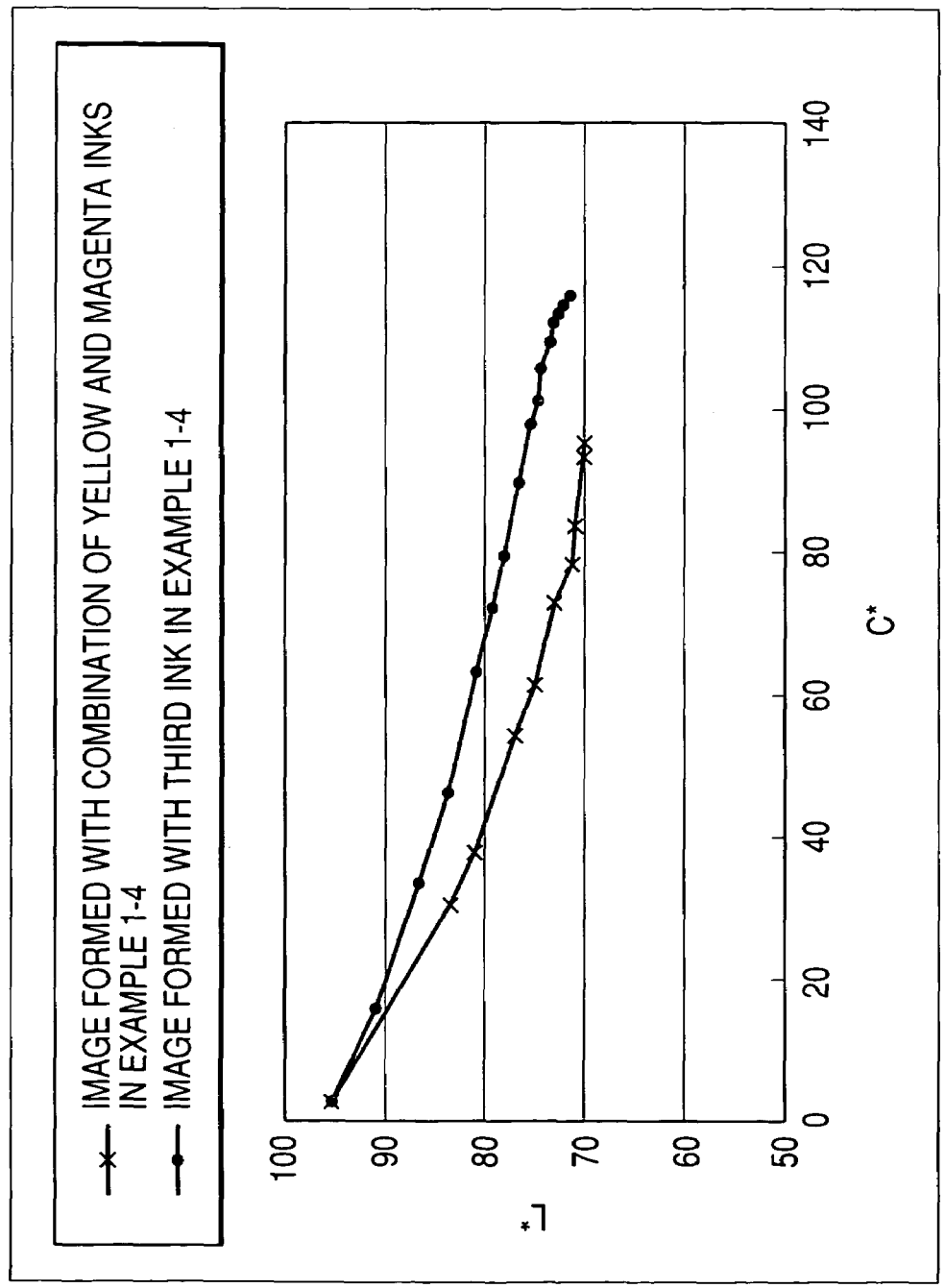
FIG. 16 is a diagram showing a relationship between lightness and chroma saturation when the yellow ink, the magenta ink, and the third ink are used in Example 1-4.
Figure 17:
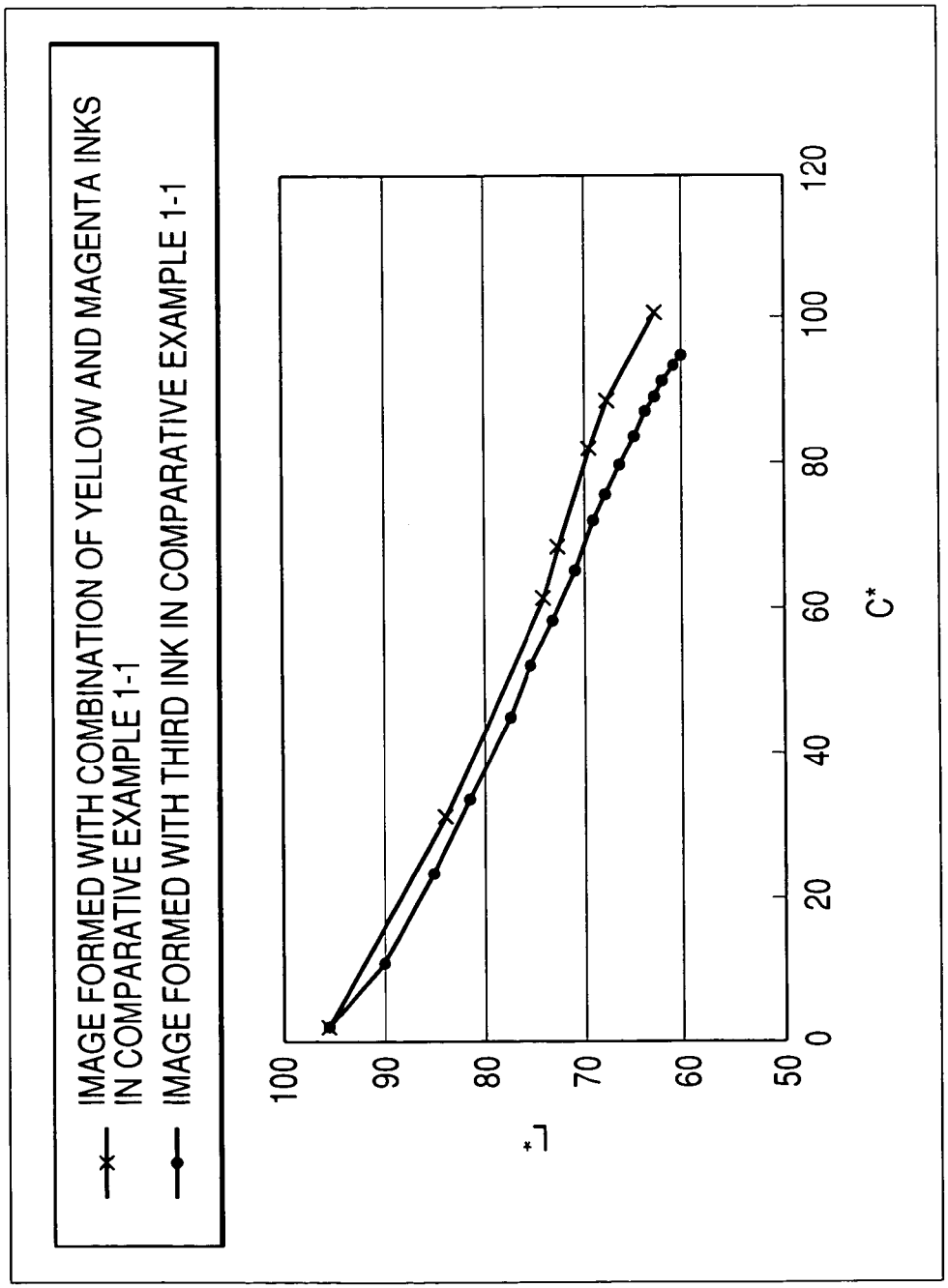
FIG. 17 is a diagram showing a relationship between lightness and chroma saturation when the yellow ink, the magenta ink, and the third ink are used in Comparative Example 1-1.
Figure 18:
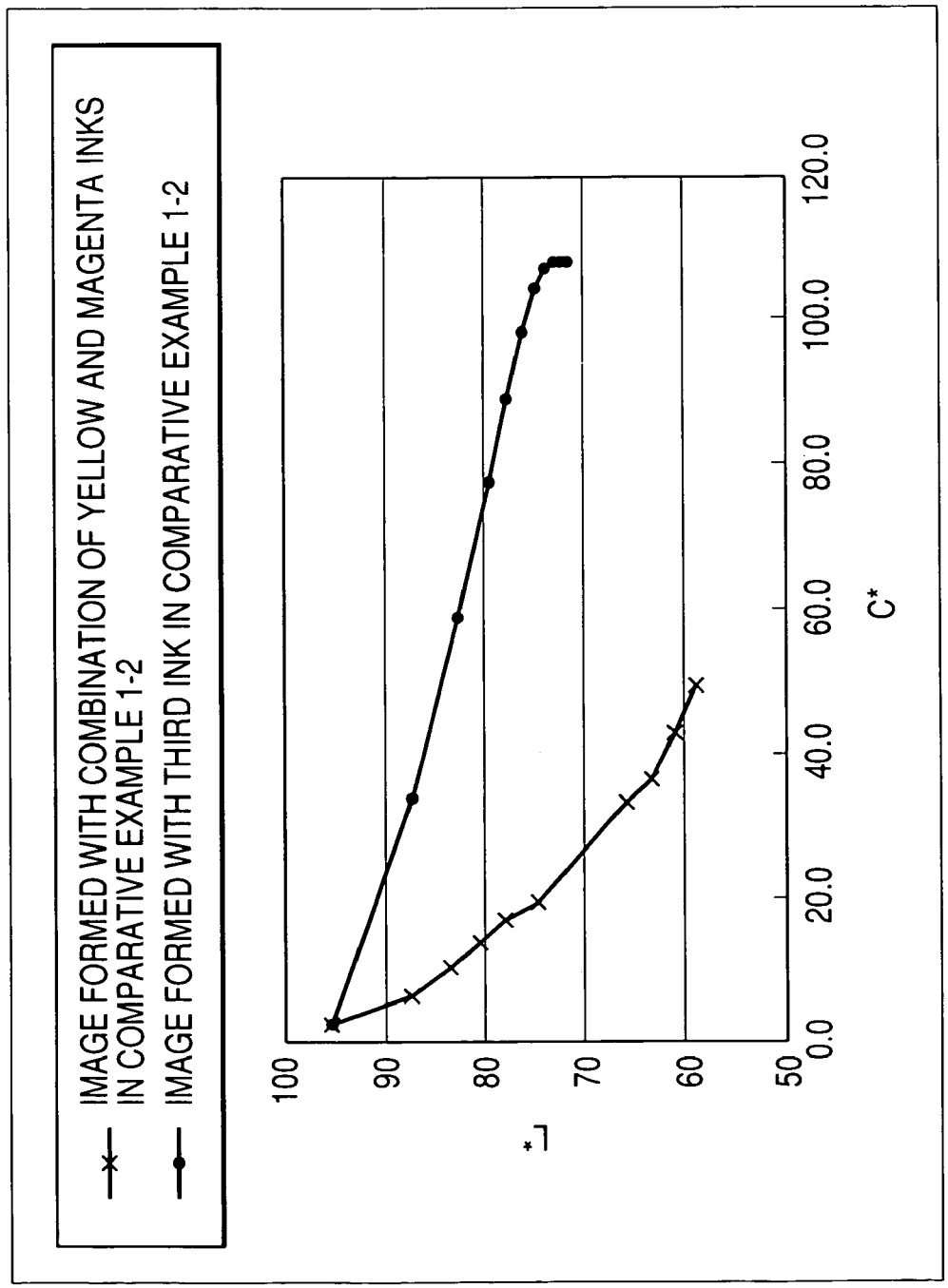
FIG. 18 is a diagram showing a relationship between lightness and chroma saturation when the yellow ink, the magenta ink, and the third ink are used in Comparative Example 1-2.
Figure 19:
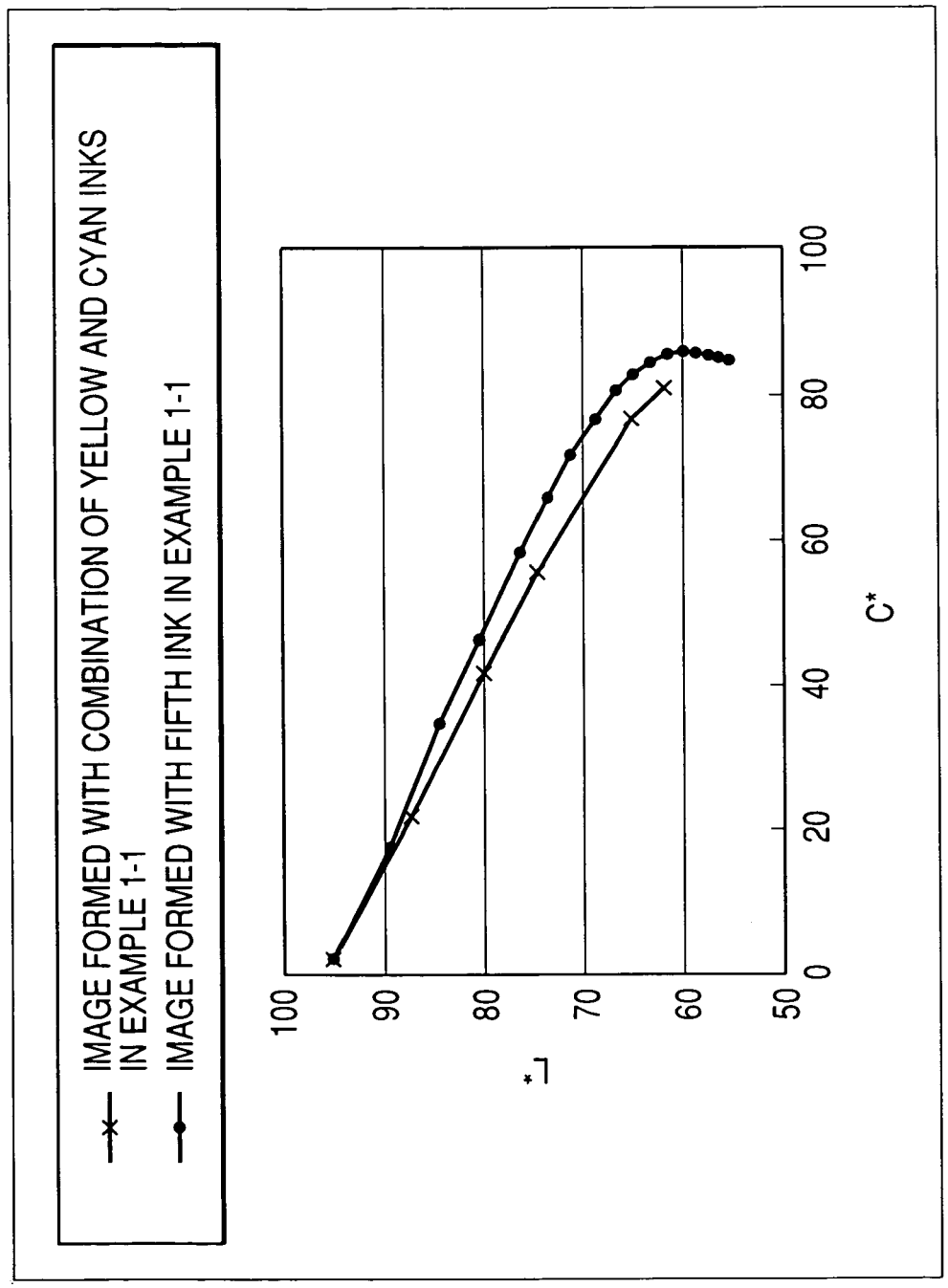
FIG. 19 is a diagram showing a relationship between lightness and chroma saturation when the yellow ink, a cyan ink, and a fifth ink are used in Example 1-1.
Figure 20:
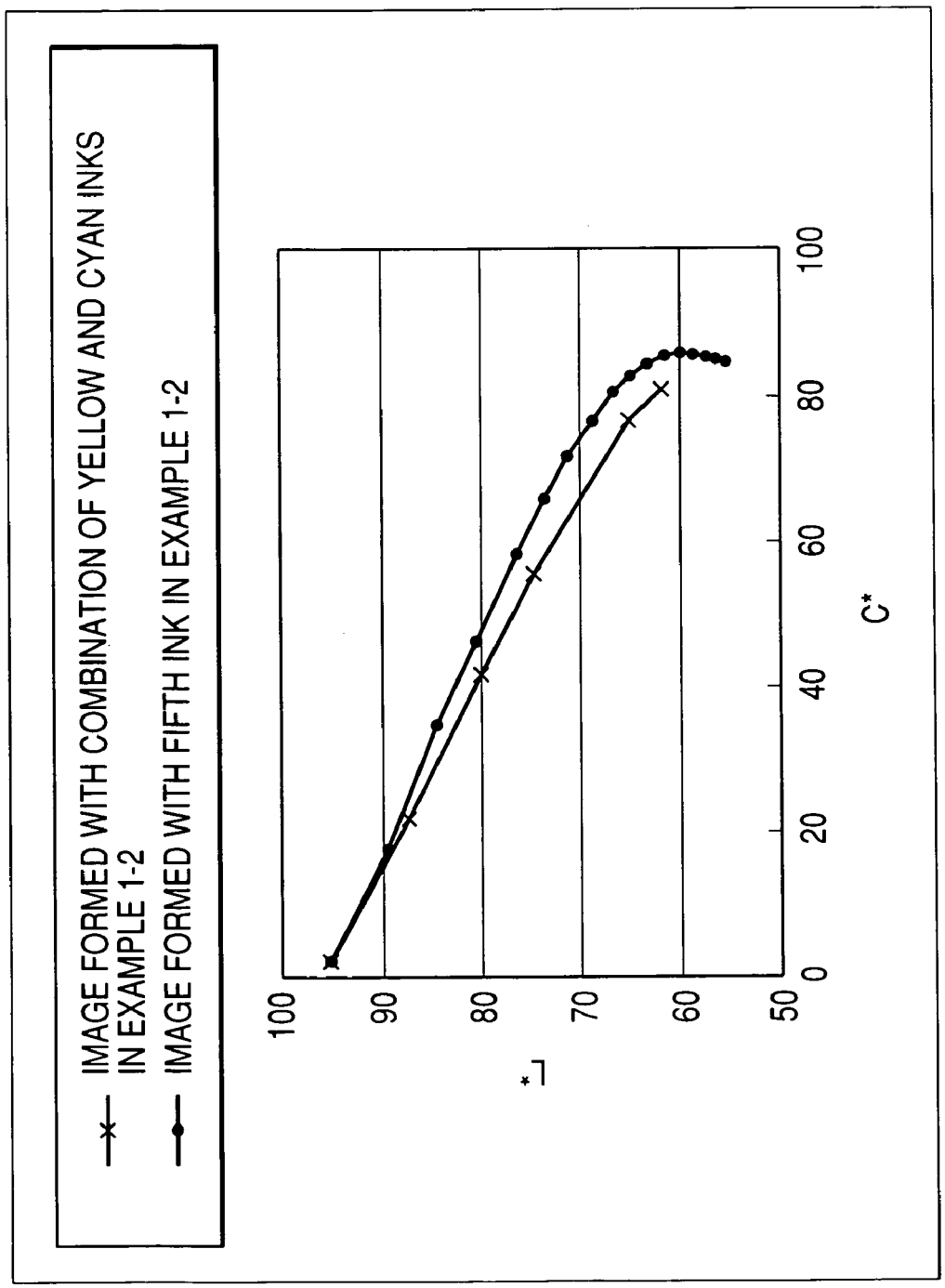
FIG. 20 is a diagram showing a relationship between lightness and chroma saturation when the yellow ink, the cyan ink, and the fifth ink are used in Example 1-2.
Figure 21:
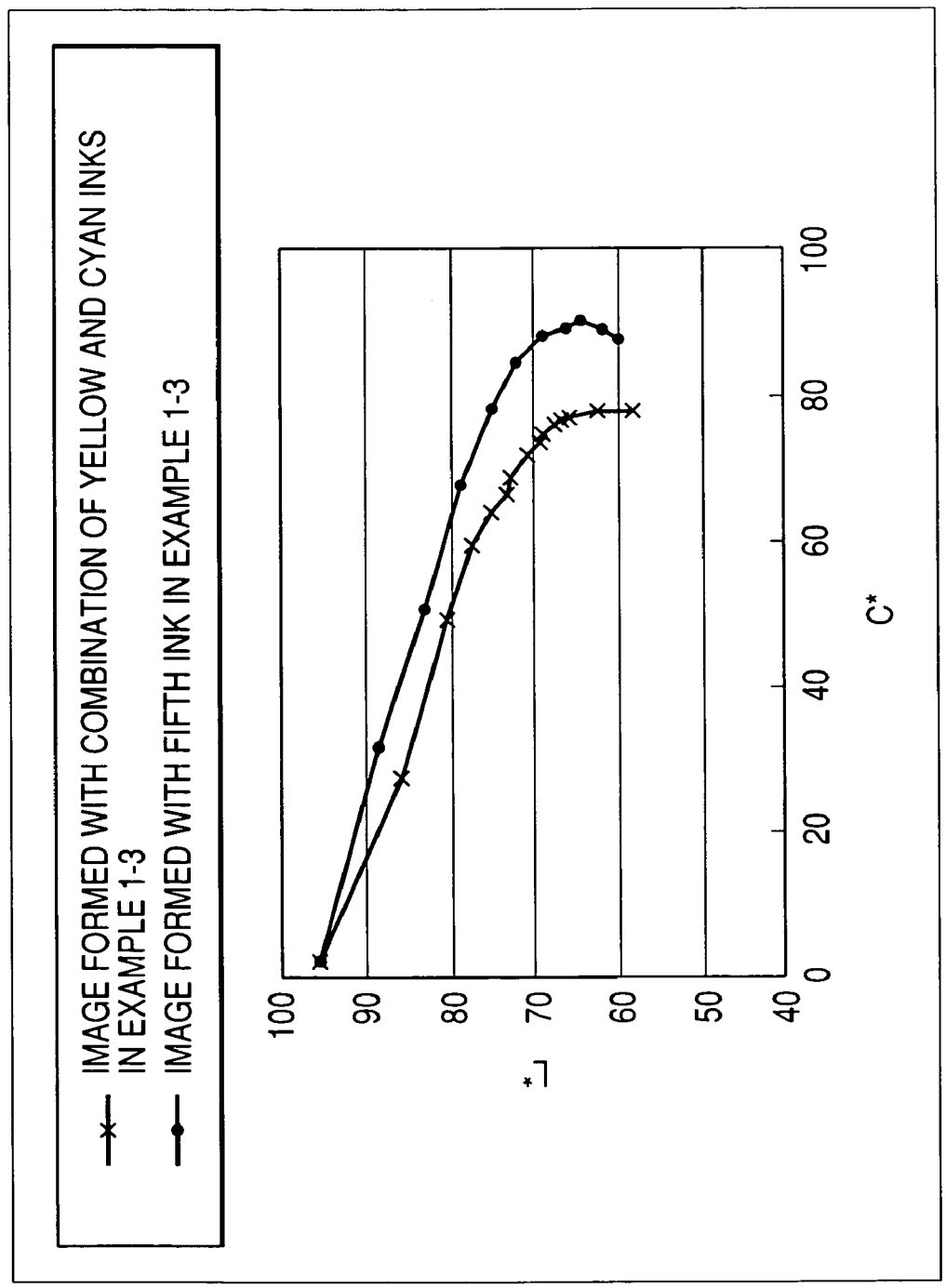
FIG. 21 is a diagram showing a relationship between lightness and chroma saturation when the yellow ink, the cyan ink, and the fifth ink are used in Example 1-3.
Figure 22:
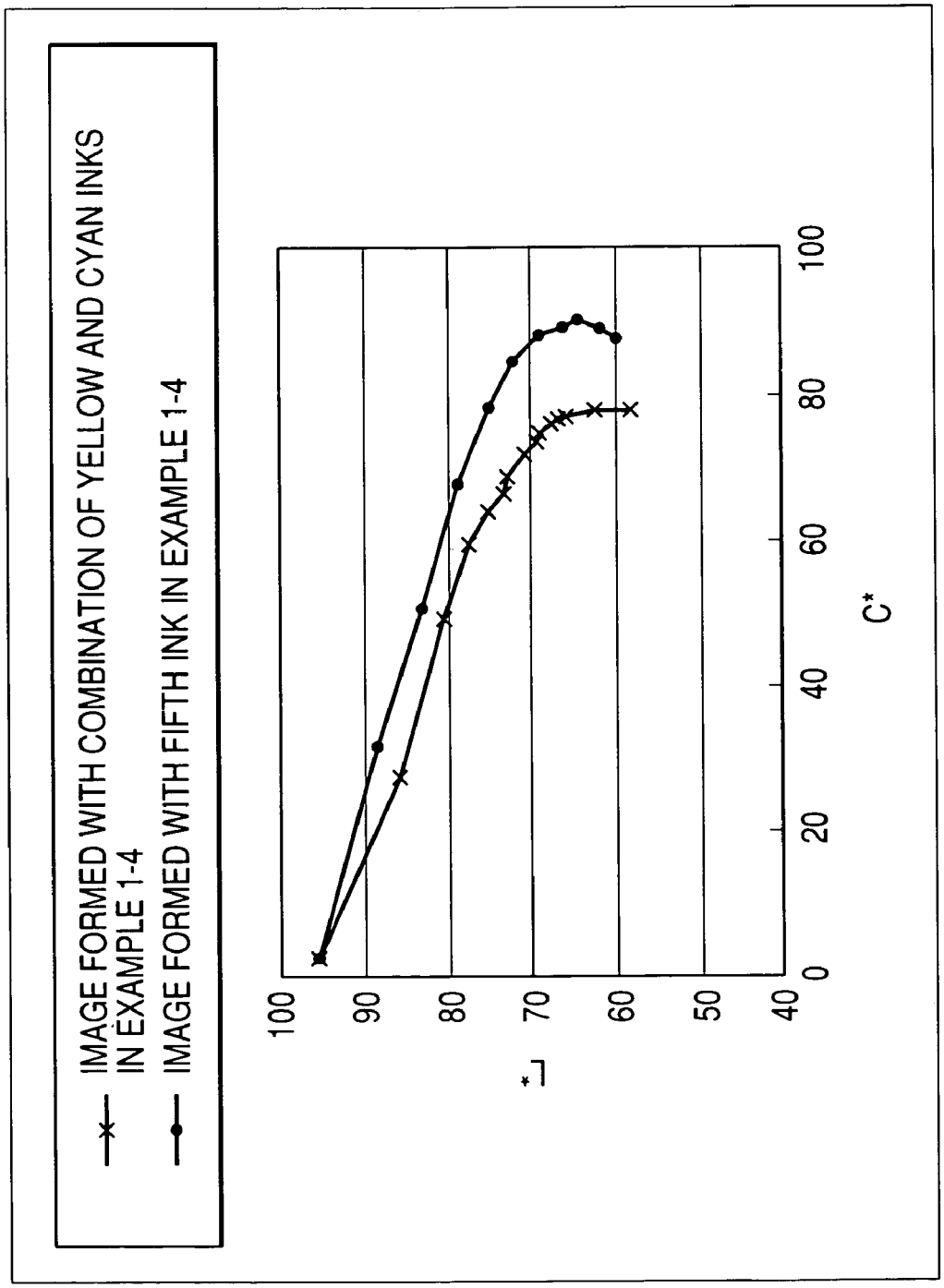
FIG. 22 is a diagram showing a relationship between lightness and chroma saturation when the yellow ink, the cyan ink, and the fifth ink are used in Example 1-4.
Figure 23:
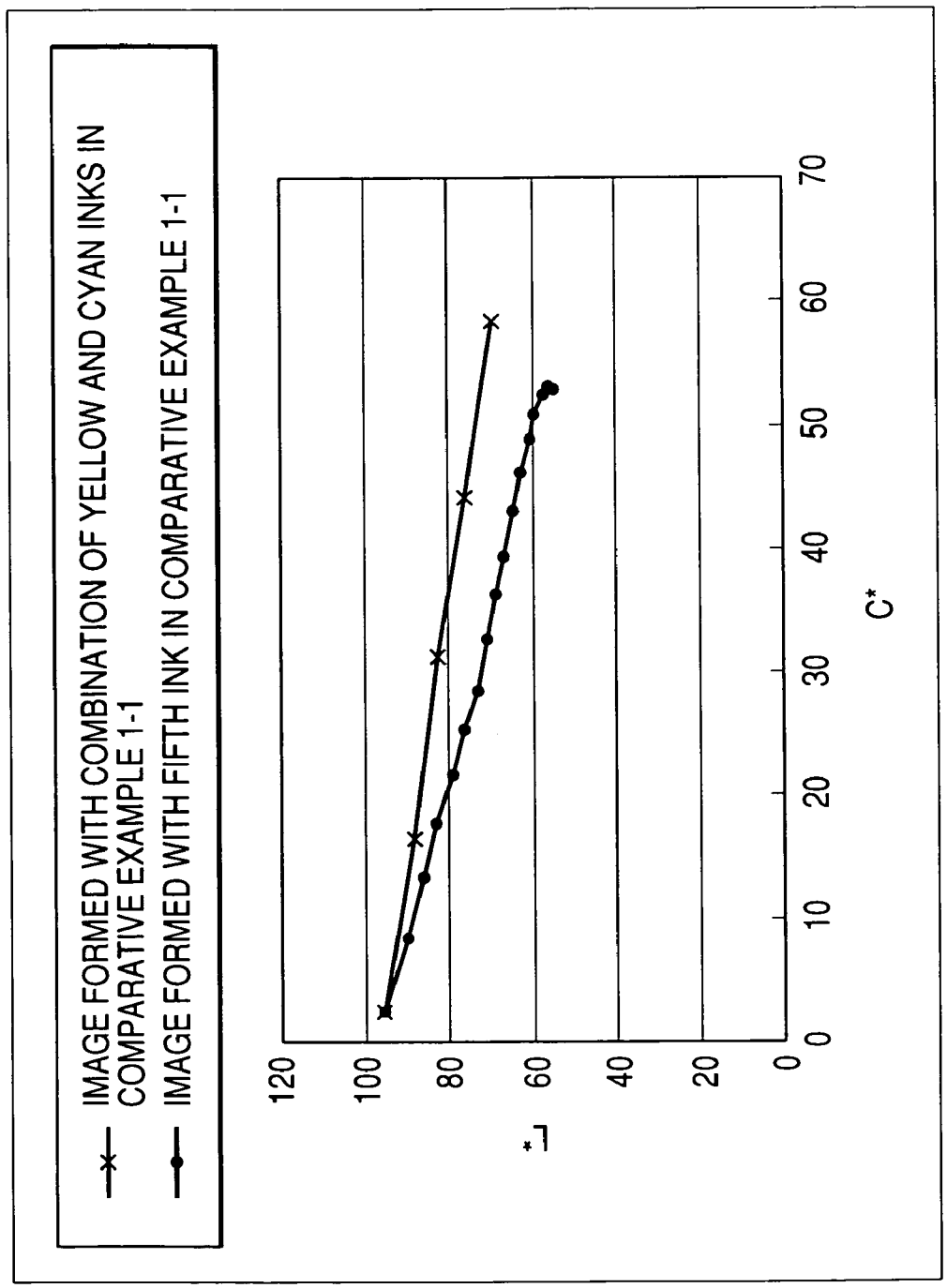
FIG. 23 is a diagram showing a relationship between lightness and chroma saturation when the yellow ink, the cyan ink, and the fifth ink are used in Comparative Example 1-1.
Figure 24:
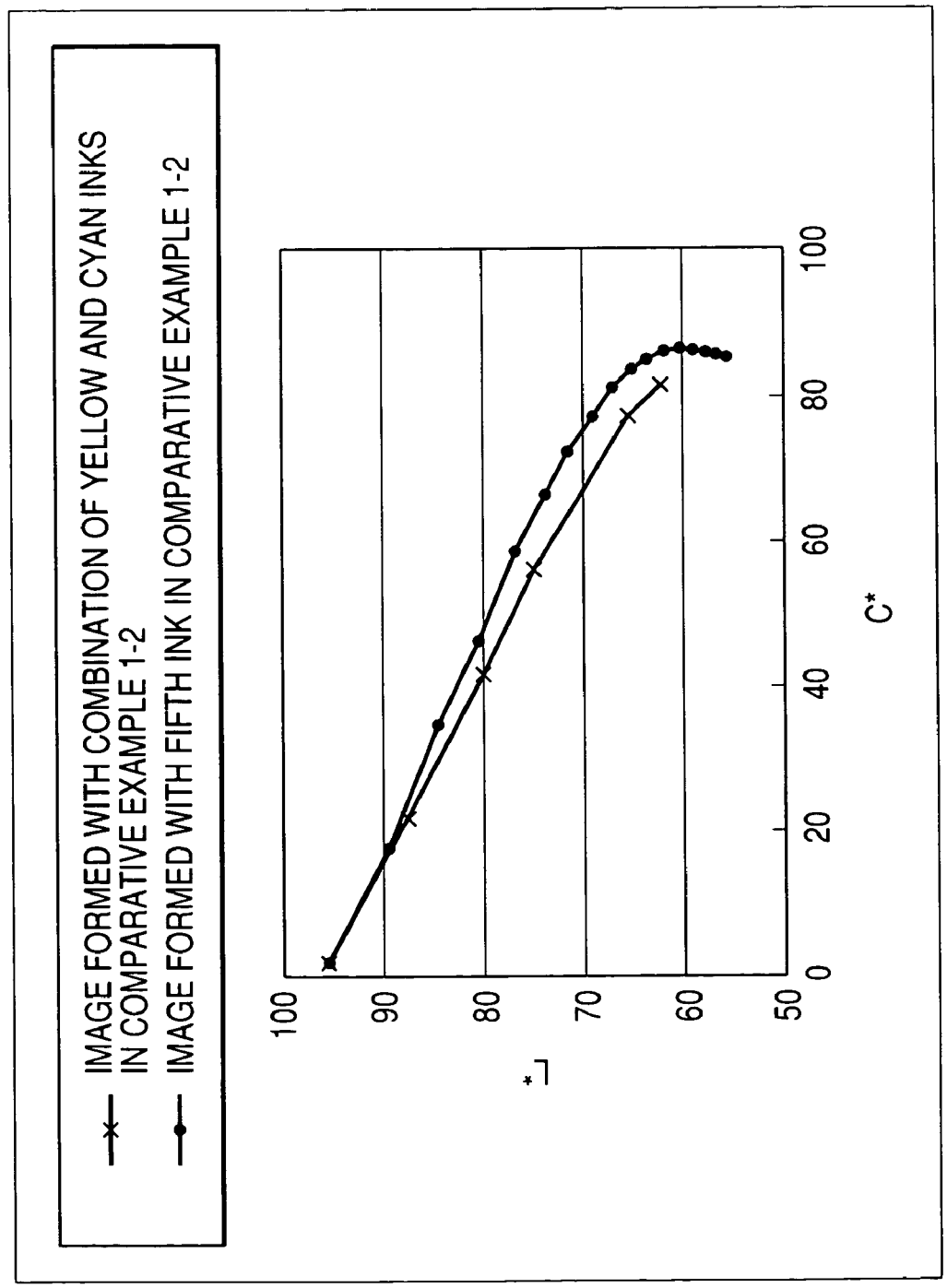
FIG. 24 is a diagram showing a relationship between lightness and chroma saturation when the yellow ink, the cyan ink, and the fifth ink are used in Comparative Example 1-2.
Figure 25:
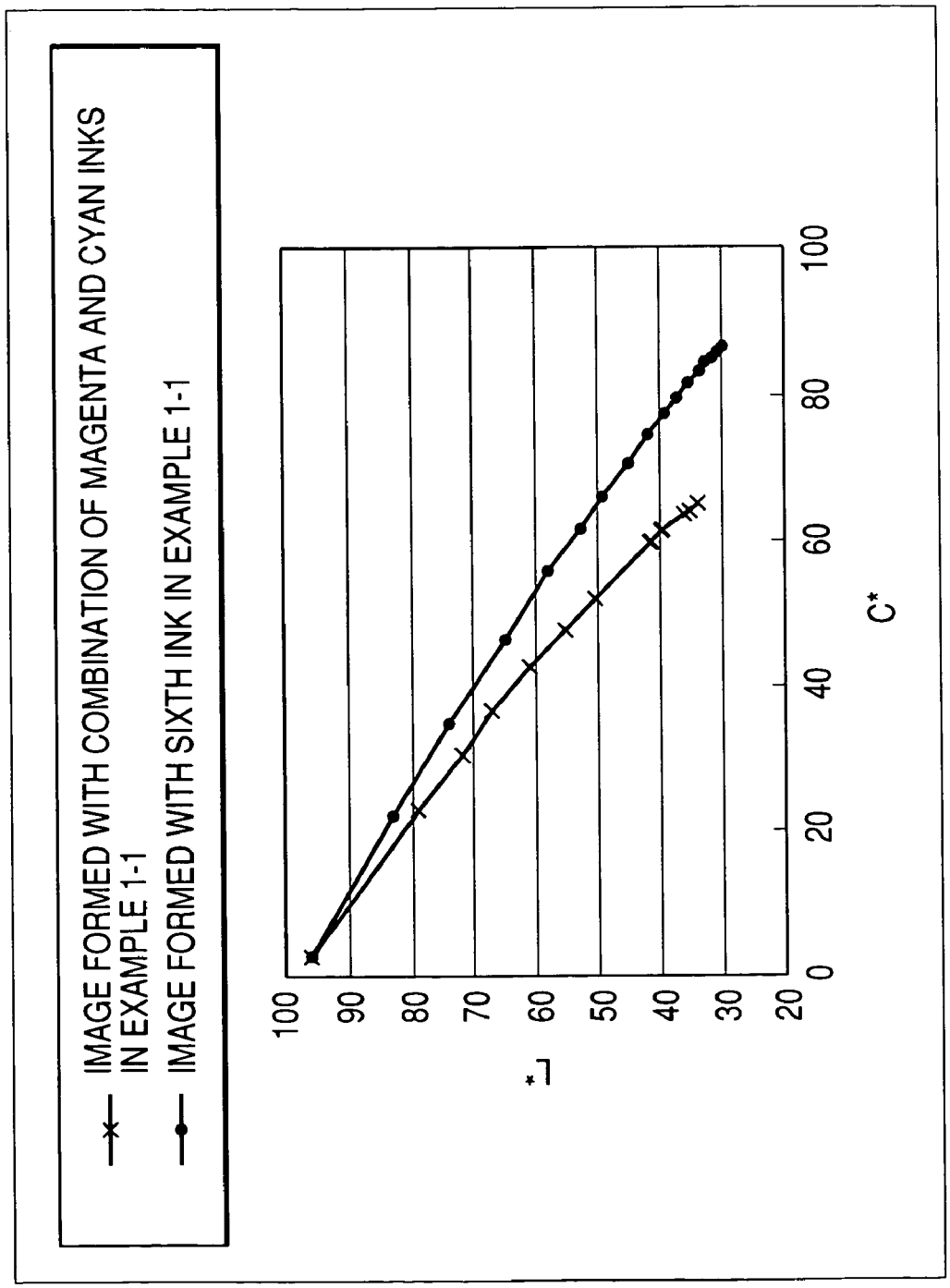
FIG. 25 is a diagram showing a relationship between lightness and chroma saturation when the magenta ink, the cyan ink, and a sixth ink are used in Example 1-1.
Figure 26:
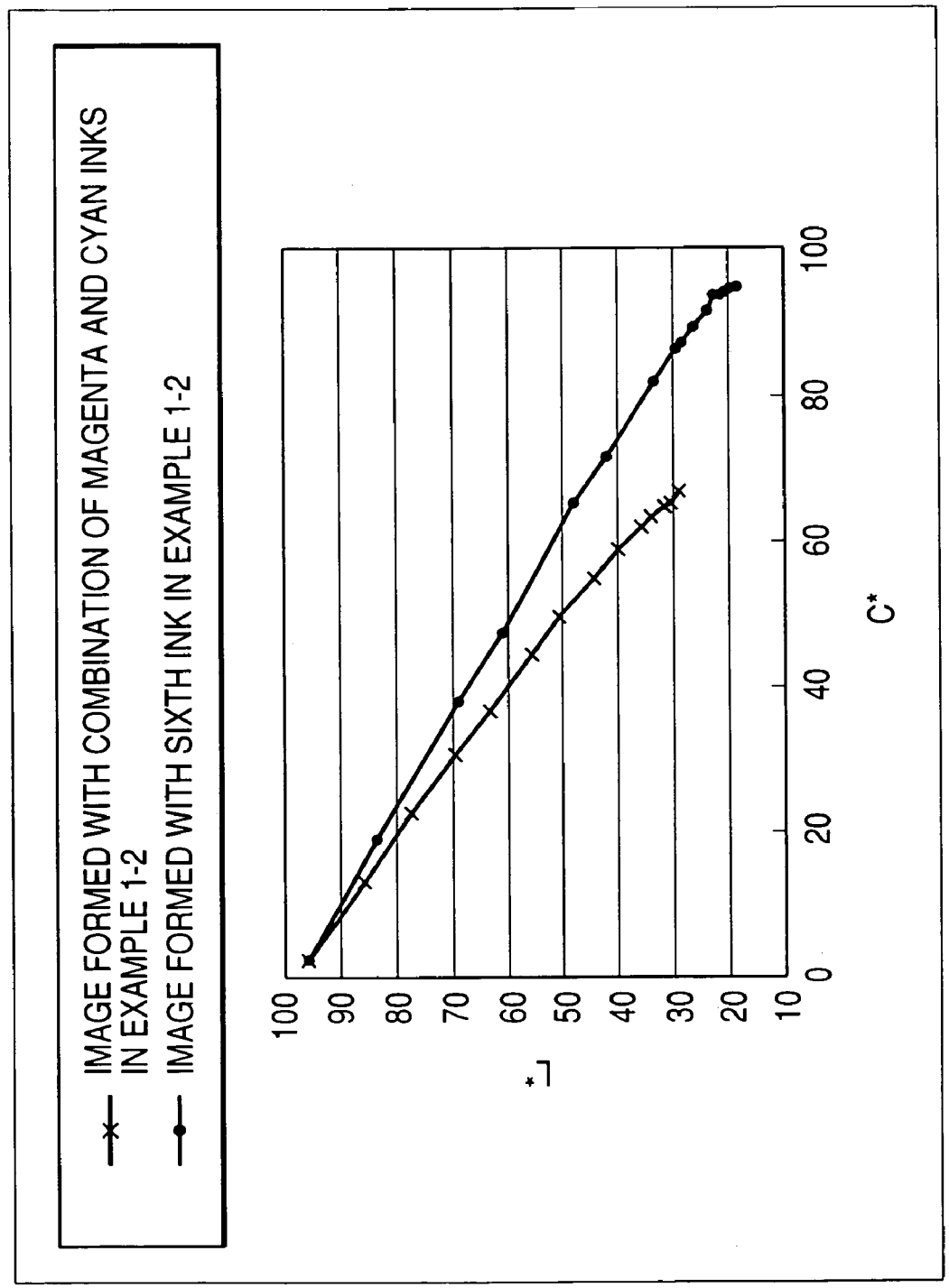
FIG. 26 is a diagram showing a relationship between lightness and chroma saturation when the magenta ink, the cyan ink, and the sixth ink are used in Example 1-2.
Figure 27:
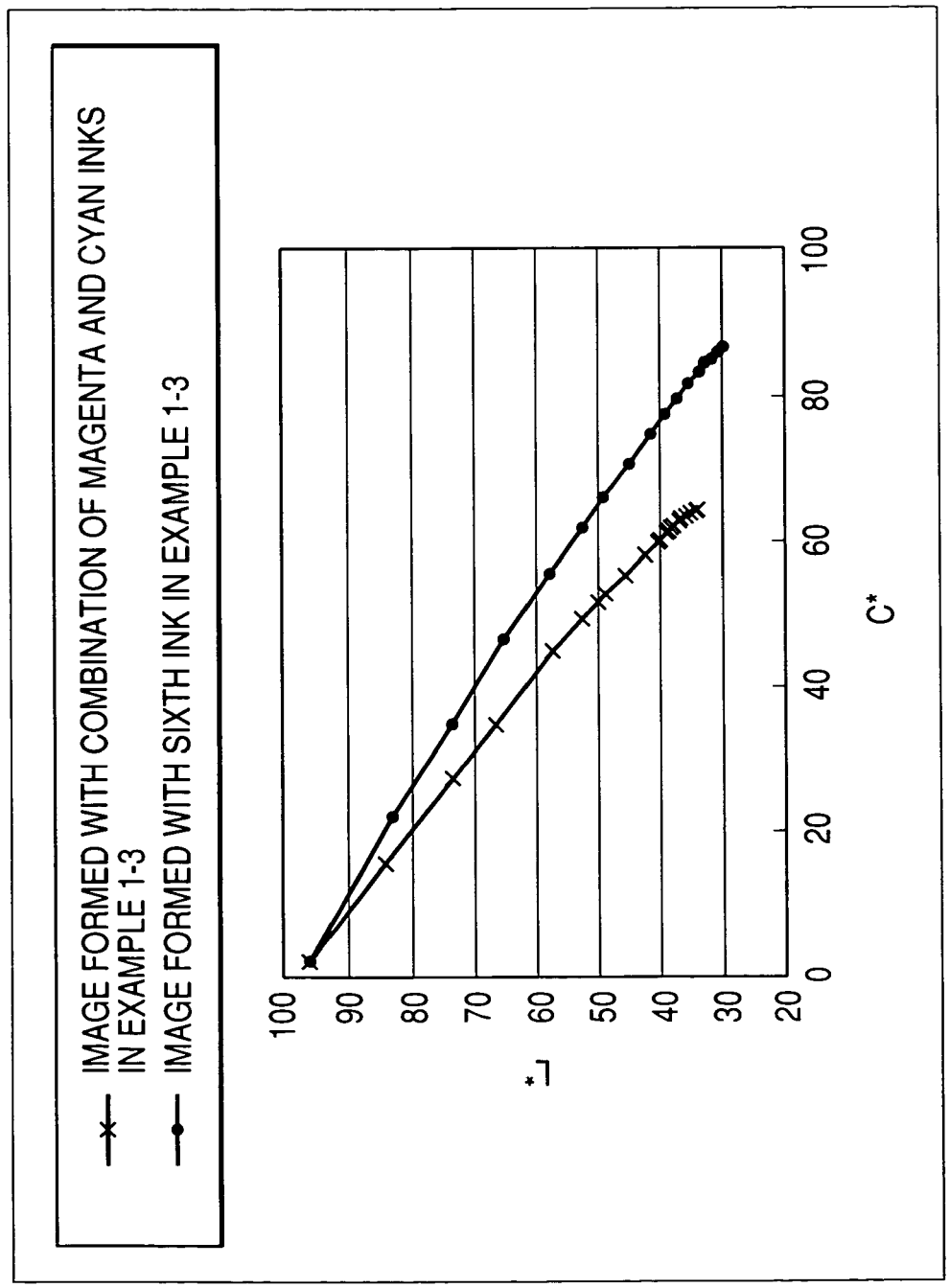
FIG. 27 is a diagram showing a relationship between lightness and chroma saturation when the magenta ink, the cyan ink, and the sixth ink are used in Example 1-3.
Figure 28:
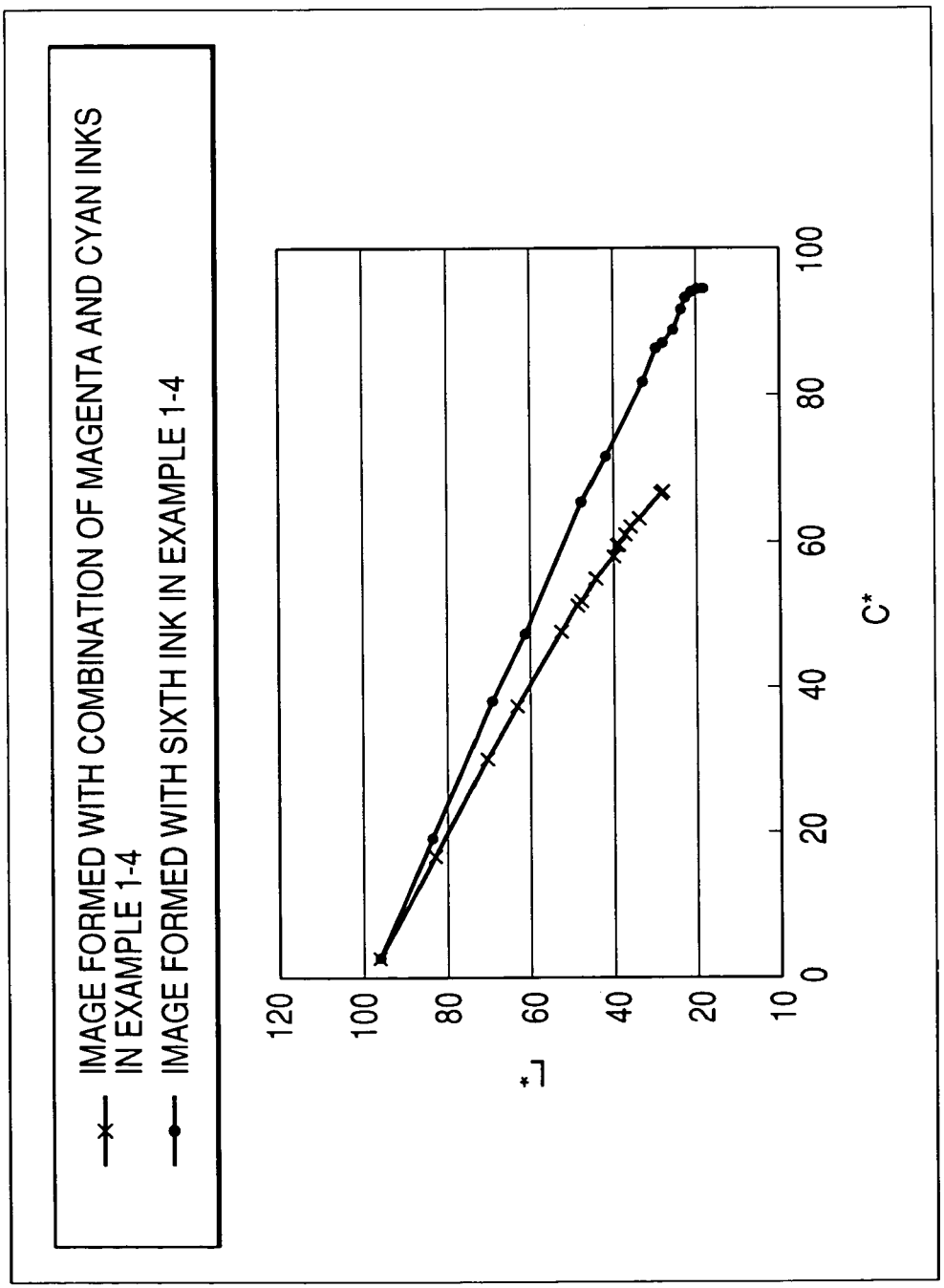
FIG. 28 is a diagram showing a relationship between lightness and chroma saturation when the magenta ink, the cyan ink, and the sixth ink are used in Example 1-4.
Figure 29:
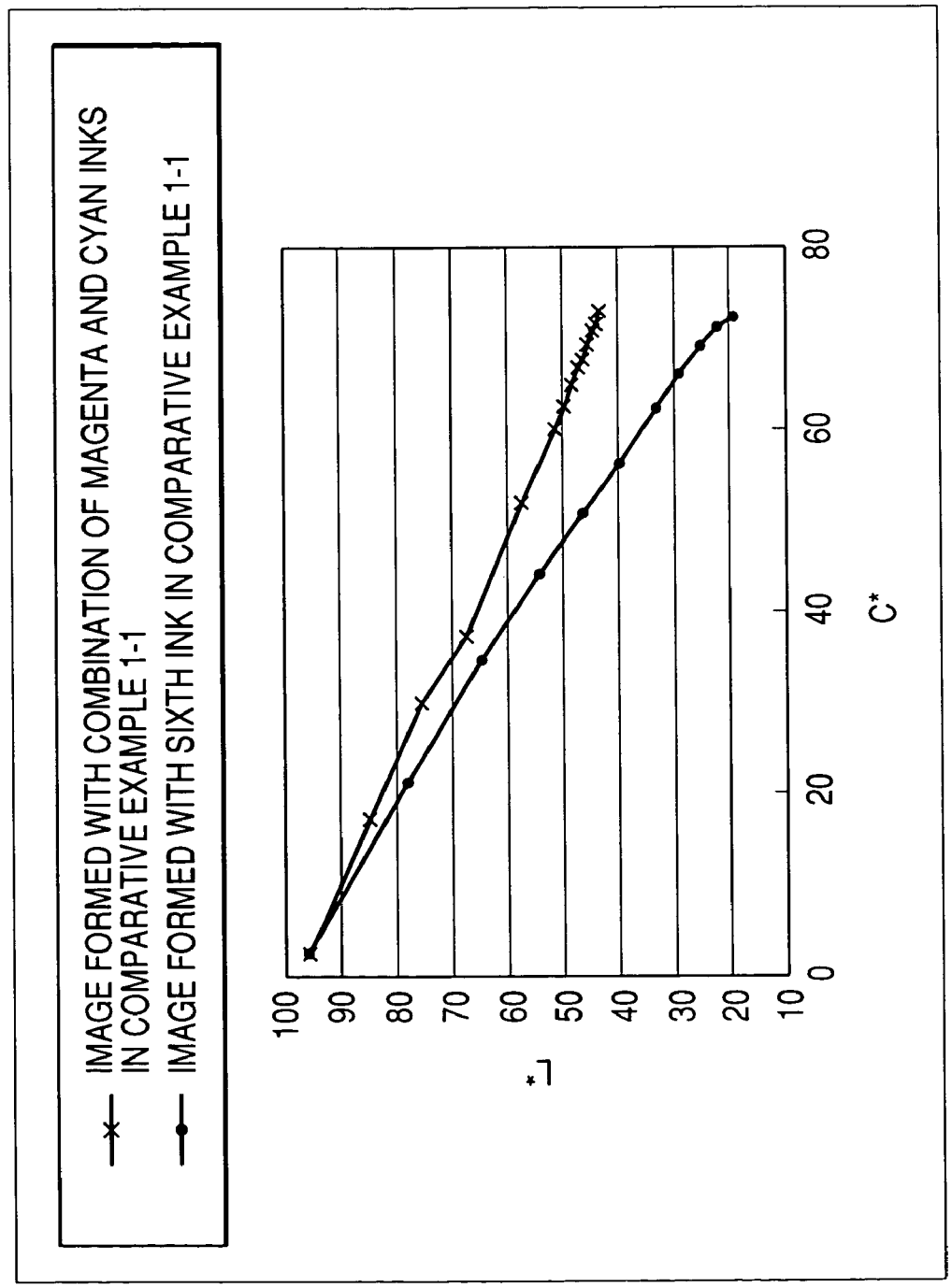
FIG. 29 is a diagram showing a relationship between lightness and chroma saturation when the magenta ink, the cyan ink, and the sixth ink are used in Comparative Example 1-1.
Figure 30:
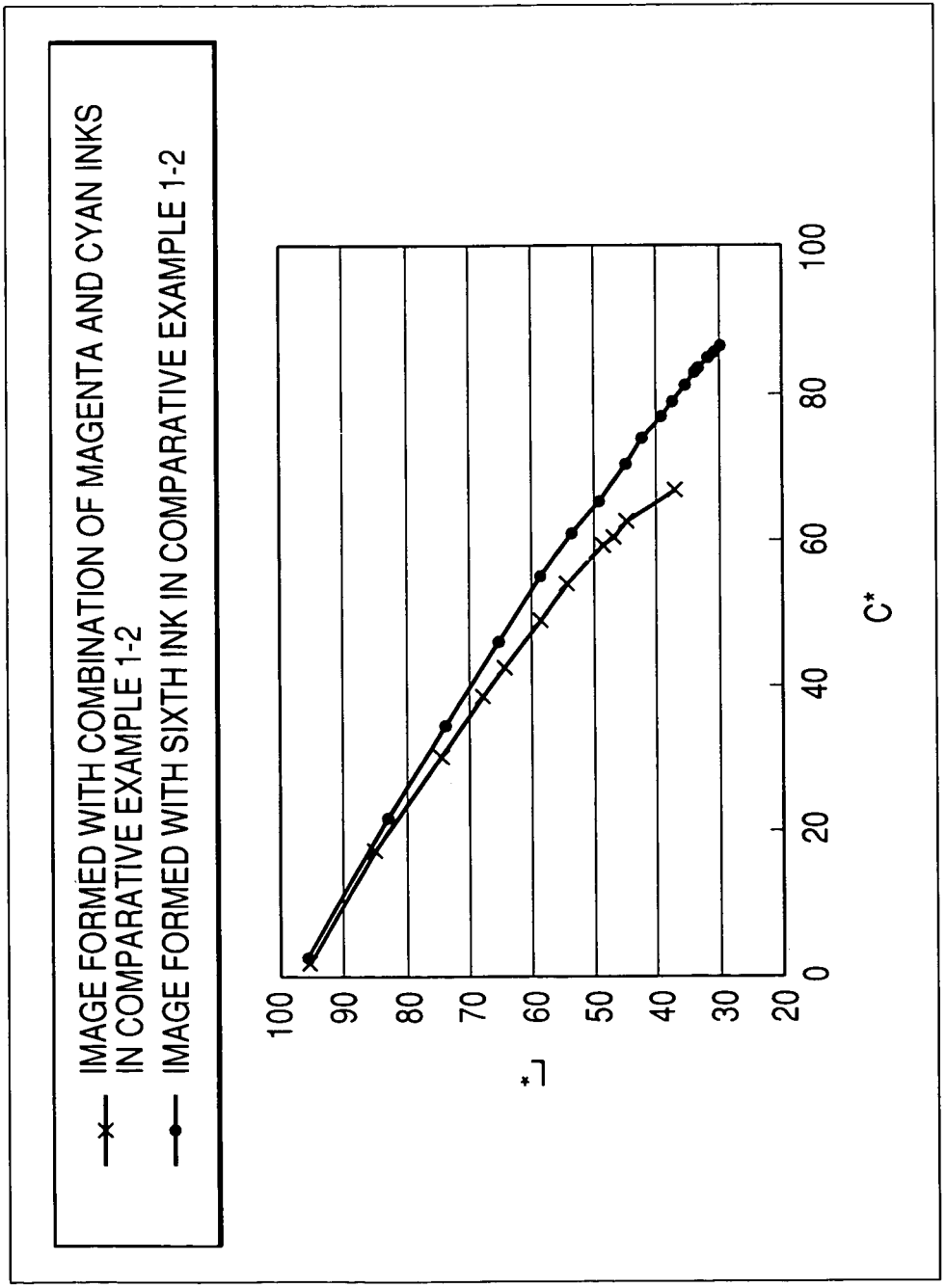
FIG. 30 is a diagram showing a relationship between lightness and chroma saturation when the magenta ink, the cyan ink, and the sixth ink are used in Comparative Example 1-2.
Figure 31:
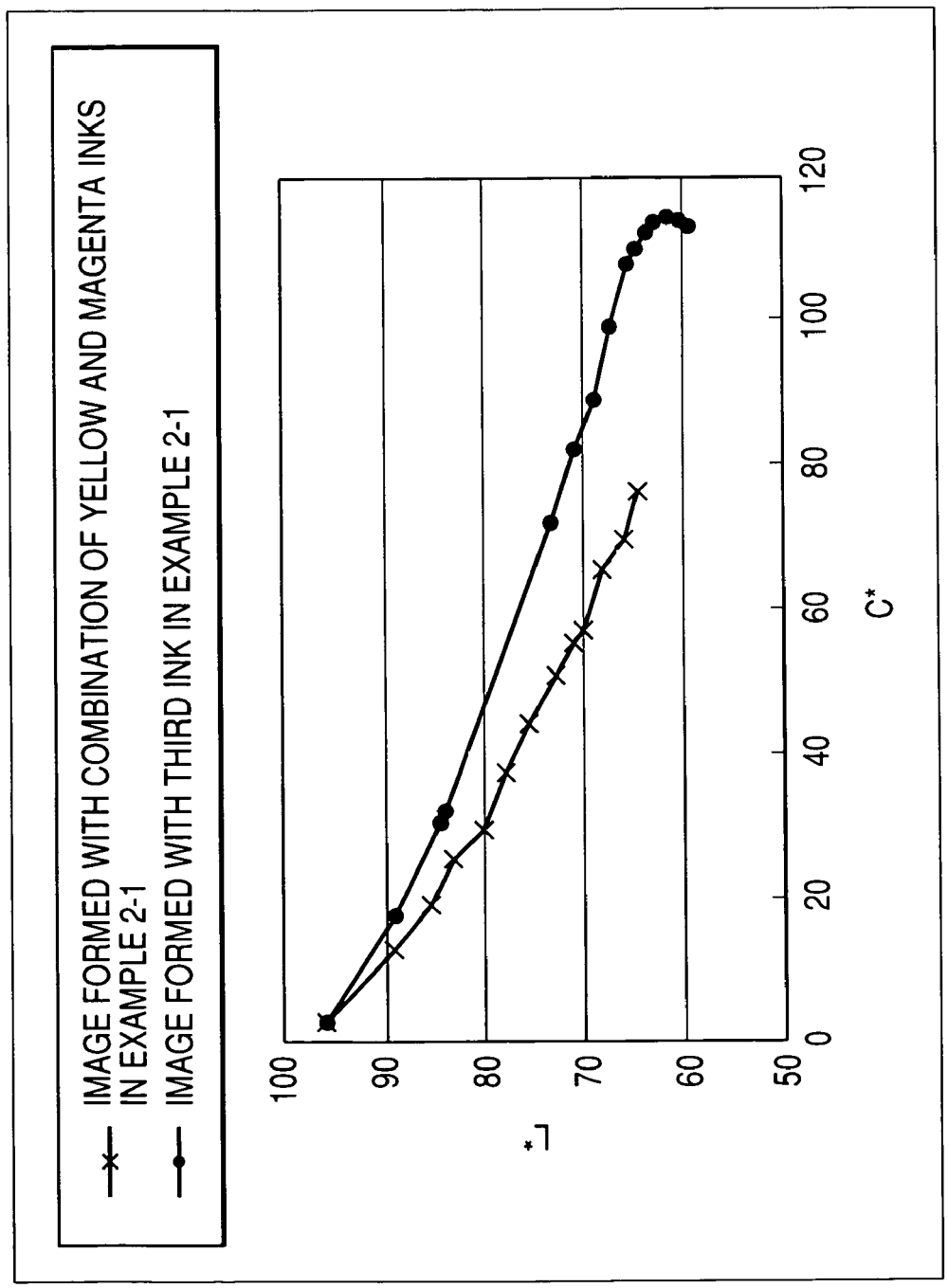
FIG. 31 is a diagram showing a relationship between lightness and chroma saturation when the yellow ink, the magenta ink, and the third ink are used in Example 2-1.
Figure 32:
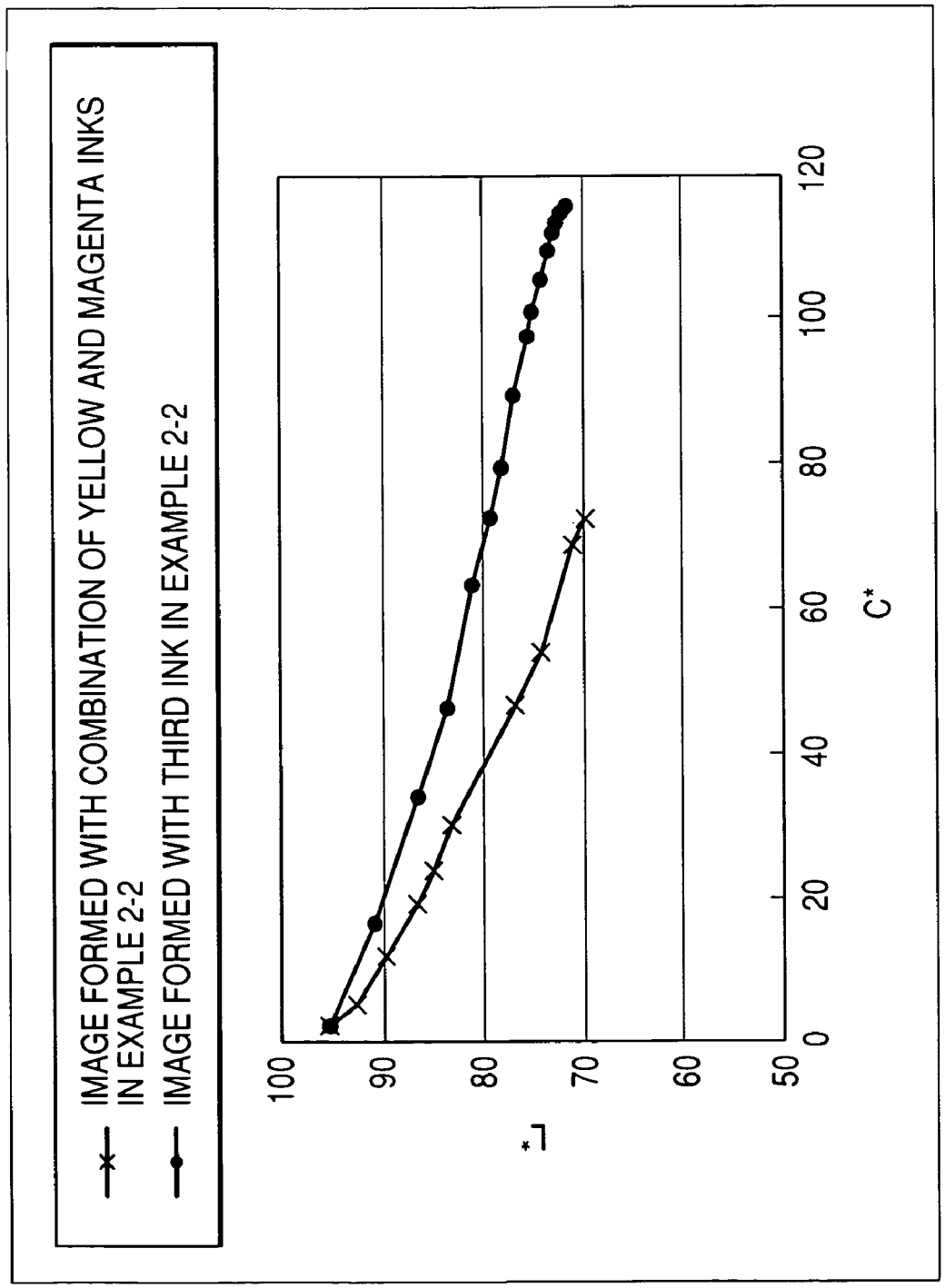
FIG. 32 is a diagram showing a relationship between lightness and chroma saturation when the yellow ink, the magenta ink, and the third ink are used in Example 2-2.
Figure 33:
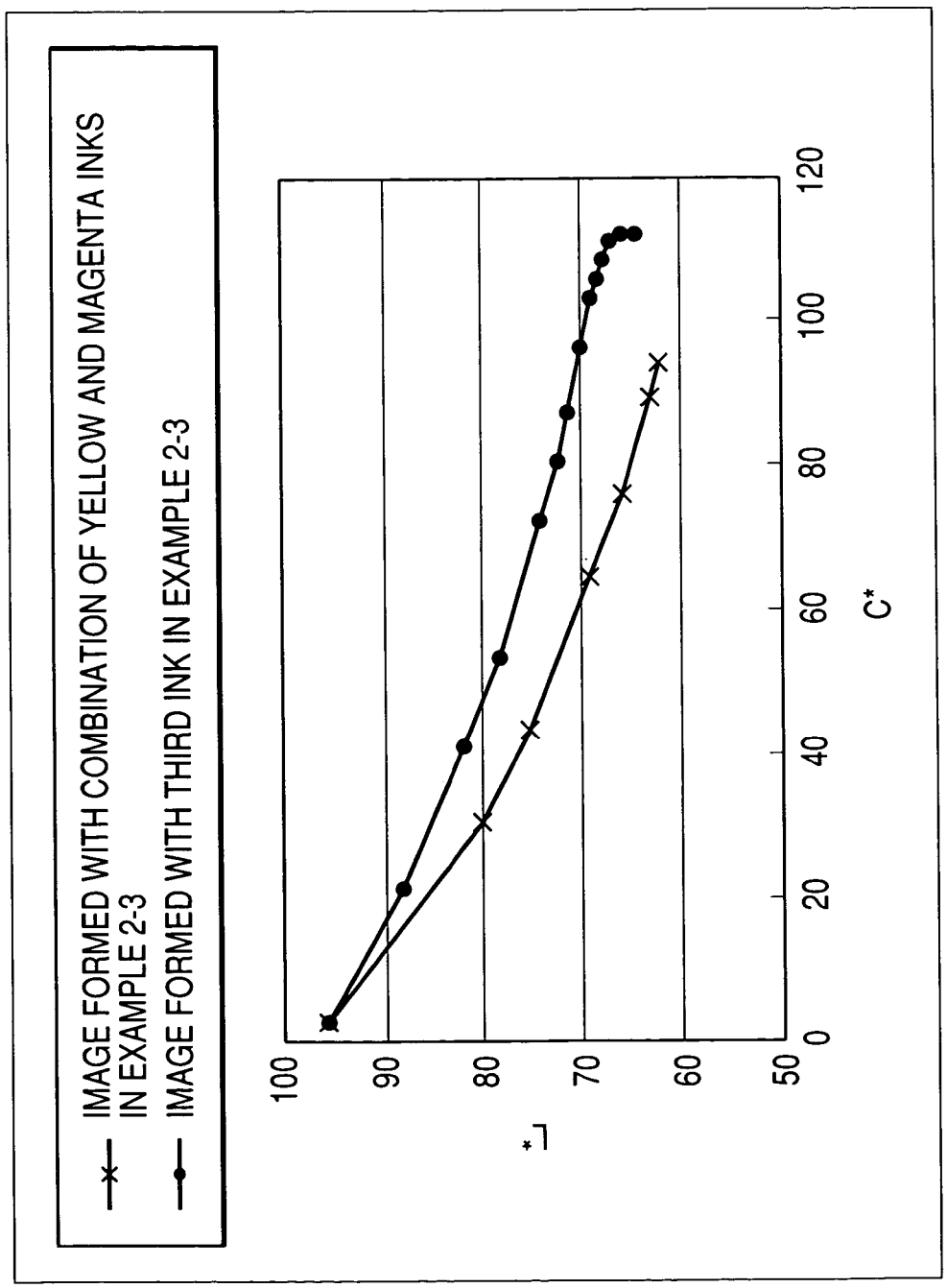
FIG. 33 is a diagram showing a relationship between lightness and chroma saturation when the yellow ink, the magenta ink, and the third ink are used in Example 2-3.
Figure 34:
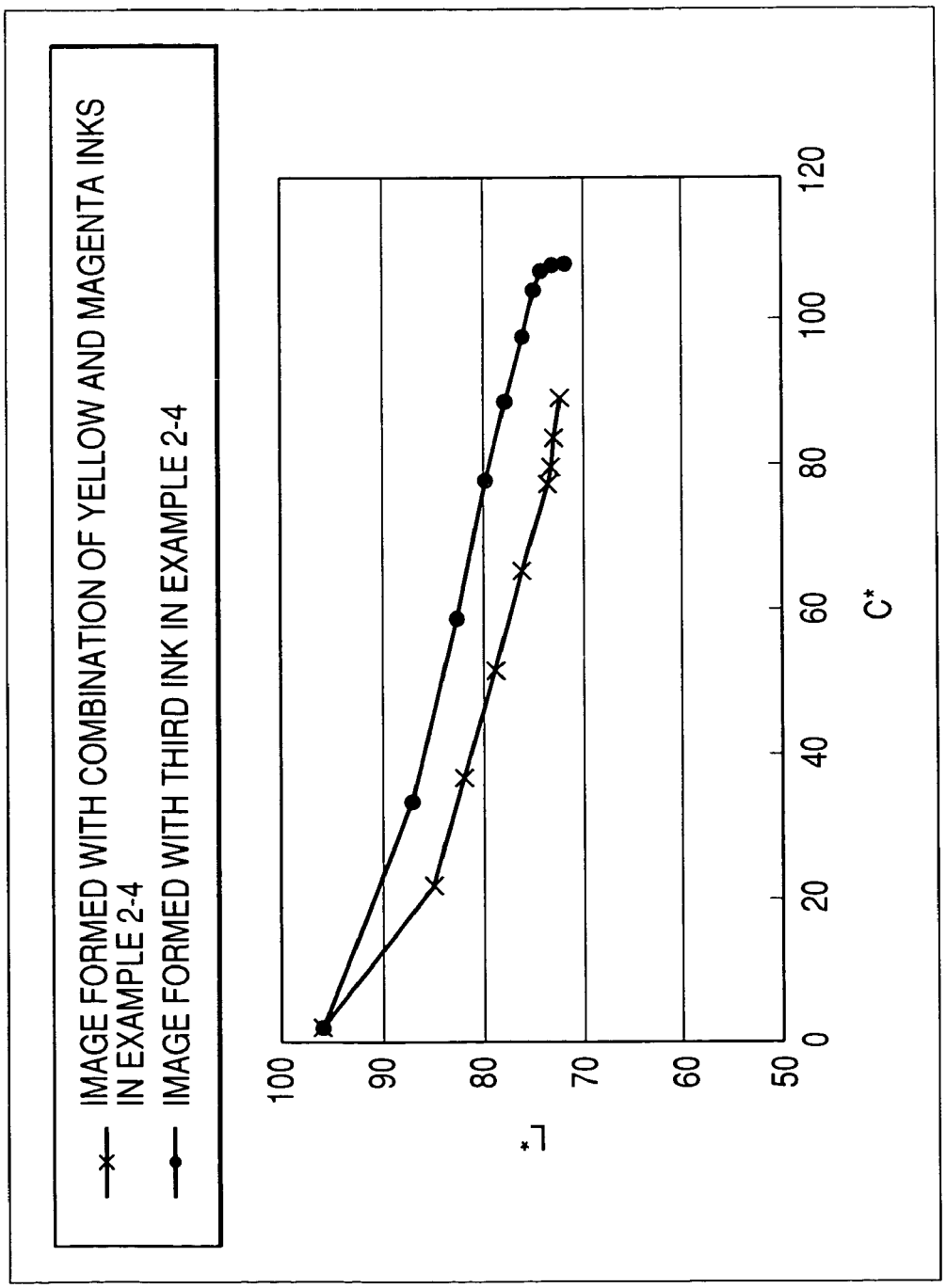
FIG. 34 is a diagram showing a relationship between lightness and chroma saturation when the yellow ink, the magenta ink, and the third ink are used in Example 2-4.
Figure 35:
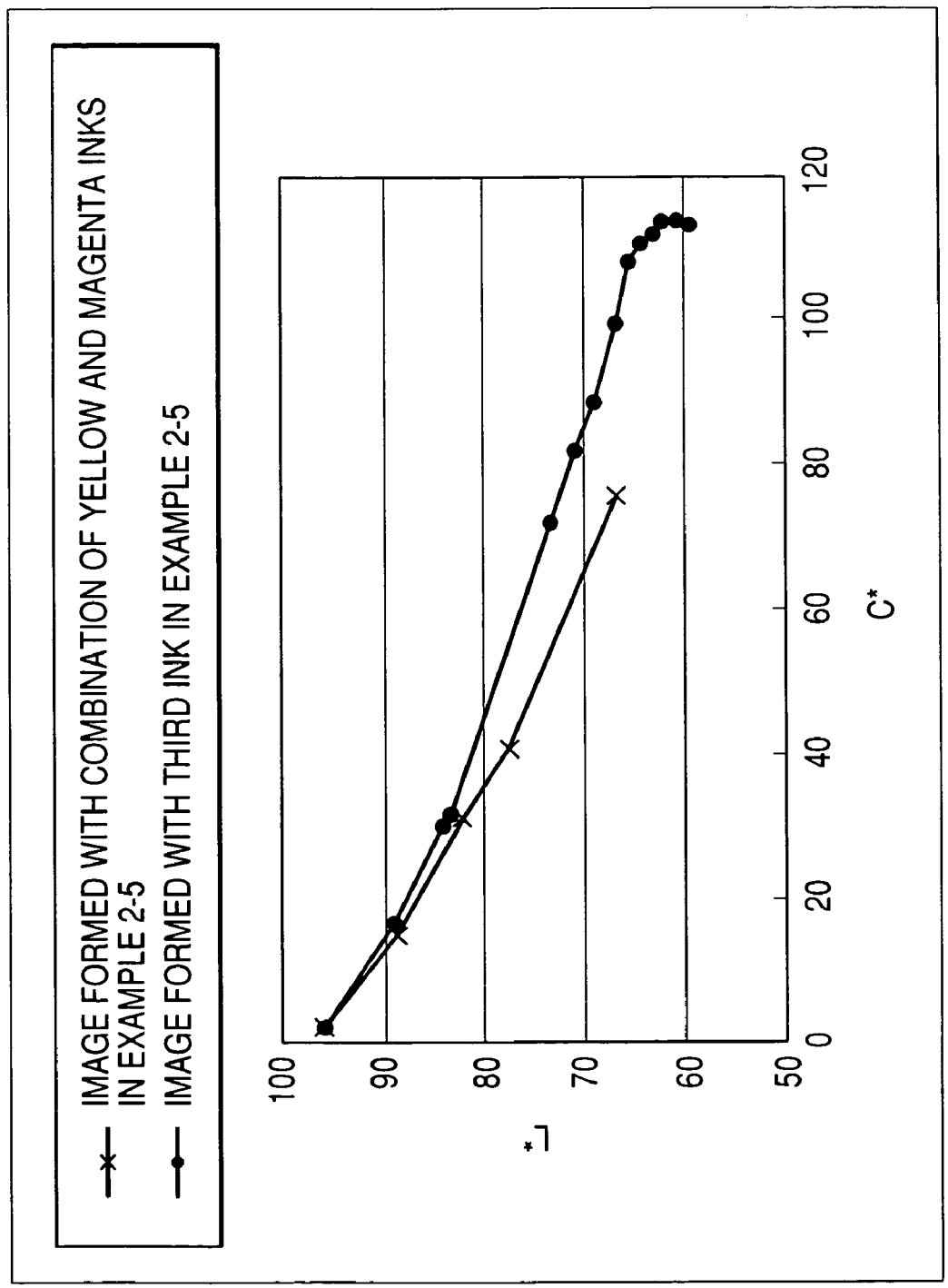
FIG. 35 is a diagram showing a relationship between lightness and chroma saturation when the yellow ink, the magenta ink, and the third ink are used in Example 2-5.
Figure 36:
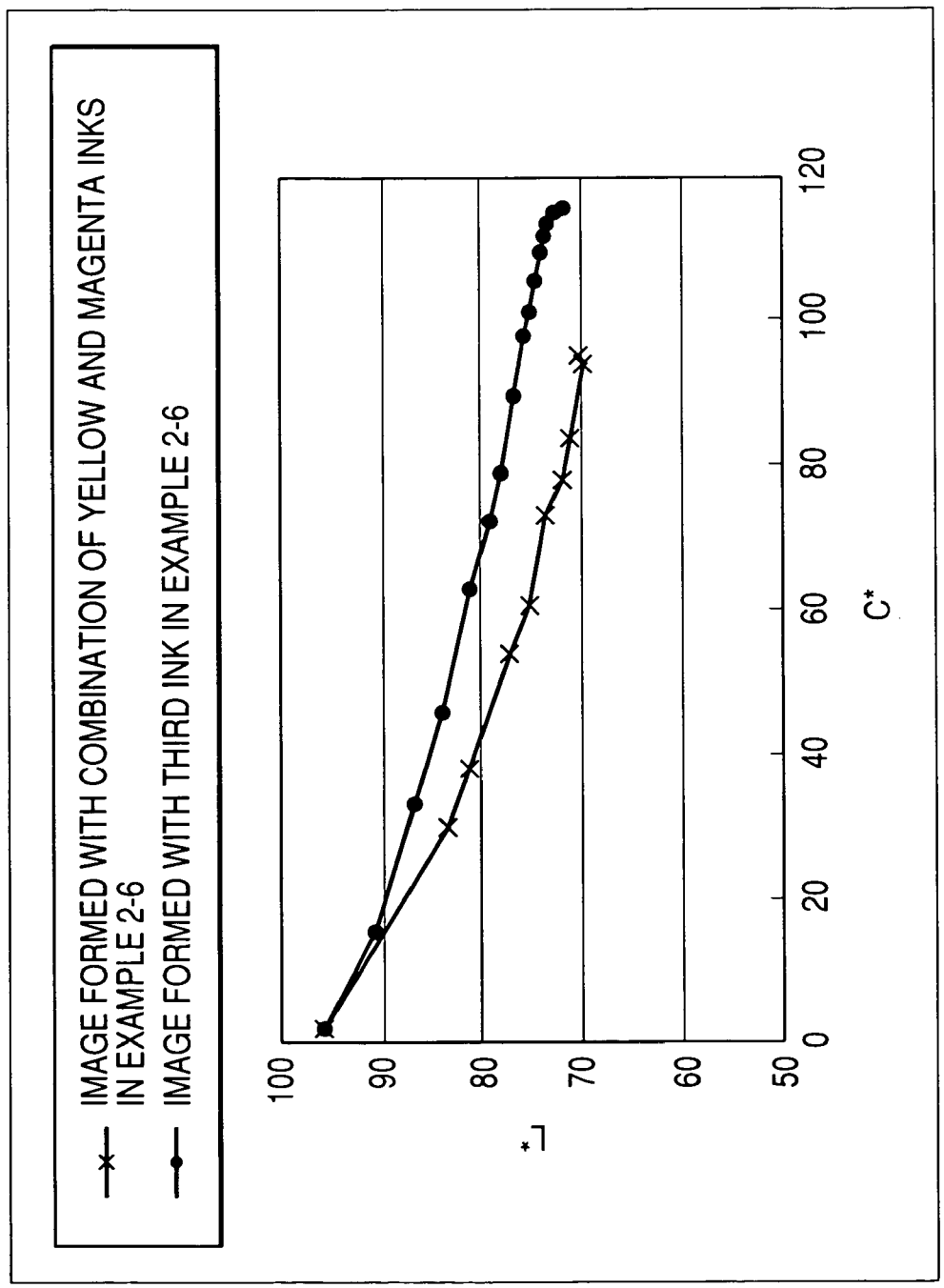
FIG. 36 is a diagram showing a relationship between lightness and chroma saturation when the yellow ink, the magenta ink, and the third ink are used in Example 2-6.
Figure 37:
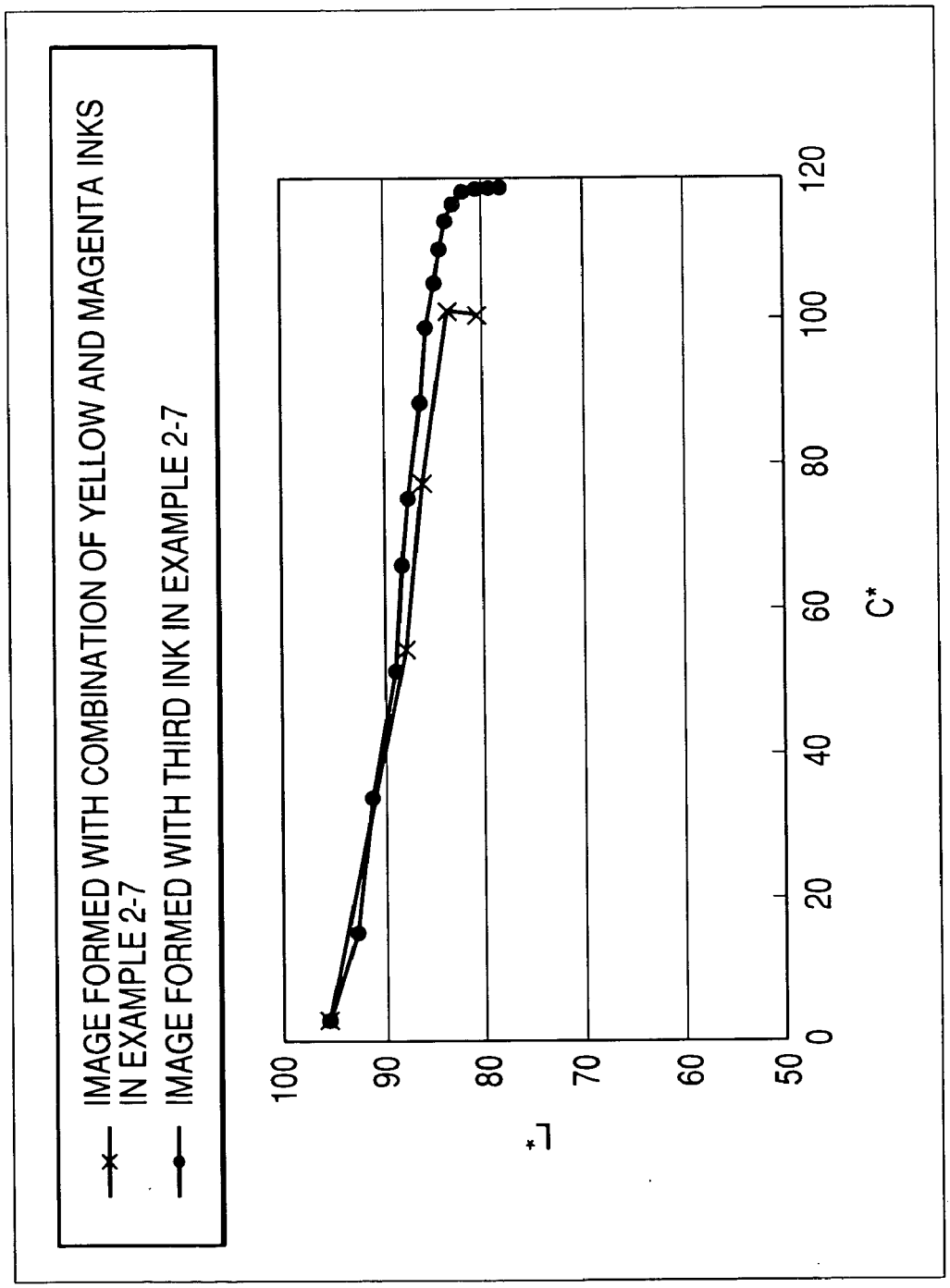
FIG. 37 is a diagram showing a relationship between lightness and chroma saturation when the yellow ink, the magenta ink, and the third ink are used in Example 2-7.
Figure 38:
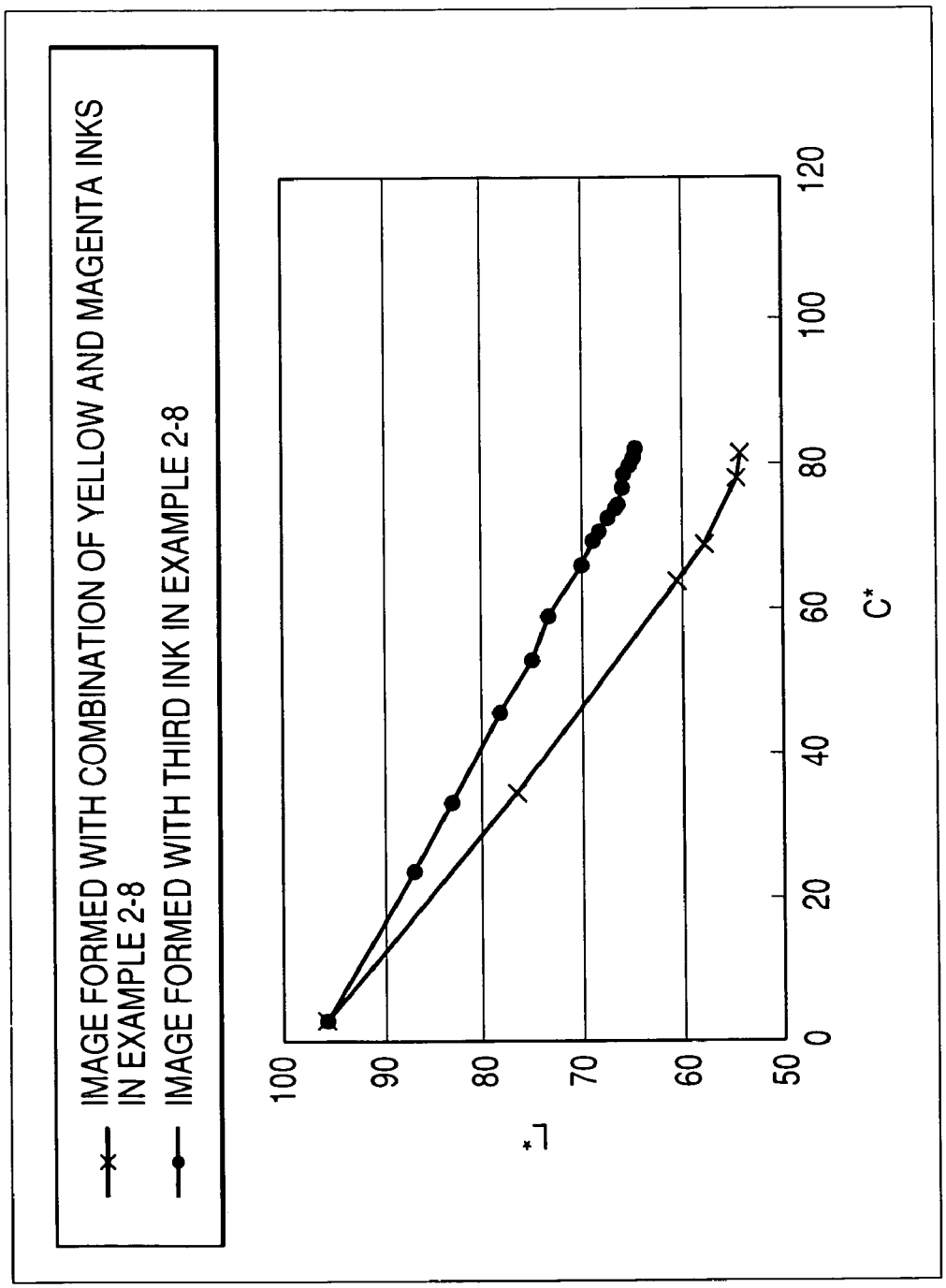
FIG. 38 is a diagram showing a relationship between lightness and chroma saturation when the yellow ink, the magenta ink, and the third ink are used in Example 2-8.

FIG. 12 is an enlarged front view for explaining the configuration of each of the first recording element substrate and the second recording element substrate in the case where the number of nozzle strings is 7. The first recording element substrate H1100 corresponds to the first recording element substrate H3600 of FIG. 11 whereas the second recording element substrate H1101 corresponds to the second recording element substrate H3601 of FIG. 11. Symbols H2000 to H2600 denote strings of recording elements (hereinafter, also referred to as nozzle strings) corresponding to different ink colors, respectively. The first recording element substrate H1100 is constituted of nozzle strings for 3 colors: a nozzle string H2000 through which the cyan ink is supplied, a nozzle string H2100 through which the magenta ink is supplied, and a nozzle string H2200 through which the yellow ink is supplied. The second recording element substrate H1101 is constituted of nozzle strings for 4 colors: a nozzle string H2300 through which the black ink is supplied, a nozzle string H2400 through which the third ink is supplied, a nozzle string H2500 through which the fifth ink is supplied, and a nozzle string H2600 through which the sixth ink is supplied.

Each nozzle string is constituted of 768 nozzles arranged in a recording medium transporting direction at an interval of 1,200 dpi (dot/inch; reference value), and discharges about 2 pl of ink droplets. An opening area at each nozzle discharge opening is set to about 100 $\mu m^2$. In addition, the first recording element substrate H1100 and the second recording element substrate H1101 are bonded to the first plate H1200 where the ink supply openings H1201 for supplying ink to the first recording element substrate H1100 and the second recording element substrate H1101 are formed.

Furthermore, the second plate H1400 having an opening portion is bonded to the first plate H1200. The second plate H1400 holds the electric wiring substrate H1300 in such a way that the electric wiring substrate H1300 is electrically connected to each of the first recording element substrate H1100 and the second recording element substrate Hll01.

The electric wiring substrate H1300 applies electric signals for discharging ink from the respective nozzles formed on the first recording element substrate H1100 and the second recording element substrate H1101. The electric wiring substrate H1300 includes: the electric wiring corresponding to each of the first recording element substrate H1100 and the second recording element substrate H1101; and the external signal input terminal H1301 that is placed at an end portion of the electric wiring to receive an electric signal from the recording system main body. The external signal input terminal H1301 is positioned and fixed to the back face side of the tank holder H1500.

The other description is the same as that of FIG. 11, so that the details are omitted.

An example of an ink discharge mode for a recording head involves the use of an electrothermal converting element (recording element) that generates, as energy to be used for discharging ink, thermal energy for causing film boiling in ink in accordance with an electric signal. This mode, which is applicable to any one of the so-called on-demand type recording head and the continuous type recording head, is particularly effective for the on-demand type recording head. The reason for the fact is as follows. At least one driving signal that causes a rapid temperature increase exceeding nucleate boiling in correspondence with recorded information is applied to an electrothermal converting element arranged in correspondence with a sheet or liquid flow path holding a liquid (ink). Thus, the electrothermal converting element is allowed to generate thermal energy, and film boiling is allowed to occur on a thermal working face of the recording head. As a result, an air bubble in a one-to-one correspondence with the driving signal can be formed in the liquid (ink). The growth and contraction of the air bubble allow the liquid (ink) to be discharged through a discharge opening, thereby resulting in the formation of at least one droplet. It is more preferable that the driving signal be in a pulse form. This is because the growth and contraction of the air bubble can be performed immediately and appropriately, and hence liquid (ink) discharge particularly excellent in responsibility can be achieved.

Examples of recording head forms according to the other discharge modes include an on-demand ink jet recording head. The on-demand ink jet recording head includes: a nozzle formation substrate having multiple nozzles; a pressure generating element composed of a piezoelectric material and a conductive material and arranged to face a nozzle; and ink filling the periphery of the pressure generating element. The on-demand ink jet recording head displaces the pressure generating element by means of an applied voltage to discharge small ink liquid droplets from the nozzles.

In addition, the ink jet recording system is not limited to one as described above in which a head and an ink tank are provided as separate bodies. The ink-jet recording system may be one in which a head and an ink tank are unseparably integrated. An ink tank may be one that is separably or unseparably integrated with a head before being mounted on a carriage. Alternatively, an ink tank may be arranged at a fixing site of an apparatus to supply ink to a recording head through an ink supplying member such as a tube. Furthermore, when an ink tank is provided with a configuration for exerting a preferable negative pressure on a recording head, the following forms can be adopted for example. In one form, an ink absorber is placed in an ink containing portion of the ink tank. In the other form, the ink tank includes: a flexible ink containing bag; and a spring portion that exerts an urging force in a direction of expanding the internal volume of the flexible ink containing bag on the bag.

In addition, the recording system may be one adopting a serial recording mode as described above. Alternatively, the recording system may adopt a line printer form in which recording elements are aligned over a range corresponding to the full width of a recording medium.

(Ink)

A color material for an ink to be used in the present invention may be appropriately selected within the scope of the present invention, and examples of such a color material for an ink include: a conventionally known color material such as a dye or a pigment which is generally used; and a newly synthesized color material. At least a dye is particularly preferably used for the color material in the present invention. The reason for this is as follows. A dye is dissolved in ink at a molecular level. When the ink is applied to a glossy medium such as glossy paper or glossy film, which is frequently used for photography output in recent years, according to the present invention, the color material is fixed in an ink receiving layer. In addition, the surface state of each of the recording part and non-recording part of the medium surface is maintained, so that no glossiness is lost. As a result, an image having high quality comparable to that of a positive film of a silver halide photograph can be formed.

The content of the color material in the ink is preferably 0.1 to 15 mass % with respect to the total mass of the ink. In addition, a single color material or a mixture of two or more kinds of color materials may be incorporated in the ink. Furthermore, color materials to be used for the third, fifth, and sixth inks may be appropriately selected within the scope of the present invention. For instance, a single color material may be used for each of the inks. Alternatively, a mixture of two or more kinds of color materials having a similar hue may be used for each of the inks. Alternatively, a mixture of color materials having yellow and magenta hues may be used for each of the inks.

It should be noted that the present invention is characterized in that a color recorded on a recording medium by using each of the yellow, magenta, and third inks satisfies Condition 1 and Condition 2 described above, and the cyan, fifth, and sixth color materials and the ink composition each satisfy Condition 3 and Condition 4 described above.

In satisfying those conditions, it is particularly preferable that dyes, especially acid dyes and direct dyes, be used as yellow, magenta, and cyan color materials in the present invention. Acid dyes and direct dyes can be suitably used in the present invention because the dyes can exhibit good color development on various recording media such as: plain paper; and special media each having a coating layer or an ink receiving layer on its surface, the special media being called glossy paper, coat paper, glossy films, and the like.

Shown below for each color tone are specific examples of acid dyes and direct dyes as examples of yellow and magenta color materials that can be used in the present invention. However, the present invention is not limited to these examples.

<Yellow Color Material>

C.I. Direct Yellow (DY): 8, 11, 12, 27, 28, 33, 39, 44, 50, 58, 85, 86, 87, 88, 89, 98, 100, 110, 132, 173, C.I. Acid Yellow (AY): 1, 3, 7, 11, 17, 23, 25, 29, 36, 38, 40, 42, 44, 76, 98, 99, in addition to the above, compounds having the structures described in the pamphlet of WO 99/43754 and the pamphlet of WO 02/081580, and the like.

<Magenta Color Material>

C.I. Direct Red (DR): 2, 4, 9, 11, 20, 23, 24, 31, 39, 46, 62, 75, 79, 80, 83, 89, 95, 197, 201, 218, 220, 224, 225, 226, 227, 228, 229, 230, C.I. Acid Red (AR): 6, 8, 9, 13, 14, 18, 26, 27, 32, 35, 42, 51, 52, 80, 83, 87, 89, 92, 106, 114, 115, 133, 134, 145, 158, 198, 249, 265, 289, C.I. Food Red (FR): 87, 92, 94, C.I. Direct Violet (DV): 107, in addition to the above, compounds having the structures described in JP 2003-049100 A, JP 2002-371214 A, JP 2002-309133 A, JP 2002-309116 A, and JP 2002-309115 A, a dye represented by the following general formula (I), and a dye represented by the following general formula (II) in a free acid form.

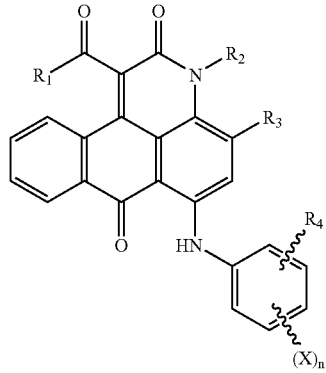

General Formula (I)

(In the general formula (I): $R_1$ represents a substituted or unsubstituted alkoxy group, or a substituted or unsubstituted aryl group; $R_2$ and $R_4$ each independently represent a hydrogen atom or a substituted or unsubstituted alkyl group; $R_3$ represents a hydrogen atom, a substituted or unsubstituted alkyl group, a substituted or unsubstituted alkoxy group, a substituted or unsubstituted aryloxy group, or a halogen atom; X represents a carboxyl group or sulfonic acid in a free acid form; and n represents 1 or 2.)

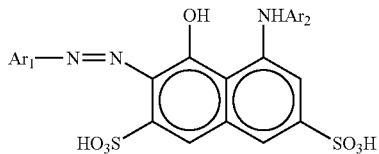

General Formula (II)

(In the general formula (II): $Ar_1$ represents a substituted or unsubstituted phenyl group, or a substituted or unsubstituted naphthyl group; and $Ar_2$ represents any one of a substituted or unsubstituted acetyl group, a benzoyl group, a 1,3,5-triazynyl group, a $SO_2$—$C_6H_5$ group, or a $SO_2$—$C_6H_4$—$CH_3$ group.)

Of the above dyes, AY 17, AY 23, DY 86, DY 132, and DY 173 for yellow, and AR 52, AR 289, DV 107, a dye represented by the general formula (I), and a dye represented by the general formula (II) in a free acid form for magenta can be particularly suitably used. This is because those dyes can provide not only good color reproducibility but also sufficient reliability relating to an ink jet recording system, such as hard-clogging performance of a recording head, solubility in an ink liquid medium, or ink storage stability.

Examples of the dyes each represented by the general formula (I) are shown below.

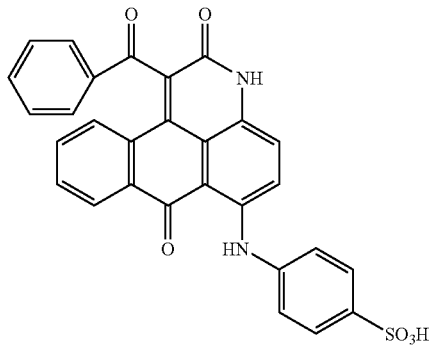

Exemplified Compound 1

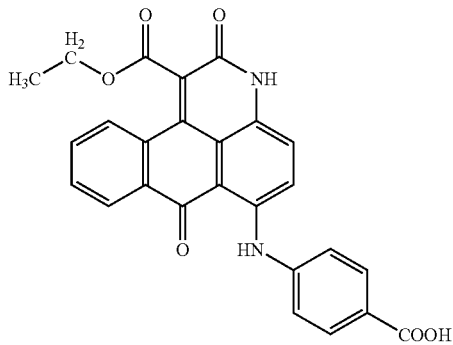

Exemplified Compound 2

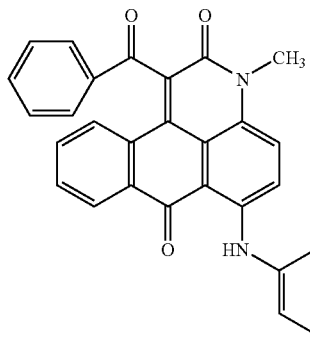

Exemplified Compound 3

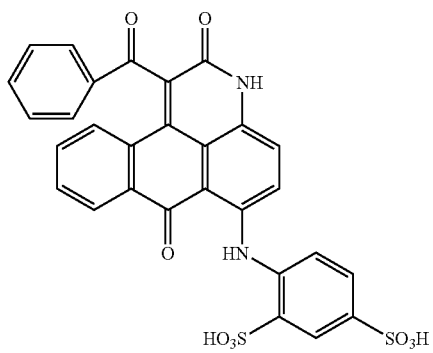

Exemplified Compound 4

-continued

Exemplified Compound 5

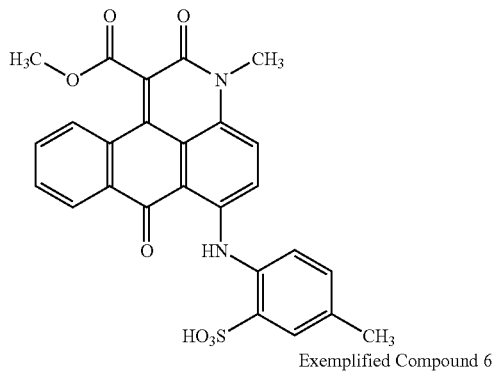

Exemplified Compound 6

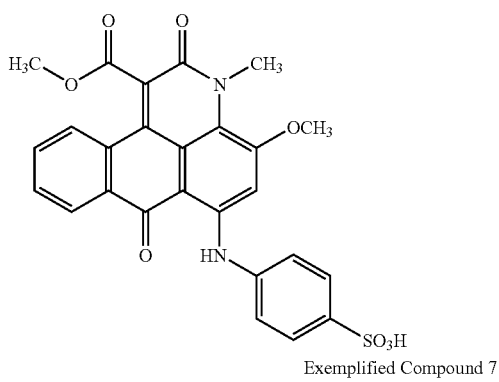

Exemplified Compound 7

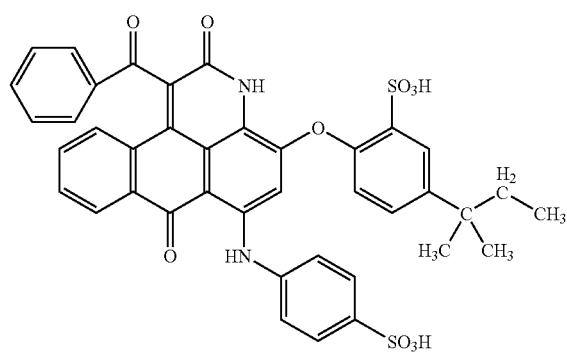

Next, examples of the dyes each represented by the general formula (II) in a free acid form are shown below.

Exemplified Compound 8

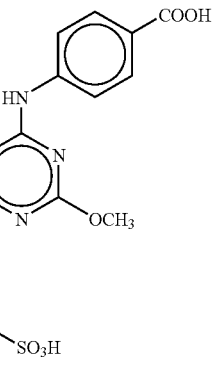

-continued

Exemplified Compound 9

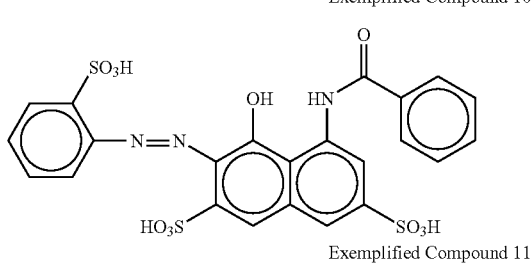

Exemplified Compound 10

Exemplified Compound 11

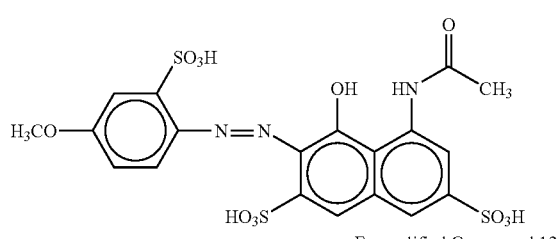

Exemplified Compound 12

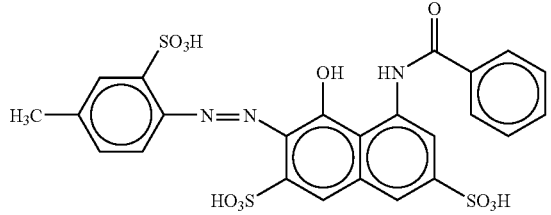

In addition, the color materials represented by the general formulae (I) and (II) to be used in the present invention may be used directly in free acid forms. When the color materials are produced in salt forms, they may be used as they are, or may be converted into desired salt forms. Part of acid radicals may be salt forms. Alternatively, a color material in a salt form and a color material in a free acid form may be mixed. Examples of such a salt form include: salts of alkali metals such as Na, Li, and K; ammonium salts which may be substituted by alkyl groups or hydroxyalkyl groups; and organic amine salts. Examples of the organic amine salts include: lower alkylamine; hydroxy-substituted lower alkylamine; carboxy-substituted lower alkylamine; and polyamine having 2 to 10 alkyleneimine units each having 2 to 4 carbon atoms. The number of kinds of those salt forms is not limited to 1, and may be 2 or more.

Next, specific examples of a color material which can be used for the third ink in the present invention are shown below. However, the present invention is not limited to these examples. Furthermore, the color material to be used for the third ink may be a mixture of a color material exemplified below and a yellow or magenta color material described above for the purpose of color matching or the like. Alternatively, the color material to be used for the third ink may be a mixture of a color material exemplified below, a yellow color material described above, and a magenta color material described above.

<Color Material for Third Ink>

C.I. Acid Orange (AO): 7, 8, 10, 12, 24, 33, 56, 67, 74, 88, 94, 116, 142,

C.I. Acid Red (AR): 111, 114, 266, 374,

C.I. Direct Orange: 26, 29, 34, 39, 57, 102, 118,

C.I. Food Yellow (FY): 3,

C.I. Reactive Orange (RO): 1, 4, 5, 7, 12, 13, 14, 15, 16, 20, 29, 30, 84, 107,

C.I. Disperse Orange (DO): 1, 3, 11, 13, 20, 25, 29, 30, 31, 32, 47, 55, 56,

C.I. Pigment Orange 43,

C.I. Pigment Red: 122, 170, 177, 194, 209, 224.

In addition to the above, compounds represented by the following general formulae can be used.

General Formula (III)

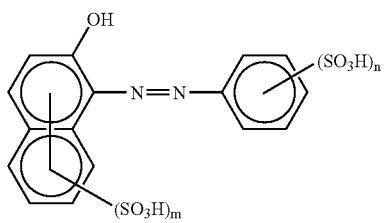

(In the general formula (III): m represents an integer of 0 to 2; and n represents an integer of 0 to 1, provided that m+n represents an integer of 1 or more.)

General Formula (IV)

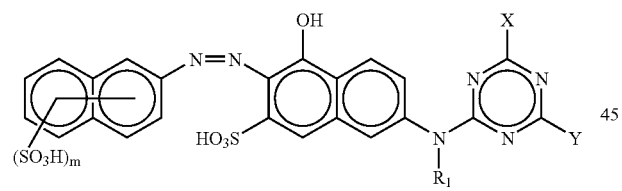

(In the general formula (IV): m represents an integer of 1 or 2; $R_1$ represents a hydrogen atom or an alkyl group; X represents —$NR_2R_3$ or —$OR_2$ where $R_2$ and $R_3$ each independently represent a hydrogen atom or an alkyl group; and Y represents a hydrogen atom or an alkyl group.)

A more specific description is given of $R_1$ to $R_3$ in the general formula (IV). $R_1$ represents a hydrogen atom or a linear or branched alkyl group having 1 to 4 carbon atoms. X is an inert substituent, and represents —$NR_2R_3$ or —$OR_2$. $R_2$ and $R_3$ each independently represent a hydrogen atom or a linear or branched alkyl group having 1 to 4 carbon atoms. Y is an inert substituent, and represents a hydrogen atom or a linear or branched alkyl group having 1 to 4 carbon atoms.

A substituent directly bonded to a triazine ring in the general formula (IV) is limited to an inert group from the viewpoint of long-term storage stability of ink.

The color materials represented by the general formulae (III) and (IV) to be used in the present invention may be used directly in free acid forms. When the color materials are produced in salt forms, they may be used as they are, or may be converted into desired salt forms. In addition, part of acid radicals may be salt forms. Alternatively, a color material in a salt form and a color material in a free acid form may be mixed. Examples of such a salt form include: salts of alkali metals such as Na, Li, and K; ammonium salts which may be substituted by alkyl groups or hydroxyalkyl groups; and organic amine salts. Examples of the organic amine salts include: lower alkylamine; hydroxy-substituted lower alkylamine; carboxy-substituted lower alkylamine; and polyamine having 2 to 10 alkyleneimine units each having 2 to 4 carbon atoms. The number of kinds of those salt forms is not limited to 1, and may be 2 or more. In addition, when the structure of a color material to be used in the present invention contains multiple acid radicals per molecule of the color material, the multiple acid radicals may be salt forms or acid forms, and may be different from each other.

The third ink using a color material, such as one represented by the general formula (III) or (IV) or C.I. Reactive Orange 13, can be particularly preferably used. This is because the third ink can provide an image with its vividness, transparency, and contrast improved, and brings together excellent image fastness such as light resistance or gas resistance and excellent reliability relating to an ink-jet recording system.

Specific examples of those color materials include the color materials having the structures shown below. However, the color materials to be used in the present invention are not limited to these examples. In addition, the color materials may be appropriately selected for use within the scope of the present invention. For example, two or more kinds of the color materials shown below may be used simultaneously. Alternatively, a color material shown below may be mixed with color materials having yellow and magenta hues.

Specific examples of the color materials each represented by the general formula (III) include the following color materials.

Exemplified Compound 13

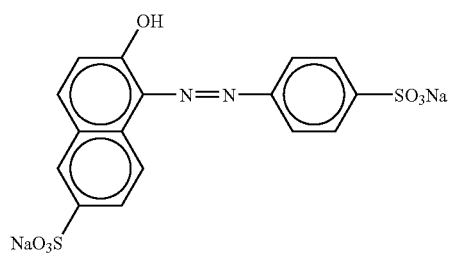

Exemplified Compound 14

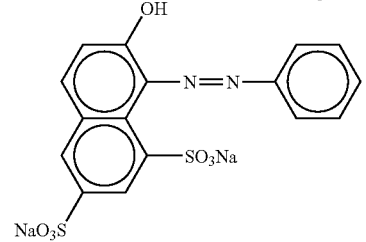

Specific examples of the color materials each represented by the general formula (IV) include the following color materials.

Exemplified Compound 15

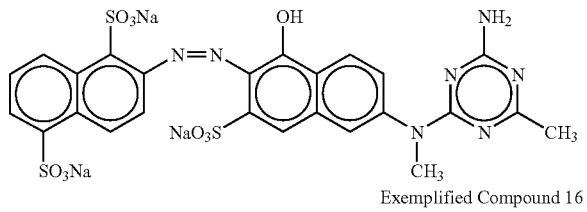

Exemplified Compound 16

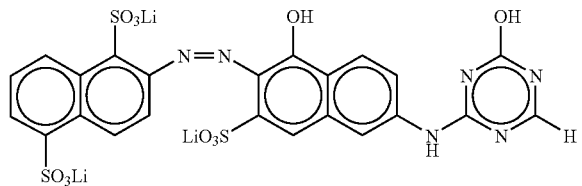

The total color material content in the ink according to this embodiment is in the range of preferably 0.1 to 15.0 mass %, particularly preferably 1.0 to 10.0 mass % with respect to the total ink amount.

More preferable color materials for the yellow ink, the magenta ink, and the third ink in the present invention are as follows.

Preferable examples of the color materials for the yellow ink include: C.I. Direct Yellow 86, 132, and 173; C.I. Acid Yellow 23; and compounds having the structures described in the pamphlet of WO 99/43754 and the pamphlet of WO 02/081580. Of those, C.I. Direct Yellow 86 and 132 are particularly preferable.

Preferable examples of the color materials for the magenta ink include: C.I. Acid Red 52, 92, and 289; C.I. Direct Violet 107; compounds having the structures described in JP 2003-049100 A, JP 2002-371214 A, JP 2002-309133 A, JP 2002-309116 A, and JP 2002-309115 A; and the dyes each represented by the general formulae (I) and (II). Of those, C.I. Acid Red 52 and 289, C.I. Direct Violet 107, the dyes each represented by the general formulae (I) and (II) respectively are particularly preferable.

Preferable examples of the color material for the third ink include: C.I. Food Yellow 3; C.I. Acid Orange 7, 10, 56, and 88; C.I. Acid Red 87; C.I. Acid Yellow 36; C.I. Reactive Orange 13; and the dyes each represented by the general formulae (III) and (IV) respectively. Of those, C.I. Food Yellow 3, C.I. Reactive Orange 13, and the dyes represented by the general formulae (III) and (IV) respectively are particularly preferable.

In the present invention, a combination of the yellow ink, the magenta ink, and the third ink each containing at least one kind of the above dyes is particularly preferable.

As described above, in the present invention, in addition to the yellow ink, the magenta ink, and the third ink, an ink having another color such as a cyan ink or a black ink may be used for the purpose of forming a full-color image or the like. Alternatively, as in the embodiment described above, light inks having the same color tones as those of the above inks may be combined with the inks to be used. A color material to be used for the ink having another color or in the light ink may be appropriately selected, and examples of such a color material include: a conventionally known color material such as dyes or pigments, which are generally used; and a newly synthesized color material.

In addition, in the present invention, the fifth and sixth inks satisfying Conditions 3 and 4 described above can be used.

Shown below for each color tone are specific examples of cyan and black color materials. However, the present invention is not limited to these examples.

<Cyan Color Material>
C.I. Direct Blue: 1, 15, 22, 25, 41, 76, 77, 80, 86, 90, 98, 106, 108, 120, 158, 163, 168, 199, 226, 307,
C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244,
in addition to the above, compounds having the structures described in JP 2002-327132 A, JP 2002-302623 A, JP 2002-294097 A, and the pamphlet of WO 02/088256, and the like.

<Black Color Material>
C.I. Direct Black: 17, 19, 22, 31, 32, 51, 62, 71, 74, 112, 113, 154, 168, 195,
C.I. Acid Black: 2, 48, 51, 52, 110, 115, 156,
C.I. Food Black: 1, 2,
carbon black,
in addition to the above, a compound having the structure described in the pamphlet of WO 00/43451, and the like.

Examples of the carbon black include carbon black pigments such as furnace black, lamp black, acetylene black, and channel black. Examples of available carbon black pigments include: Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (these are available from Columbia); Black Pearls L, Regal 400R, Regal 330 R, Regal 660R, Mogul L, Monarch 700, Monarch 800, Monarch 880, Monarch 900, Monarch 1000, Monarch 1100, Monarch 1300, Monarch 1400, and Valcan XC-72R (these are available from Cabot); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (these are available from Degussa); and No. 25, No. 33, No. 40, No. 47, No. 52, No. 900, No. 2300, MCF-88, MA 600, MA 7, MA 8, and MA 100 (these are available from Mitsubishi Chemical Corporation). In addition, for example, magnetic material fine particles made of magnetite, ferrite, or the like, or titanium black may be used as black pigments.

In addition, when any one of the above pigments is used, a dispersant is preferably used in combination with the pigment. A dispersant that can be suitably used is capable of allowing any one of the above pigments to be stably dispersed into an aqueous medium by the action of an anionic group. Specific examples of such a dispersant include a styrene-acrylic acid copolymer, a styrene-acrylic acid-alkyl acrylate copolymer, a styrene-maleic acid copolymer, a styrene-maleic acid-alkyl acrylate copolymer, a styrene-methacrylic acid copolymer, a styrene-methacrylic acid-alkyl acrylate copolymer, a styrene-half maleate copolymer, a vinyl naphthalene-acrylic acid copolymer, a vinyl naphthalene-maleic acid copolymer, a styrene-maleic anhydride-half maleate copolymer, and salts of these copolymers. In addition, those dispersant each have a weight average molecular weight preferably in the range of 1,000 to 30,000.

A so-called self-dispersion-type pigment, which can be dispersed into an aqueous medium with no dispersant by bonding an ionic group (anionic group) to the pigment surface, can also be used. Self-dispersion-type carbon black can be given as an example of such a pigment.

Examples of the self-dispersion-type carbon black include carbon black to the surface of which an anionic group is bonded.

Shown below are specific examples of the color materials that can be used for the fifth and sixth inks in the present invention. However, the present invention is not limited to these examples. In addition, the color material to be used for the third ink may be a mixture of color materials exemplified below and yellow or magenta color materials described above for the purpose of color toning or the like. Alternatively, the color material to be used for the third ink may be a mixture of color materials exemplified below, yellow color materials and magenta color materials described above.

<Color Material for Fifth Ink>

C.I. Acid Green (AG): 1, 3, 5, 6, 9, 12, 15, 16, 19, 21, 25, 28, 81, 84,
  C.I. Direct Green (DG): 26, 59, 67,
  C.I. Food Green (FG): 3,
  C.I. Reactive Green (RG): 5, 6, 12, 19, 21,
  C.I Disperse Green (DG): 6, 9.

In addition, the color materials for the fifth ink may be appropriately selected within the scope of the present invention. For example, two or more kinds of the above color materials may be used simultaneously. Alternatively, any one of the above color materials may be mixed with color materials having yellow and cyan hues.

<Color Material for Sixth Ink>

C.I. Acid Blue (AB): 62, 80, 83, 90, 104, 112, 113, 142, 203, 204, 221, 244,
  C.I. Reactive Blue (RB): 49,
  C.I. Acid Violet (AV): 17, 19, 48, 49, 54, 129,
  C.I. Direct Violet (DV): 9, 35, 47, 51, 66, 93, 95, 99,
  C.I. Reactive Violet (RV): 1, 2, 4, 5, 6, 8, 9, 22, 34, 36,
  C.I. Disperse Violet (DV): 1, 4, 8, 23, 26, 28, 31, 33, 35, 38, 48, 56,
  a dye having an anthraquinone structure represented by the following general formula (V) in a free acid form.

General Formula (V)

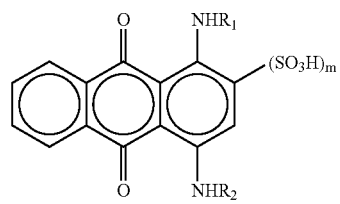

(In the general formula (V): m represents an integer of 0 or 1; $R_1$ and $R_2$ each independently represent a hydrogen atom, a substituted or unsubstituted phenyl group, or a substituted or unsubstituted cyclohexyl group; and m represents 1 when neither $R_1$ nor $R_2$ contains a sulfonic group as a substituent.)

A color material represented by the general formula (V) to be used in the present invention may be used directly in a free acid form. When the color material is produced in a salt form, it may be used as it is, or may be converted into a desired salt form. In addition, part of acid radicals may be salt forms. Alternatively, a color material in a salt form and a color material in a free acid form may be mixed. Examples of such a salt form include: salts of alkali metals such as Na, Li, and K; ammonium salts which may be substituted by alkyl groups or hydroxyalkyl groups; and organic amine salts. Examples of the organic amine salts include: lower alkylamine; hydroxy-substituted lower alkylamine; carboxy-substituted lower alkylamine; and polyamine having 2 to 10 alkyleneimine units each having 2 to 4 carbon atoms. The number of kinds of those salt forms is not limited to 1, and may be 2 or more. In addition, when the structure of a color material to be used in the present invention contains multiple acid radicals per molecule of the color material, the multiple acid radicals may be salt forms or acid forms, and may be different from each other.

A more specific description is given of $R_1$ and $R_2$ in the general formula (V). $R_1$ and $R_2$ each independently represent a hydrogen atom, a substituted or unsubstituted phenyl group, or a substituted or unsubstituted cyclohexyl group. Examples of substituents for the phenyl group and the cyclohexyl group include: a linear or branched alkyl group having 1 to 4 carbon atoms; a hydroxyl group; a carboxyl group or a salt thereof; and a sulfonic group or a salt thereof.

Examples of a dye represented by the general formula (V) are shown below.

Exemplified Compound 17

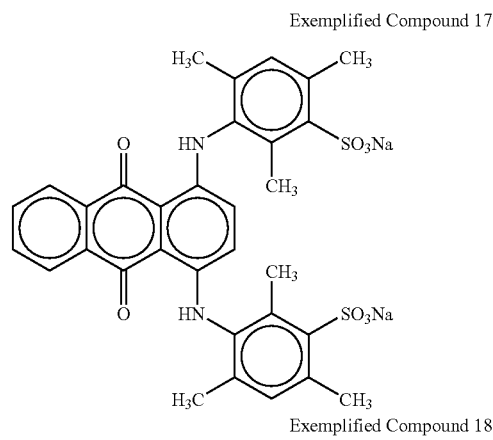

Exemplified Compound 18

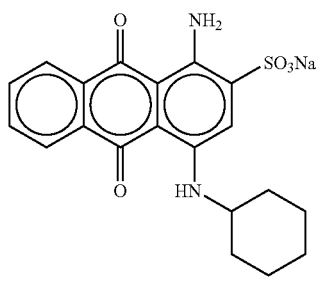

In addition, the color materials for the sixth ink may be appropriately selected within the scope of the present invention. For example, two or more kinds of the above color materials may be used simultaneously. Alternatively, any one of the above color materials may be mixed with color materials having magenta and cyan hues.

The ink to be used in the present invention can be obtained by processing any one of the above color materials into a form that can be suitably used in the image-forming method or image-forming apparatus according to the present invention, such as a powder form or an aqueous solution form, by means of an approach generally used in various image-forming methods and image-forming apparatuses.

An ink to be used in the ink-jet recording system according to the present invention is described as an example. The ink to be used in the ink-jet recording system according to the present invention is generally obtained by dissolving or dispersing a color material to be used in the present invention into an aqueous medium mainly composed of water. Water alone or a medium containing water and a water-soluble organic solvent can be used as the aqueous medium.

The water-soluble organic solvent is not particularly limited as long as it exhibits water-solubility. A solvent generally used for ink jet ink can be used without any problems, and examples of such a solvent include alcohols, polyhydric alcohols, polyglycol, glycol ether, nitrogen-containing polar solvents, sulfur-containing polar solvents, urea compounds, saccharides, and derivatives of these compounds. Those solvents find use in applications such as: maintenance of moisture retention of ink; improvements in solubility and dispersibility of a color material; and penetrants into ink recording paper. In addition, each of those solvents can be used alone, or multiple kinds of them can be used in combination.

In general, the water-soluble organic solvent content is in the range of preferably 1 to 50 mass %, more preferably 3 to 40 mass % with respect to the total ink amount. In addition, the water content in the ink is preferably in the range of 30 to 95 mass % for satisfactorily maintaining solubility of a dye and ink discharge stability.

Furthermore, the ink of the present invention may contain various additives as required in addition to the above components. Examples of such additives include a surfactant, a pH adjustor, an anti-corrosive agent, an antiseptic agent, a fungicide, an antioxidant, a reduction-preventing agent, an evaporation accelerator, a chelator, and a water-soluble polymer.

Examples of the surfactant include: anionic surfactants such as fatty acid salts, higher alcohol sulfates, liquid fatty oil sulfates, and alkylallyl sulfonates; and nonionic surfactants such as polyoxyethylene alkyl ethers, polyoxyethylene alkyl esters, polyoxyethylene sorbitan alkyl esters, acetylene alcohols, and acetylene glycols. One kind or two or more kinds of those surfactants can be appropriately selected before use. Of the above surfactants, acetylene alcohols and acetylene glycols can be suitably used because they exhibit excellent permeability into plain paper. The usage of the surfactant is desirably in the range of 0.01 to 5 mass % with respect to the total ink amount although the desired usage varies depending on the kind of surfactant. At this time, the addition amount of the surfactant is preferably determined in such a manner that the surface tension of the ink at 25° C. will be 10 mN/m (dyn/cm) or more, more preferably 20 mN/m or more, and will be 60 mN/m or less. This is because the occurrence of the so-called shifted printing due to a wetted nozzle tip (the shift of an impinging point of an ink droplet) or the like can be effectively suppressed in the ink jet recording mode to be used in the present invention.

In addition, the ink is preferably adjusted to have a desired viscosity or pH for obtaining good discharge property in an ink jet recording system.

(Recording Medium)

A recording medium that is generally used can be used in the present invention. Examples of such a medium include: plain paper; and special media each having a coating layer or an ink receiving layer on its surface, the special media being called glossy paper, coat paper, glossy films, and the like. Of those, a special medium having a hydrophilic porous particle layer, a porous polymer layer, or the like on a substrate can be given as an example of a recording medium capable of providing an image with its vividness, contrast, and transparency improved.

Examples of a special medium as the recording medium to be used in the present invention are described in more detail. In the special medium, color materials such as dyes and pigments are adsorbed fine particles that form the hydrophilic porous structure in the ink receiving layer, and an image is formed by at least the adsorbed color materials. The special medium is particularly suitable when an ink jet method is employed. Such a recording medium is preferably of the so-called absorption-type. In a recording medium of this type, ink is absorbed by voids formed in an ink receiving layer on a substrate.

An absorption-type ink receiving layer is constructed as a hydrophilic porous layer mainly composed of fine particles and containing a binder and other additives as required. Examples of the fine particles include: inorganic pigments such as silica, clay, talc, calcium carbonate, kaolin, aluminum oxides including alumina and alumina hydrates, diatomaceous earth, titanium oxide, hydrotalcite, and zinc oxide; and organic pigments such as urea formalin resins, ethylene resins, and styrene resins. One or more kinds of those fine particles are used.

A water-soluble polymer, a latex, or the like can be suitably used as the binder. Examples of available water-soluble polymers and latices include: polyvinyl alcohol and a modified product thereof; starch or a modified product thereof; gelatin or a modified product thereof; cellulose derivatives such as gum arabic, carboxymethylcellulose, hydroxyethylcellulose, and hydroxyproyl methylcellulose; vinyl-based copolymer latices such as an SBR latex, an NBR latex, a methyl methacrylate-butadiene copolymer latex, a functional-group-modified polymer latex, and an ethylene-vinyl acetate copolymer latex; polyvinyl pyrrolidone; maleic anhydride or a copolymer thereof; and an acrylate copolymer. Two or more kinds of the above can be used in combination as required. An additive can be used as well as required. Examples of the additive include a dispersant, a thickener, a pH adjustor, a lubricant, a flowability modifier, a surfactant, an antifoaming agent, a release agent, a fluorescent brightening agent, an ultraviolet absorber, and an antioxidant.

EXAMPLE

Hereinafter, the present invention will be described more specifically by way of examples. However, the present invention is not limited to the examples below within the gist of the present invention.

The terms "part" and "%" in the following description are based on mass unless otherwise stated.

Examples 1-1 to 1-4 and Comparative Examples 1-1 and 1-2

Dyes listed in Table 1 below were added in predetermined amounts listed in the table. Components having the compositions shown below were added, and the whole was mixed with water in such a manner that the total amount would be 100 parts. Then, the mixture was sufficiently stirred to dissolve the dyes and the components into water. After that, the solution was filtered under pressure through a microfilter having a pore size of 0.2 μm (manufactured by Fuji Photo Film Co., Ltd.) to prepare a yellow ink, a magenta ink, a third ink, a fifth ink, or a sixth ink.

| <Ink composition of each color> | |
|---|---|
| Glycerin | 10 parts |
| Diethylene glycol | 10 parts |
| Acetylene glycol ethylene oxide addition product (trade name: Acetylenol EH; available from Kawaken Fine Chemicals Co., Ltd.) | 1 part |
| Dye | Predetermined parts |
| Water | Balance |
| (100 parts in total) | |

TABLE 1

| Color | Ink No. | Dye | Addition amount |
|---|---|---|---|
| Yellow ink | 1-1 | C.I. Direct Yellow 173 | 3 parts |
| | 1-2 | C.I. Direct Yellow 86 | 3 parts |

TABLE 1-continued

| Color | Ink No. | Dye | Addition amount |
|---|---|---|---|
| Magenta ink | 1-3 | Na salt of Exemplified Compound 7 as a color material of general formula (I) | 3 parts |
|  | 1-4 | C.I. Direct Violet 107 | 3 parts |
|  | 1-5 | C.I. Acid Red 289 | 2 parts |
|  | 1-6 | C.I. Acid Violet 42 | 3 parts |
| Cyan ink | 1-7 | C.I. Direct Blue 199 | 3 parts |
| Third ink | 1-8 | C.I. Food Yellow 3 | 4.5 parts |
|  | 1-9 | C.I. Reactive Orange 13 | 6 parts |
|  | 1-10 | C.I. Acid Orange 56 | 6 parts |
|  | 1-11 | C.I. Acid Orange 7 | 3 parts |
|  | 1-12 | C.I. Acid Orange 88 | 6 parts |
| Fifth ink | 1-13 | Mixture of (a) and (b) below |  |
|  |  | (a) C.I. Acid Yellow 23 | 2 parts |
|  |  | (b) C.I. Acid Blue 9 | 1 part |
|  | 1-14 | Mixture of (c) and (d) below |  |
|  |  | (c) C.I. Acid Yellow 23 | 2.5 parts |
|  |  | (d) C.I. Acid Blue 9 | 0.5 part |
|  | 1-15 | C.I. Acid Green 81 | 8 parts |
| Sixth ink | 1-16 | C.I. Acid Blue 62 | 4 parts |
|  | 1-17 | C.I. Acid Blue 104 | 3 parts |
|  | 1-18 | Mixture of (e) and (f) below |  |
|  |  | (e) C.I. Direct Violet 107 | 1 part |
|  |  | (f) C.I. Direct Blue 199 | 2 parts |

In each example, an ink set obtained by combining the inks of the above ink Nos. as shown in Table 2.

TABLE 2

| No. | Yellow | Magenta | Cyan | Third | Fifth | Sixth |
|---|---|---|---|---|---|---|
| Example 1-1 | 1-1 | 1-3 | 1-7 | 1-8 | 1-13 | 1-16 |
| Example 1-2 | 1-1 | 1-3 | 1-7 | 1-9 | 1-13 | 1-17 |
| Example 1-3 | 1-2 | 1-4 | 1-7 | 1-10 | 1-14 | 1-16 |
| Example 1-4 | 1-2 | 1-4 | 1-7 | 1-11 | 1-14 | 1-17 |
| Comparative Example 1-1 | 1-2 | 1-5 | 1-7 | 1-12 | 1-15 | 1-18 |
| Comparative Example 1-2 | 1-1 | 1-6 | 1-7 | 1-8 | 1-13 | 1-16 |

Images were formed by using ink sets of the above examples, PR101 (manufactured by Canon Inc.) as a recording medium, and a remodeled device of PIXUS950i manufactured by Canon Inc., an ink jet image-forming apparatus, as an image-forming apparatus. Then, the following evaluation was carried out. A Spectrolino manufactured by Gretag Macbeth Ltd. was used for the measurement of the L*, a*, and b* of an image. The measurement conditions were: observation light source: D50, observation field of view: 2°, concentration: ANSI A, white reference: Abs, Filter: No.

In each example, the so-called solid printing in which gradation was assigned in a stepwise manner over the duty range of 0 to 100% was performed by using only the yellow ink, the magenta ink, the third ink, the fifth ink, and the sixth ink of the above ink set. In addition, an image having a hue of from yellow to orange to red to magenta was formed by using an arbitrary combination of the yellow ink and the magenta ink of the above set. Similarly, an image having a hue of from yellow to green to cyan was formed by combining the yellow ink and the cyan ink. An image having a hue of from magenta to violet to blue to cyan was formed by combining the magenta ink and the cyan ink. Then, the L*, a*, and b* of each of those images were measured according to the above method.

Table 3 shows the L*, a*, b*, chroma saturation (c*), and hue angle (H°) of each ink recorded at 100% duty. The chroma saturation can be determined from the equation: $c^*=(a^{*2}+b^{*2})^{1/2}$. The hue angle (H°) can be determined from the equation: $H°=\tan^{-1}(b^*/a^*)+180°$ (for $a^*<0$) or $H°=\tan^{-1}(b^*/a^*)+360°$ (for $a^*>0$). The term "100% duty" as used herein refers to the case where one dot is applied to the constitution areas of all pixels at a resolution of 2,400 dpi×1,200 dpi (For example, one pixel corresponds to a pattern constituted of m×n squares, and each square in one pixel is defined as an area. The "area" is the smallest unit for defining dot ON/OFF.). Since 2.5 ng of ink are applied per dot in this example, the application amount per unit area of 1 square inch is 7.2 mg.

TABLE 3

| No. | Ink | L* | a* | b* | C* | H° | θy-m | θy-r | θm-r |
|---|---|---|---|---|---|---|---|---|---|
| Example 1-1 | Yellow | 90.9 | −5.2 | 84.4 | 84.6 | 93.5 | 105.6 | 32.5 | 73.1 |
|  | Magenta | 49.5 | 79.1 | −17.0 | 80.9 | 347.9 |  |  |  |
|  | Cyan | 52.1 | −42.7 | −56.1 | 70.5 | 232.8 |  |  |  |
|  | Third | 71.2 | 52.4 | 94.5 | 108.1 | 61.0 |  |  |  |
|  | Fifth | 55.2 | −71.9 | 45.4 | 85.1 | 147.7 |  |  |  |
|  | Sixth | 29.6 | 30.5 | −81.3 | 86.9 | 290.6 |  |  |  |
| Example 1-2 | Yellow | 90.9 | −5.2 | 84.4 | 84.6 | 93.5 | 105.6 | 38.2 | 67.4 |
|  | Magenta | 49.5 | 79.1 | −17.0 | 80.9 | 347.9 |  |  |  |
|  | Cyan | 52.1 | −42.7 | −56.1 | 70.5 | 232.8 |  |  |  |
|  | Third | 64.9 | 65.2 | 94.1 | 114.5 | 55.3 |  |  |  |
|  | Fifth | 55.2 | −71.9 | 45.4 | 85.1 | 147.7 |  |  |  |
|  | Sixth | 18.1 | 46.8 | −82.3 | 94.7 | 299.6 |  |  |  |
| Example 1-3 | Yellow | 84.0 | 15.3 | 108.6 | 109.7 | 82.0 | 69.2 | 30.1 | 39.1 |
|  | Magenta | 43.3 | 80.3 | 18.2 | 82.3 | 12.8 |  |  |  |
|  | Cyan | 52.1 | −42.7 | −56.1 | 70.5 | 232.8 |  |  |  |
|  | Third | 59.2 | 70.6 | 90.0 | 114.4 | 51.9 |  |  |  |
|  | Fifth | 59.7 | −60.4 | 64.0 | 88.0 | 133.3 |  |  |  |
|  | Sixth | 29.6 | 30.5 | −81.3 | 86.9 | 290.6 |  |  |  |
| Example 1-4 | Yellow | 84.0 | 15.3 | 108.6 | 109.7 | 82.0 | 69.2 | 19.1 | 50.1 |
|  | Magenta | 43.3 | 80.3 | 18.2 | 82.3 | 12.8 |  |  |  |
|  | Cyan | 52.1 | −42.7 | −56.1 | 70.5 | 232.8 |  |  |  |
|  | Third | 71.3 | 52.5 | 102.6 | 115.3 | 62.9 |  |  |  |

TABLE 3-continued

| No. | Ink | L* | a* | b* | C* | H° | θy-m | θy-r | θm-r |
|---|---|---|---|---|---|---|---|---|---|
| | Fifth | 59.7 | −60.4 | 64.0 | 88.0 | 133.3 | | | |
| | Sixth | 18.1 | 46.8 | −82.3 | 94.7 | 299.6 | | | |
| Comparative Example 1-1 | Yellow | 84.0 | 15.3 | 108.6 | 109.7 | 82.0 | 93.0 | 31.2 | 61.8 |
| | Magenta | 54.6 | 88.2 | −17.2 | 89.8 | 349.0 | | | |
| | Cyan | 52.1 | −42.7 | −56.1 | 70.5 | 232.8 | | | |
| | Third | 61.0 | 59.8 | 73.4 | 94.7 | 50.8 | | | |
| | Fifth | 54.7 | −51.0 | 13.1 | 52.7 | 165.6 | | | |
| | Sixth | 19.0 | 30.4 | −65.6 | 72.3 | 294.9 | | | |
| Comparative Example 1-2 | Yellow | 90.9 | −5.2 | 84.4 | 84.6 | 93.5 | 141.9 | 32.5 | 109.4 |
| | Magenta | 63.2 | 34.8 | −39.2 | 52.4 | 311.6 | | | |
| | Cyan | 52.1 | −42.7 | −56.1 | 70.5 | 232.8 | | | |
| | Third | 71.2 | 52.4 | 94.5 | 108.1 | 61 | | | |
| | Fifth | 55.2 | −71.9 | 45.4 | 85.1 | 147.7 | | | |
| | Sixth | 29.6 | 30.5 | −81.3 | 86.9 | 290.6 | | | |

Table 3 shows that, in each of all the examples and comparative examples, a hue angle of a color formed by the third ink is within a reproduction region of a color formed by a combination of yellow and magenta. Similarly, Table 3 shows that, in each of all the examples and comparative examples, a hue angle of a color formed by the fifth ink is within a reproduction region of a color formed by a combination of yellow and cyan, and a hue angle of a color formed by the sixth ink is within a reproduction region of a color formed by a combination of magenta and cyan.

FIGS. 13 to 18 each shows a relationship between the chroma saturation (c*) and lightness (L*) of a color of the third ink or of a color formed by color mixing of yellow and magenta. The color formed by color mixing of yellow and magenta is selected from the colors formed by a combination of yellow and magenta, and has a hue in agreement with a trail shown by the color represented by the third ink.

FIGS. 13 to 16 corresponding to Examples 1-1 to 1-4 show that, in any one of the examples, the lightness of a color represented by the third ink is higher than that of a color represented by a combination of yellow and magenta at the same hue and the same chroma saturation. On the other hand, in Comparative Example 1-1 (FIG. 17), the lightness of a color represented by the third ink is lower than that of a color represented by a combination of yellow and magenta. Furthermore, in Comparative Example 1-2 (FIG. 18), the lightness of a color represented by the third ink is higher than that of a color represented by a combination of yellow and magenta at the same hue and the same chroma saturation, but a hue angle between yellow and magenta exceeds 113°.

FIGS. 19 to 24 each shows a relationship between the chroma saturation (c*) and lightness (L*) of a color of the fifth ink or of a color formed by color mixing of yellow and cyan. The color formed by color mixing of yellow and cyan is selected from the colors formed by a combination of yellow and cyan, and has a hue in agreement with a trail shown by the color represented by the fifth ink.

FIGS. 19 to 22 corresponding to Examples 1-1 to 1-4 show that, in any one of the examples, the lightness of a color represented by the fifth ink is higher than that of a color represented by a combination of yellow and cyan at the same hue and the same chroma saturation. On the other hand, in Comparative Example 1-1 (FIG. 23), the lightness of a color represented by the fifth ink is lower than that of a color represented by a combination of yellow and cyan.

FIGS. 25 to 30 each show a relationship between the chroma saturation (c*) and lightness (L*) of a color of the sixth ink or of a color formed by color mixing of magenta and cyan. The color formed by color mixing of magenta and cyan is selected from the colors formed by a combination of magenta and cyan, and has a hue in agreement with a trail shown by the color represented by the sixth ink.

FIGS. 25 to 28 corresponding to Examples 1-1 to 1-4 show that, in any one of the examples, the lightness of a color represented by the sixth ink is higher than that of a color represented by a combination of magenta and cyan at the same hue and the same chroma saturation. On the other hand, in Comparative Example 1-1 (FIG. 29), the lightness of a color represented by the sixth ink is lower than that of a color represented by a combination of magenta and cyan.

(Actual Image Evaluation)

Next, the following black ink was added to the ink set of each of Examples 1-1 to 1-4 and Comparative Examples 1-1 and 1-2 to form 6 kinds of images as full-color natural images consisting of "1. sunset view", "2. view of autumn leaves", "3. person", "4. bamboo forest view", "5. blue sky view", and "6. ocean view". Image formation was performed by creating a dedicated image file formed by the yellow, magenta, cyan, third, fifth, sixth, and black inks. At this time, the image file was created in such a manner that the image data would simultaneously contain image data for using the third ink and data for using the yellow ink and the magenta ink. Also created was a dedicated image file for forming the above full-color natural images by means of 4 color inks except the third, fifth, and sixth inks in each of the examples and comparative examples, that is, the yellow, magenta, cyan, and black inks. Then, image formation was performed.

Used for the above image formation were PR101 (manufactured by Canon Inc.) as a recording medium and an ink jet image-forming apparatus as shown in each of FIGS. 6 to 10 and FIG. 12.

| <Black ink> | |
|---|---|
| Glycerin | 10% |
| Diethylene glycol | 10% |
| Acetylene glycol ethylene oxide addition product (trade name: Acetylenol EH; available from Kawaken Fine Chemicals Co., Ltd.) | 1% |
| Food Black 2 | 3% |
| Water | 76% |

Image evaluation was performed as follows. With regard to each of the examples and comparative examples, 10 observers each compared an image formed by using the above 7 color inks with an image formed by using 4 color inks except the third, fifth, and sixth inks to visually evaluate the images for "vividness" and "smoothness". Evaluation criteria were as follows.

The evaluation criterion for "vividness" was set depending on the number of observers who felt that the 7-color image "was vividly outputted and particularly excellent in stereoscopic effect and transparency" as compared to the 4-color image. That is, the symbol "AA" means that 10 to 8 observers felt so; "A", 7 to 5 observers; "B", 4 or less observers.

The evaluation criterion for "smoothness" was set depending on the number of observers who felt that the 7-color image "had a smoothly represented change of color and showed nearly no observable pseudocontour or color skip" as compared to the 4-color image. That is, the symbol "AA" means that 10 to 8 observers felt so; "A", 7 to 5 observers; "B", 4 or less observers.

Table 4 shows the results of the above evaluation.

TABLE 4

| No. | Vividness | Smoothness |
| --- | --- | --- |
| Example 1-1 | AA | AA |
| Example 1-2 | AA | AA |
| Example 1-3 | AA | AA |
| Example 1-4 | AA | AA |
| Comparative Example 1-1 | B | A |
| Comparative Example 1-2 | A | B |

In Examples 1-1 to 1-4, each of the full-color natural images 1 to 7 was excellent in contrast, vividness, and transparency, and showed a low degree of pseudocontour or of color skip. On the other hand, in each of Comparative Examples 1-1 and 1-2, an image lacked in vividness or showed pseudocontour and color skip to lack in smoothness.

Examples 2-1 to 2-8 and Comparative Examples 2-1 and 2-2

Dyes listed in Table 5 below were added in predetermined amounts listed in the table. Components having the compositions shown below were added, and the whole was mixed with water in such a manner that the total amount would be 100 parts. Then, the mixture was sufficiently stirred to dissolve the dyes and the components into water. After that, the solution was filtered under pressure through a microfilter having a pore size of 0.2 μm (manufactured by Fuji Photo Film Co., Ltd.) to prepare a yellow ink, a magenta ink, and a third ink.

Each of inks No. 2-12 and 2-13 has the same composition as that of each of the inks No. 1-8 and 1-12, respectively.

<Ink compositions of yellow, magenta, and third inks>

| | |
| --- | --- |
| Glycerin | 10 parts |
| Diethylene glycol | 10 parts |
| Acetylene glycol ethylene oxide addition product (trade name: Acetylenol EH; available from Kawaken Fine Chemicals Co., Ltd.) | 1 part |
| Dye | Predetermined parts |
| Water | Balance |
| (100 parts in total) | |

TABLE 5

| Ink No. | Color | Dye | Addition amount |
| --- | --- | --- | --- |
| 2-1 | Yellow ink | C.I. Direct Yellow 173 | 3 parts |
| 2-2 | | C.I. Direct Yellow 132 | 3 parts |
| 2-3 | | C.I. Direct Yellow 86 | 3 parts |
| 2-4 | Magenta ink | Na salt of Exemplified Compound 7 as a color material of general formula (I) | 3 parts |
| 2-5 | | Li salt of Exemplified Compound 8 as a color material of general formula (II) | 3 parts |
| 2-6 | | C.I. Direct Violet 107 | 3 parts |
| 2-7 | | C.I. Acid Violet 42 | 3 parts |
| 2-8 | | C.I. Acid Red 289 | 2 parts |
| 2-9 | Third ink | C.I. Acid Orange 56 | 6 parts |
| 2-10 | | C.I. Acid Orange 7 | 3 parts |
| 2-11 | | C.I. Reactive Orange 13 | 6 parts |
| 2-12 | | C.I. Food Yellow 3 | 4.5 parts |
| 2-13 | | C.I. Acid Orange 88 | 6 parts |
| 2-14 | | C.I. Acid Yellow 36 | 6 parts |
| 2-15 | | C.I. Acid Red 87 | 6 parts |

In each example, an ink set obtained by combining the inks of the above ink Nos. as shown in Table 6.

TABLE 6

| No. | Yellow ink | Magenta ink | Third ink |
| --- | --- | --- | --- |
| Example 2-1 | 2-1 | 2-4 | 2-9 |
| Example 2-2 | 2-1 | 2-4 | 2-10 |
| Example 2-3 | 2-2 | 2-5 | 2-11 |
| Example 2-4 | 2-2 | 2-5 | 2-12 |
| Example 2-5 | 2-3 | 2-6 | 2-9 |
| Example 2-6 | 2-3 | 2-6 | 2-10 |
| Example 2-7 | 2-3 | 2-8 | 2-14 |
| Example 2-8 | 2-3 | 2-8 | 2-15 |
| Comparative Example 2-1 | 2-3 | 2-8 | 2-13 |
| Comparative Example 2-2 | 2-1 | 2-7 | 2-12 |

Images were formed by using ink sets of the above examples, PR101 (manufactured by Canon Inc.) as a recording medium, and a remodeled device of PIXUS950i manufactured by Canon Inc., an ink jet image-forming apparatus, as an image-forming apparatus. Then, the following evaluation was carried out. A Spectrolino manufactured by Gretag Macbeth Ltd. was used for the measurement of the L*, a*, and b* of an image. The measurement conditions were: observation light source: D50, observation field of view: 2°, concentration: ANSI A, white reference: Abs, Filter: No.

In each example, the so-called solid printing in which gradation was assigned in a stepwise manner over the duty range of 0 to 100% was performed by using only the yellow ink, the magenta ink, and the third ink of the above ink set. In addition, an image having a hue of from yellow to orange to red to magenta was formed by using an arbitrary combination of the yellow ink and the magenta ink. The L*, a*, and b* of each of those images were measured according to the above method.

Table 7 shows the L*, a*, b*, chroma saturation (c*), and hue angle (H°) of each ink recorded at 100% duty. The chroma saturation can be determined from the equation: $c^* = (a^{*2} + b^{*2})^{1/2}$. The hue angle (H°) can be determined from the equation: $H° = \tan^{-1}(b^*/a^*) + 180°$ (for $a^* < 0$) or $H° = \tan^{-1}(b^*/a^*) + 360°$ (for $a^* > 0$). The term "100% duty" as used herein refers to the case where one dot is applied to the constitution areas of all pixels at a resolution of 2,400 dpi×1,200 dpi (For example, one pixel corresponds to a pattern constituted of m×n squares, and each square in one pixel is defined as an area. The "area" is the smallest unit for defining dot ON/OFF.). Since 2.5 ng of ink are applied per dot in this example, the application amount per unit area of 1 square inch is 7.2 mg.

TABLE 7

| No. | Ink | L* | a* | b* | C* | H° | θy-m | θy-r | θm-r |
|---|---|---|---|---|---|---|---|---|---|
| Example 2-1 | Yellow | 90.9 | −5.2 | 84.4 | 84.6 | 93.5 | 105.6 | 41.6 | 64.0 |
|  | Magenta | 49.5 | 79.1 | −17.0 | 80.9 | 347.9 |  |  |  |
|  | Third | 59.2 | 70.6 | 90.0 | 114.4 | 51.9 |  |  |  |
| Example 2-2 | Yellow | 90.9 | −5.2 | 84.4 | 84.6 | 93.5 | 105.6 | 30.6 | 75.0 |
|  | Magenta | 49.5 | 79.1 | −17.0 | 80.9 | 347.9 |  |  |  |
|  | Third | 71.3 | 52.5 | 102.6 | 115.3 | 62.9 |  |  |  |
| Example 2-3 | Yellow | 87.6 | 5.3 | 108.1 | 108.2 | 87.2 | 79.7 | 31.9 | 47.8 |
|  | Magenta | 47.9 | 83.4 | 11.0 | 84.1 | 7.5 |  |  |  |
|  | Third | 64.9 | 65.2 | 94.1 | 114.5 | 55.3 |  |  |  |
| Example 2-4 | Yellow | 87.6 | 5.3 | 108.1 | 108.2 | 87.2 | 79.7 | 26.2 | 53.5 |
|  | Magenta | 47.9 | 83.4 | 11.0 | 84.1 | 7.5 |  |  |  |
|  | Third | 71.2 | 52.4 | 94.5 | 108.1 | 61.0 |  |  |  |
| Example 2-5 | Yellow | 84.0 | 15.3 | 108.6 | 109.7 | 82.0 | 69.2 | 30.1 | 39.1 |
|  | Magenta | 43.3 | 80.3 | 18.2 | 82.3 | 12.8 |  |  |  |
|  | Third | 59.2 | 70.6 | 90.0 | 114.4 | 51.9 |  |  |  |
| Example 2-6 | Yellow | 84.0 | 15.3 | 108.6 | 109.7 | 82.0 | 69.2 | 19.1 | 50.1 |
|  | Magenta | 43.3 | 80.3 | 18.2 | 82.3 | 12.8 |  |  |  |
|  | Third | 71.3 | 52.5 | 102.6 | 115.3 | 62.9 |  |  |  |
| Example 2-7 | Yellow | 84.0 | 15.3 | 108.6 | 109.7 | 82.0 | 93.0 | 5.1 | 87.9 |
|  | Magenta | 54.6 | 88.2 | −17.2 | 89.8 | 349.0 |  |  |  |
|  | Third | 78.4 | 27.0 | 115.9 | 119.0 | 76.9 |  |  |  |
| Example 2-8 | Yellow | 84.0 | 15.3 | 108.6 | 109.7 | 82.0 | 69.2 | 46.7 | 22.5 |
|  | Magenta | 43.3 | 80.3 | 18.2 | 82.3 | 12.8 |  |  |  |
|  | Third | 64.8 | 67.4 | 47.7 | 82.6 | 35.3 |  |  |  |
| Comparative Example 2-1 | Yellow | 84.0 | 15.3 | 108.6 | 109.7 | 82.0 | 93.0 | 31.2 | 61.8 |
|  | Magenta | 54.6 | 88.2 | −17.2 | 89.8 | 349.0 |  |  |  |
|  | Third | 61.0 | 59.8 | 73.4 | 94.7 | 50.8 |  |  |  |
| Comparative Example 2-2 | Yellow | 90.9 | −5.2 | 84.4 | 84.6 | 93.5 | 141.9 | 32.5 | 109.4 |
|  | Magenta | 63.2 | 34.8 | −39.2 | 52.4 | 311.6 |  |  |  |
|  | Third | 71.2 | 52.4 | 94.5 | 108.1 | 61.0 |  |  |  |

Table 7 shows that, in each of all the examples, a hue angle of a color formed by the third ink is within a reproduction region of a color formed by a combination of yellow and magenta.

FIGS. 31 to 38 each shows a relationship between the chroma saturation (c*) and lightness (L*) of a color of the third ink or of a color formed by color mixing of yellow and magenta. The color formed by color mixing of yellow and magenta is selected from the colors formed by a combination of yellow and magenta, and has a hue in agreement with a trail shown by the color represented by the third ink.

FIGS. 31 to 38 corresponding to Examples 2-1 to 2-8 show that, in any one of the examples, the lightness of a color represented by the third ink is higher than that of a color represented by a combination of yellow and magenta at the same hue and the same chroma saturation. On the other hand, in each of Comparative Examples 2-1 and 2-2, the same relationship as that of each of Comparative Example 1-1 (FIG. 17) and Comparative Example 1-2 (FIG. 18) is obtained.

(Actual Image Evaluation)

Next, the following cyan ink and black ink were added to the ink set of each of Examples 2-1 to 2-8 and Comparative Examples 2-1 and 2-2 to form 3 kinds of images as full-color natural images consisting of "1. sunset view", "2. view of autumn leaves", and "3. person". Image formation was performed by creating a dedicated image file formed by the yellow, magenta, cyan, third, and black inks. At this time, the image file was created in such a manner that the image data would simultaneously contain image data for using the third ink and data for using the yellow ink and the magenta ink. Also created was a dedicated image file for forming an image by means of 4 color inks except the third ink in each of the examples and comparative examples, that is, the yellow, magenta, cyan, and black inks.

Used for the above image formation were PR101 (manufactured by Canon Inc.) as a recording medium and a remodeled device of PIXUS950i manufactured by Canon Inc., an ink jet image-forming apparatus, as an image-forming apparatus. The inks of the examples and comparative examples were loaded to the remodeled device as follows. The yellow ink tank was installed to an installing position of a yellow ink tank. The magenta ink tank was installed to an installing position of a magenta ink tank. The cyan ink tank was installed to an installing position of a cyan ink tank. The third ink tank was installed to an installing position of a light magenta ink tank. The black ink tank was installed to an installing position of a black ink tank.

| <Cyan ink> | |
|---|---|
| Glycerin | 10% |
| Diethylene glycol | 10% |
| Acetylene glycol ethylene oxide addition product (trade name: Acetylenol EH; available from Kawaken Fine Chemicals Co., Ltd.) | 1% |
| Direct Blue 199 | 3% |
| Water | 76% |
| <Black ink> | |
| Glycerin | 10% |
| Diethylene glycol | 10% |
| Acetylene glycol ethylene oxide addition product (trade name: Acetylenol EH; available from Kawaken Fine Chemicals Co., Ltd.) | 1% |
| Food Black 2 | 3% |
| Water | 76% |

Image evaluation was performed with regard to each of Examples 2-1 to 2-8 and Comparative examples 2-1 and 2-2 as follows using the above 3 kinds of outputted images. 10 observers each compared an image formed by using 5 color inks of an ink set with an image formed by using 4 color inks of the ink set, the 5-color image and the 4-color image forming a pair of each of the 3 kinds of outputted images, to visually evaluate the images for "vividness" and "smoothness". Evaluation criteria were as follows.

The evaluation criterion for "vividness" was set depending on the number of observers who felt that the 5-color image "was vividly outputted and particularly excellent in stereoscopic effect and transparency" as compared to the 4-color image. That is, the symbol "AA" means that 10 to 8 observers felt so; "A", 7 to 5 observers; "B", 4 or less observers.

The evaluation criterion for "smoothness" was set depending on the number of observers who felt that the 5-color image "had a smoothly represented change of color and showed nearly no observable pseudocontour or color skip" as compared to the 4-color image. That is, the symbol "AA" means that 10 to 8 observers felt so; "A", 7 to 5 observers; "B", 4 or less observers.

Table 8 shows the results of the above evaluation.

TABLE 8

| No. | Vividness | Smoothness |
|---|---|---|
| Example 2-1 | AA | AA |
| Example 2-2 | AA | AA |
| Example 2-3 | AA | AA |
| Example 2-4 | AA | AA |
| Example 2-5 | AA | AA |
| Example 2-6 | AA | AA |
| Example 2-7 | A | A |
| Example 2-8 | A | A |
| Comparative Example 2-1 | B | A |
| Comparative Example 2-2 | A | B |

In Examples 2-1 to 2-8, each of the full-color natural images 1 to 3 was excellent in contrast, vividness, and transparency, and showed a low degree of pseudocontour or of color skip. In particular, in Examples 2-1 to 2-6, images excellent in vividness and smoothness were obtained. On the other hand, in each of Comparative Examples 2-1 and 2-2, an image lacked in vividness or showed pseudocontour and color skip to lack in smoothness.

What is claimed is:

1. An image-forming method, comprising performing image formation on the basis of pixel data by using at least a yellow recording agent, a magenta recording agent, and a third recording agent,
   wherein a color represented on a recording medium by the third recording agent on a color space of CIE-L*a*b* has a higher lightness than a lightness of a color that is represented on the recording medium by a combination of the yellow recording agent and the magenta recording agent, and that has the same hue as that of the color represented on the recording medium by the third recording agent, and
   wherein a difference in hue angle on the color space between a color represented by the yellow recording agent and a color represented by the magenta recording agent is in a range of 60 to 113°.

2. An image-forming method according to claim 1, wherein a hue angle on the color space of the color represented on the recording medium by the third recording agent is in a range of 50 to 65°.

3. An image-forming method according to claim 1, wherein a hue angle on the color space of the color represented on the recording medium by the yellow recording agent is in a range of 70 to 100°, and a hue angle on the color space of the color represented on the recording medium by the magenta recording agent is in a range of 25 to 30°.

4. An image-forming method according to claim 1, wherein a hue angle between the color represented by the yellow recording agent and the color represented by the third recording agent is in a range of 10 to 45°, and a difference in hue angle on the color space between the color represented by the magenta recording agent and the color represented by the third recording agent is in a range of 35 to 85°.

5. An image-forming method according to claim 1, wherein a cyan recording agent is additionally used as the recording agent.

6. An image-forming method according to claim 5,
   wherein at least one of a fifth recording agent and a sixth recording agent is used as the recording agent;
   wherein a color represented on the recording medium by the fifth recording agent on the color space has a higher lightness than a lightness of a color reproduction region represented on the recording medium by a combination of the yellow recording agent and the cyan recording agent, and has a hue angle in the color reproduction region; and
   wherein a color represented on the recording medium by the sixth recording agent on the color space has a higher lightness than a lightness of a color reproduction region represented on the recording medium by a combination of the magenta recording agent and the cyan recording agent, and has a hue angle in the color reproduction region.

7. An image-forming method according to claim 1, wherein an ink is used as the recording agent and a dot of the ink is formed on the recording medium to perform image formation.

8. An image-forming method according to claim 1, wherein, when pixel data corresponding to colors in gamuts of yellow and magenta is outputted, the pixel data is allowed to contain data for at least one of yellow and magenta as well as data for the third ink.

9. An image-forming apparatus for performing image formation on the basis of pixel data by using at least a yellow recording agent, a magenta recording agent, and a third recording agent,
   wherein a color represented on a recording medium by the third recording agent on a color space of CIE-L*a*b* has a higher lightness than a lightness of a color that is represented on the recording medium by a combination of the yellow recording agent and the magenta recording agent, and that has the same hue as that of the color represented on the recording medium by the third recording agent, and
   wherein a difference in hue angle on the color space between a color represented by the yellow recording agent and a color represented by the magenta recording agent is in a range of 60 to 113°.

10. An ink set, comprising a yellow ink, a magenta ink, and a third ink,
    wherein a color represented on a recording medium by the third ink on a color space of CIE-L*a*b* has a higher lightness than a lightness of a color that is represented on the recording medium by a combination of the yellow ink and the magenta ink, and that has the same hue as that of the color represented on the recording medium by the third ink, and
    wherein a difference in hue angle on the color space between a color represented by the yellow ink and a color represented by the magenta ink is in a range of 60 to 113°.

11. A third ink to be used with at least a yellow ink and a magenta ink, wherein a color represented on a recording medium by the third ink on a color space of CIE-L*a*b* has a higher lightness than a lightness of a color that is represented on the recording medium by a combination of the yellow ink and the magenta ink, and that has the same hue as that of the color represented on the recording medium by the third ink, and wherein a difference in hue angle on the color space between a color represented by the yellow ink and a color represented by the magenta ink is in a range of 60 to 113°.

* * * * *

UNITED STATES PATENT AND TRADEMARK OFFICE
CERTIFICATE OF CORRECTION

PATENT NO. : 7,229,166 B2
APPLICATION NO. : 10/914124
DATED : June 12, 2007
INVENTOR(S) : Hiroshi Tomioka et al.

It is certified that error appears in the above-identified patent and that said Letters Patent is hereby corrected as shown below:

COLUMN 3

Line 35, "$X=0.0000 \times R+0.0512 \times G+0.7739 \times B$." should read
--$Z=0.0000 \times R+0.0512 \times G+0.7739 \times B$.--.

COLUMN 8

Line 50, "a*b*plane" should read --a*b* plane--.

COLUMN 14

Line 59, "form" should read --from--.

COLUMN 36

Line 62, "apat-" should read --a pat- --.

Signed and Sealed this

Eighth Day of April, 2008

JON W. DUDAS
*Director of the United States Patent and Trademark Office*